(12) United States Patent
Fukui et al.

(10) Patent No.: US 9,396,208 B2
(45) Date of Patent: *Jul. 19, 2016

(54) SELECTING STORAGE CLOUD FOR STORAGE OF ENTITY FILES FROM PLURALITY OF STORAGE CLOUDS

(71) Applicant: International Business Machines Corporation, Armonk, NY (US)

(72) Inventors: Yuto Fukui, Tokyo (JP); Sanehiro Furuichi, Tokyo (JP); Masami Tada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/926,244

(22) Filed: Jun. 25, 2013

(65) Prior Publication Data

US 2014/0006350 A1 Jan. 2, 2014

(30) Foreign Application Priority Data

Jun. 27, 2012 (JP) .................................. 2012-144209

(51) Int. Cl.
*G06F 17/30* (2006.01)

(52) U.S. Cl.
CPC ........ *G06F 17/30235* (2013.01); *G06F 17/302* (2013.01); *G06F 17/30115* (2013.01); *G06F 17/30174* (2013.01); *G06F 17/30377* (2013.01)

(58) Field of Classification Search
USPC ....................................................... 707/632
See application file for complete search history.

(56) References Cited

U.S. PATENT DOCUMENTS 5,873,085 A 2/1999 Enoki et al.
8,589,355 B2 * 11/2013 Nagpal ............. G06F 17/30082
707/653

(Continued)

FOREIGN PATENT DOCUMENTS

JP 5-307532 11/1993
JP 6-332782 12/1994

(Continued)

OTHER PUBLICATIONS

Fukui et al., "Method for Selecting Storage Cloud for Storage of Entity Files From Plurality of Storage Clouds, and Computer and Computer Program Therefor," U.S. Appl. No. 14/487,555, filed Sep. 16, 2014, 108 pages.

(Continued)

*Primary Examiner* — Cam-Linh Nguyen
(74) *Attorney, Agent, or Firm* — Yee & Associates, P.C.; Gail H. Zarick

(57) ABSTRACT

A technique to enable the user of storage clouds to use of a plurality of storage clouds without the user of storage clouds being aware of which data is being entrusted to which storage cloud and without sacrificing safety or ease-of-use by selecting at least one storage cloud to store an entity file storable in a cloud-utilizing terminal from among a plurality of storage clouds connected via a network to the cloud-utilizing terminal. This technique includes referencing the attributes or context of an entity file, or the attributes of a virtual folder and each attribute of a plurality of storage clouds, in response to the creation or update of the entity file in the virtual folder in the cloud-utilizing terminal, and selecting at least one storage cloud from among a plurality of storage clouds for storing the entity file so as to satisfy predefined rules.

24 Claims, 33 Drawing Sheets

(56) References Cited

U.S. PATENT DOCUMENTS

| | | | |
|---|---|---|---|
| 9,037,564 B2* | 5/2015 | Lesavich | G06F 17/30864 707/706 |
| 2009/0157627 A1* | 6/2009 | Arthursson | 707/3 |
| 2011/0022642 A1* | 1/2011 | deMilo | G06F 17/30082 707/805 |
| 2011/0066668 A1* | 3/2011 | Guarraci | G06F 17/30233 707/831 |
| 2011/0131309 A1* | 6/2011 | Akiyama | H04L 12/14 709/223 |
| 2011/0295998 A1* | 12/2011 | Ferris | G06F 9/5072 709/224 |
| 2012/0042162 A1* | 2/2012 | Anglin | G06F 21/57 713/165 |
| 2012/0069406 A1 | 3/2012 | Furuichi et al. | |
| 2012/0072969 A1 | 3/2012 | Aratsu et al. | |
| 2012/0166442 A1 | 6/2012 | Furuichi et al. | |
| 2012/0221668 A1* | 8/2012 | Chen et al. | 709/212 |
| 2012/0226663 A1* | 9/2012 | Valdez Kline et al. | 707/640 |
| 2012/0323977 A1* | 12/2012 | Fortier | G06F 17/3007 707/812 |
| 2013/0205251 A1* | 8/2013 | Cisler et al. | 715/810 |
| 2013/0219303 A1* | 8/2013 | Eriksson et al. | 715/759 |
| 2013/0282830 A1* | 10/2013 | Besen et al. | 709/205 |
| 2013/0283232 A1* | 10/2013 | Van Megchelen | 717/106 |
| 2013/0305039 A1* | 11/2013 | Gauda | 713/153 |
| 2014/0156791 A1* | 6/2014 | Sant et al. | 709/217 |

FOREIGN PATENT DOCUMENTS

| | | |
|---|---|---|
| JP | 9-44393 | 2/1997 |
| JP | 9-81585 | 3/1997 |
| JP | 10-3421 | 1/1998 |
| JP | 2010-287104 | 12/2010 |
| JP | 2011-197939 | 10/2011 |
| JP | 2012-68833 | 4/2012 |
| JP | 2012-68837 | 4/2012 |
| JP | 2012137973 | 7/2012 |

OTHER PUBLICATIONS

Office Action, dated Dec. 17, 2015, regarding U.S. Appl. No. 14/487,555, 31 pages.

* cited by examiner

| | PUBLIC CLOUD A | PRIVATE CLOUD B | PRIVATE CLOUD C | PUBLIC CLOUD D | PRIVATE CLOUD E | PRIVATE CLOUD F |
|---|---|---|---|---|---|---|
| SERVICE PERIOD | MON-FRI 8:00~18:00 | MON-FRI 0:00~24:00 | MON-SUN 8:00~20:00 | MON-SUN 0:00~24:00 | MON-SUN 8:00~20:00 | MON-SUN 0:00~24:00 |
| AVAILABILITY | 99% | 99.5% | 95% | 95% | 98% | 99% |
| PERFORMANCE | 100Mbps (UP/DOWN) | 1Gbps (UP/DOWN) | 30Mbps (UP/DOWN) | 1Gbps (UP/DOWN) | 1Gbps (UP/DOWN) | 10Gbps (UP/DOWN) |
| REDUNDANCY | NO BACKUP | BACKUP STORED IN CLOUD | NO BACKUP | NO BACKUP | BACKUP STORED IN CLOUD | BACKUP STORED IN CLOUD |
| SERVER LOCATION | OSAKA | SHANGHAI | NAGOYA | OVERSEAS (UNDISCLOSED) | HAKOZAKI | JAPAN |
| SECURITY | EXTERNAL ACCESS | IN-HOUSE FIREWALL | EXTERNAL ACCESS | EXTERNAL ACCESS | IN-HOUSE FIREWALL | INTER-DEPARTMENTAL FIREWALL |
| | LOW | HIGH | MEDIUM | LOW | MEDIUM | HIGH |
| MONTHLY CHARGE | FREE | $10/KB | FREE | $5/KB | $10/KB | $50/KB |
| MAXIMUM CAPACITY | 2GB | UNLIMITED | UNLIMITED | 100GB | 2GB | 1TB |

FIG. 4A

|  | PRIVATE CLOUD G | PRIVATE CLOUD H | PRIVATE CLOUD I |
|---|---|---|---|
| SERVICE PERIOD | MON-SUN 0:00~24:00 | MON-SUN 0:00~24:00 | MON-SUN 0:00~24:00 |
| AVAILABILITY | 99% | 95% | 99.5% |
| PERFORMANCE | 80Mbps (AT HOME) | 40Mbps (AT HOME) | 200Mbps (AT HOME) |
|  | 50Mbps (AT WORK) | 90Mbps (AT WORK) | 400Mbps (AT WORK) |
| REDUNDANCY | NO BACKUP | BACKUP STORED IN CLOUD | NO BACKUP |
| SECURITY | LOW (NONE) | MEDIUM (VIRUS SCAN) | HIGH (VIRUS SCAN AND ENCRYPTION OF STORED FILES) |
| MAXIMUM CAPACITY PER FILE | UNLIMITED | 25MB | NONE |
| EXPIRATION | DELETED UNLESS ACCESSED WEEKLY | DELETED WEEKLY | NONE |
| MAXIMUM CAPACITY PER MONTH | 100GB | 50GB | 5GB |

FIG. 4B

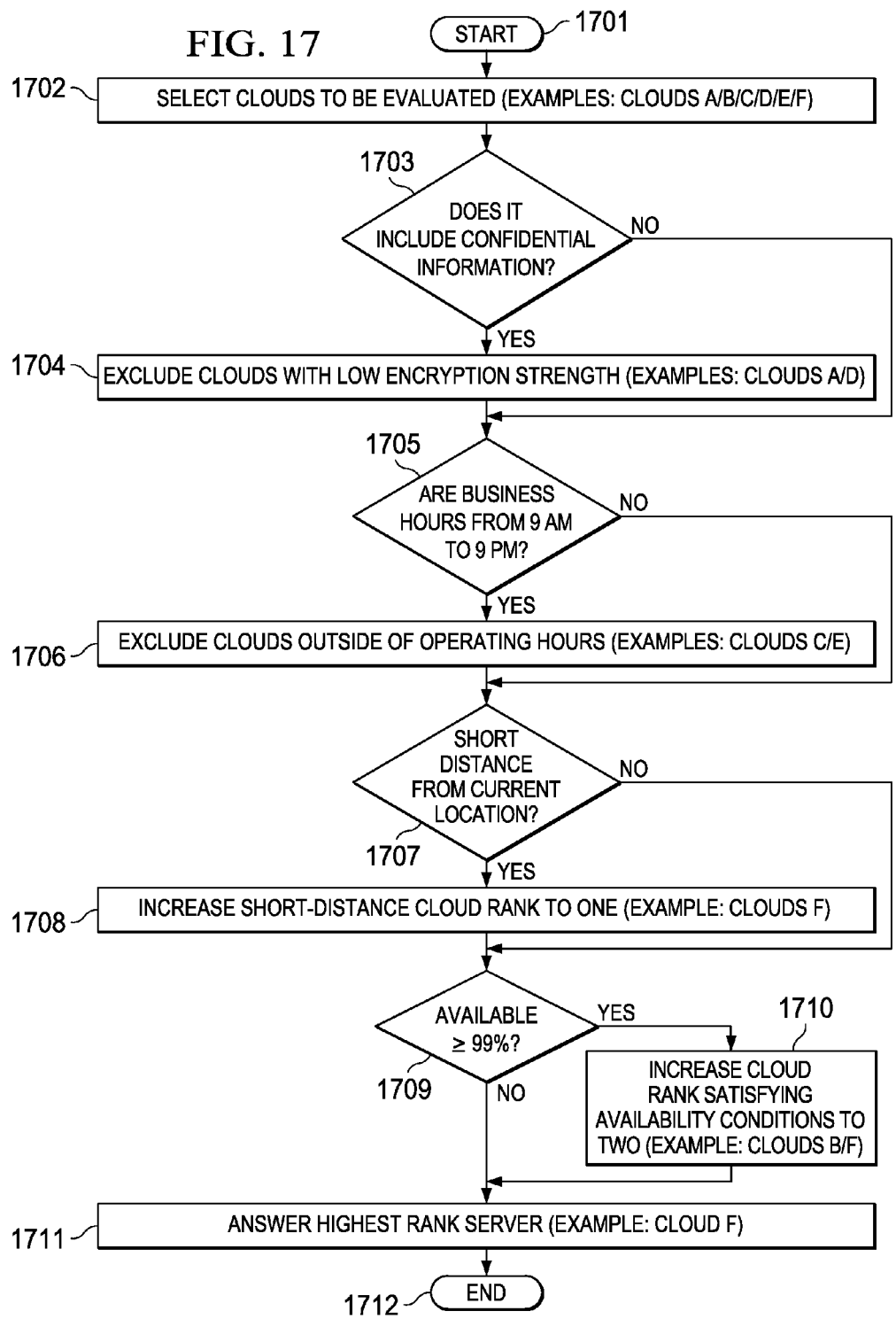

SELECTING STORAGE CLOUD FOR STORAGE OF ENTITY FILES FROM PLURALITY OF STORAGE CLOUDS

CROSS-REFERENCE TO RELATED APPLICATION(S)

This application claims the benefit of priority to Japanese Application Serial No. 2012-144209, filed on Jun. 27, 2012 and entitled "Method for Selecting Storage Cloud for Storage of Entity Files from Plurality of Storage Clouds, and Computer and Computer Program Therefor," the contents of which are hereby incorporated by reference.

TECHNICAL FIELD

The present invention relates to a technique for selecting a storage cloud from among a plurality of storage clouds. More specifically, the present invention relates to a technique for selecting at least one storage cloud from among a plurality of storage clouds connected to a cloud-utilizing terminal via a network in order to store entity files which can be stored in the cloud-utilizing terminal.

BACKGROUND ART

Cloud computing has continued to spread, and various types of storage clouds have been provided. However, these storage clouds vary depending on the characteristics of each service. Therefore, a certain degree of knowledge is required to utilize these storage clouds according to the proper purpose or use.

Methods for synchronizing specific folders in a cloud-utilizing terminal with storage clouds have become popular. However, it is left to the user to entrust data in the cloud-utilizing terminal to a given storage cloud. For example, when folders have to be distributed and stored in each storage cloud, the user always has to be aware of which data is being entrusted to which service with a storage cloud.

The storage as the location for storing the data and the views (folder views) for displaying the data should be independent. However, the storage and views are not independent in conventional methods. As a result, the user sacrifices storage cloud convenience and folder ease-of-use.

Patent Literature 1 describes a server device including: a storage information recording means for recording fee information used for online storage of a plurality of online storage data files serving as candidates for a storage location, a file inputting means for inputting data files, a frequency of use inputting means for inputting the expected frequency of use with respect to a data file inputted by the file inputting means, a calculating means for calculating the comparison value for each online storage data file serving as a candidate for a storage location based on the expected frequency of use and the fee information, and a determining means for determining the online storage data files for each storage location based on the comparison value of each online storage data file calculated by the calculating means (claim 1).

Patent Literature 2 describes a file management device for automatic log-in to a plurality of online storage services, in which the device has a user interface viewing and receiving operational input of files in online storage in the same manner as files present locally, and in which file operations of the user received by the user interface are reflected in the files in online storage using file operation information (claim 1).

Patent Literature 3 describes an optimum placement method for files in which the client has a fuzzy membership function numerically quantifying and representing the processing request level of a user and the usage condition status of a server, attribute data such as a processing request and file size is added to a file, file placement rules determining the validity of a file assignment to a server are added based on the processing request and server usage status, and the client references the fuzzy membership function based on the attribute data of the file, selects the optimum file placement rules, and selects the optimum placement of the file according to the selected file placement rules (claim 4).

Patent Literature 4 describes a file server system in which a load information monitoring means is provided in each of a plurality of file servers to measure the load status of each of the plurality of file servers (claim 1), in which the load information monitoring means includes means for counting the number of unprocessed file access requests in each of the plurality of file servers (claim 2), in which a file access request allocating means includes a file dividing and allocating means for referencing the load status measured by the load information monitoring means and selecting a file server to store a file when writing a file (claim 3), and in which the file dividing and allocating means is provided with a file dividing and allocating means for selecting at least two file servers for storing files to be written (claim 4).

Patent Literature 5 describes an electronic filing device including a classification/keyword adding means for adding a classification and a search keyword indicating the content of the classification to a recorded document, a document storing means for storing the document in accordance with the classification and search keyword added by the adding means, a classification selecting means for selecting the classification for a plurality of hierarchical levels in a document classification directory from among the classifications stored in the document storage means, an individual document management information storing means for storing the classifications for each hierarchical level of a document classification directory selected by the selecting means for storage as individual document storage information for each user, a document retrieval means for retrieving documents with the same search keyword from the document storage means based on the classifications of each hierarchical level in the individual document storage information stored by the storing means, and a link information storage means for storing, along with the classifications of each hierarchical level of the document classification direction, link information for each document with the same search keyword retrieved by the retrieval means (claim 1).

Patent Literature 6 describes a method allowing a computer connected communicably to a policy server to determine the confidentiality level of document information (claim 1).

Patent Literature 7 describes a method allowing a computer to determine the priority of processing for classifying a plurality of documents (claim 1).

Patent Literature 8 describes a file management device including an attribute content managing means for managing the attributes and content of a file required for filing and a filing model, and a registration-request reference file (claim 1).

Patent Literature 9 describes a virtual file management system for managing files in a plurality of servers using virtual file identifiers, which has a management table storing a pair consisting of the server name housing the actual data and the actual file identifier in the server for each virtual file identifier (claim 1).

CITATION LIST

Patent Literature

| Patent Literature 1 | Laid open Patent Publication No. 2011-197939 |
| Patent Literature 2 | Laid open Patent Publication No. 2010-287104 |
| Patent Literature 3 | Laid open Patent Publication No. 5-307532 |
| Patent Literature 4 | Laid open Patent Publication No. 6-332782 |
| Patent Literature 5 | Laid open Patent Publication No. 9-81585 |
| Patent Literature 6 | Laid open Patent Publication No. 2012-68833 |
| Patent Literature 7 | Laid open Patent Publication No. 2012-68837 |
| Patent Literature 8 | Laid open Patent Publication No. 9-44393 |
| Patent Literature 9 | Laid open Patent Publication No. 10-3421 |

SUMMARY OF INVENTION

Technical Problems

A purpose of the present invention is to enable the user of storage clouds to use of a plurality of storage clouds without the user of storage clouds being aware of which data is being entrusted to which storage cloud and without sacrificing safety or ease-of-use.

Another purpose of the present invention is to enable automatic re-selection of the appropriate storage cloud. Still another purpose of the present invention is to enable reliable compliance with company policy by automatically re-selecting the appropriate storage cloud.

Another purpose of the present invention is to provide a transparent view of a plurality of storage cloud services. Yet another purpose of the present invention is to be able to provide different folder views based on rules which limit use or placeable file types, or impose expiration dates on browsing.

Solution to Problems

The present invention provides a technique for selecting at least one storage cloud to store an entity file storable in a cloud-utilizing terminal from among a plurality of storage clouds connected via a network to the cloud-utilizing terminal. The present invention also provides a technique for managing an entity file storage in a storage cloud using virtual folders. Both of these techniques include methods, computers (especially, cloud-utilizing terminals), computer programs, and computer program products.

The present invention is a method for selecting at least one storage cloud to store an entity file storable in a cloud-utilizing terminal from among a plurality of storage clouds connected via a network to the cloud-utilizing terminal. The cloud-utilizing terminal has a virtual folder able to display links associated with entity files stored in each storage cloud. The cloud-utilizing terminal executes a step of referencing the attributes or context of a first entity file, or the attributes of a first virtual folder and each attribute of a plurality of storage clouds, in response to the creation or update of the first entity file in the first virtual folder in the cloud-utilizing terminal, and selecting at least one storage cloud from among a plurality of storage clouds for storing the first entity file so as to satisfy predefined rules. Here, the first entity file in the cloud-utilizing terminal is uploaded to the storage cloud selected by the cloud-utilizing terminal (referred to below as the "first storage cloud"), and a link to the uploaded first entity file is displayed in the first virtual folder.

The present invention is also a method for managing using a virtual folder an entity file able to be stored in a storage cloud. A cloud-utilizing terminal connectable to a storage cloud via a network is able to display a link associated with an entity file stored in each storage cloud, and the cloud-utilizing terminal executes the steps of referencing the attributes or context of a first entity file, or the attributes of a first virtual folder and each attribute of a plurality of storage clouds, in response to the creation or update of the first entity file in the first virtual folder in the cloud-utilizing terminal, and selecting at least one storage cloud from among a plurality of storage clouds for storing the first entity file so as to satisfy predefined rules, uploading the first entity file in the cloud-utilizing terminal to the storage cloud selected by the cloud-utilizing terminal (referred to below as the "first storage cloud"), and creating a first link to the uploaded first entity file, and displaying the created first link in the first virtual folder. The first entity file is then deleted from the first virtual folder.

Also, the present invention provides a computer program and computer program product able to execute each step of the method in a cloud-utilizing terminal.

The present invention also provides a cloud-utilizing terminal connectable to a plurality of storage clouds via a network. The cloud-utilizing terminal includes virtual folder generating means for generating a virtual folder able to display links associated with the entity files stored in each storage cloud, selecting means for referencing the attributes or context of a first entity file, or the attributes of a first virtual folder and each attribute of a plurality of storage clouds, in response to the creation or update of the first entity file in the first virtual folder in the cloud-utilizing terminal, and selecting at least one storage cloud from among a plurality of storage clouds for storing the first entity file so as to satisfy predefined rules, uploading means for uploading the first entity file in the cloud-utilizing terminal to the selected storage cloud, and displaying means for displaying in the first virtual folder the link to the first entity file uploaded to the selected storage cloud.

Also, the scope of the present invention includes not only the computer program, but the recording medium on which the computer program is recorded. A computer program for executing the functions of the present invention can be stored on any computer-readable recording medium, including a flexible disk, MO, CD-ROM, DVD, BD, hard disk device, USB memory, ROM, MRAM or RAM. The computer program can also be downloaded from another data processing system connected to a communication network for storage on a recording medium, or can be copied from another recording medium. The program can also be compressed, divided into a plurality of programs, and recorded on one or more recording media. A computer program product embodying the present invention can take a variety of forms. The computer program product can include, for example, the recording medium on which the computer program is stored or a transmission medium over which the computer program is transmitted.

The summary of the present invention provided above is not intended to enumerate all of the required features of the present invention, and it is to be understood that the present invention includes all combinations and sub-combinations of these constituent elements.

It should also be clear that a person of skill in the art could conceive of various changes such as combining a plurality of machines and allocating functions to these machines to embody the hardware configurational elements of the information processing device used in the embodiment of the present invention. These changes are encompassed within the concept of the present invention. However, these configurational elements are for illustrative purposes only, and all of the configurational elements are not essential configurational elements of the present invention.

Also, the present invention can be realized by hardware, software, or a combination of hardware and software. When the present invention is executed by a combination of hardware and software, it is typically executed by a device in which the computer program has been installed. Here, the computer program is downloaded to the memory of the device and executed. The computer program then controls the device and executes the processing of the present invention. This computer program can be configured from groups of instructions expressed in any language, code or notation. The device can execute the specific functions in the group of instructions immediately, or after (1) converting the group of instructions into another language, code or notation, and/or (2) copying the group of instructions to another medium.

Effect of the Invention

By providing a function for storing or distributing entity files to storage clouds so as to satisfy predefined rules, and by providing an integrated folder view for displaying entity files distributed to a plurality of storage clouds in virtual folders according to an embodiment of the present invention, a plurality of storage clouds can be utilized without the user of cloud storage being aware and without sacrificing safety or ease-of-use.

By re-evaluating entity files, for example, based on any changes to the content, so as to satisfy predefined rules according to an embodiment of the present invention, the appropriate storage cloud can be automatically re-selected. Also, by automatically re-selecting storage clouds, compliance with company policy can be as stringent as possible.

A view of virtual folders (referred to below as the "virtual folder view") can be provided transparently according to an embodiment of the present invention.

BRIEF DESCRIPTION OF DRAWINGS

FIG. 4A shows an example of the attributes of storage clouds that may be used in an embodiment of the present invention.

FIG. 4B shows an example of the attributes of storage clouds that may be used in an embodiment of the present invention.

FIG. 17 shows a flowchart for selecting at least one storage cloud for storing an entity file in a cloud-utilizing terminal according to an embodiment of the present invention.

DESCRIPTION OF EMBODIMENT

The following is an explanation of embodiments of the present invention with reference to the drawings. In all of the drawings, identical objects are denoted by the same reference numbers unless otherwise indicated. The embodiments of the present invention are used to explain the best mode of carrying out the present invention, and are not intended to limit the scope of the present invention in any way.

Figure 1A:
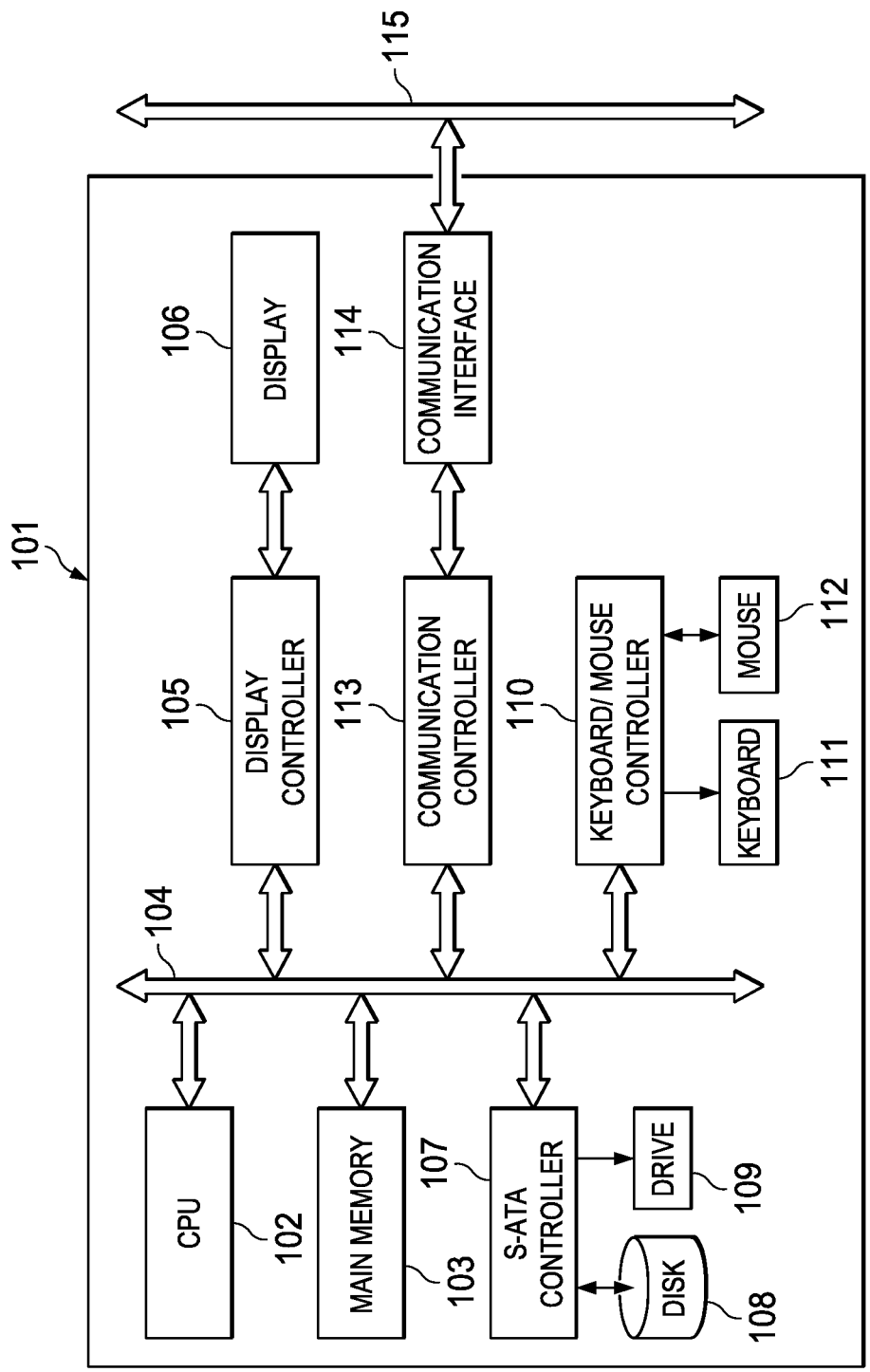
FIG. 1A is a diagram showing an example of the hardware configuration used to embody the computer or cloud-utilizing terminal in an embodiment of the present invention.

FIG. 1A is a diagram showing an example of the hardware configuration used to embody the computer or cloud-utilizing terminal in an embodiment of the present invention. This computer (101) includes a CPU (102) and a main memory (103), and these are connected to a bus (104). The CPU (102) is preferably based on a 32-bit or 64-bit architecture. Examples that can be used include the Core i (trademark) series, Core 2 (trademark) series, Atom (trademark) series, Xeon (trademark) series, Pentium (registered trademark) series or Celeron (registered trademark) series from Intel, the Phenom (trademark) series, Athlon (trademark) series, Turion (trademark) series, or Sempron (trademark) from Advances Micro Devices, the A series from Apple Computer, or CPU for an Android terminal. A display (106) such as a liquid crystal display (LCD) is connected to the bus (104) via a display controller (105). The display (106) may be used to control the computer and to display on an appropriate graphic interface information from a computer connected to the network via a communication line and information related to the software running on the computer. A disk (108), such as a silicon disk or hard disk, and a drive (109), such as a CD, DVD or BD drive may be connected to the bus (104) via a SATA or IDE controller (107). A keyboard (111) and mouse (112) may be connected to the bus (104) via a keyboard/mouse controller (110) or USB bus (not shown).

Programs, such as the operating system, a Java (registered trademark) processing environment such as J2EE, Java (registered trademark) applications, Java (registered trademark) virtual machines (VM), and Java (registered trademark) just-in-time (JIT) compilers, as well as other programs and data, are stored on the disk (108) for loading into the main memory (103).

If necessary, a drive (109) may be used to install a program on the disk (108) from the CD-ROM, DVD-ROM or BD.

The communication interface (114) can use, for example, an Ethernet (registered trademark) protocol. The communication interface (114) is connected to a bus (104) via a communication controller (113), and functions to physically connect the computer (101) to the communication network (115). This provides a network interface layer for the TCP/IP communication protocol in the communication function of the operating system of the computer (101). The communication line can be based on a wired LAN environment, or based on a wireless LAN environment, for example, a Wi-Fi standard such as IEEE802.11a/b/g/n.

There are no particular restrictions on the cloud-utilizing terminal as long as the terminal is able to access a storage cloud via a network. Examples of cloud-utilizing terminals include personal computers, portable information terminals (such as tablet PCs, tablet terminals, e-book readers, and handheld computers), mobile telephones (such as smartphones), gaming devices, mobile music devices, digital cameras, video recorders, television recording devices, televisions, and car navigation systems.

Cloud refers to cloud computing or cloud services. The storage clouds that can be used in the embodiments of the present invention are one aspect of the cloud. It is not determined merely by the name "storage cloud". Any other name could be used as long as it provides a service related to the storage of entity files. Also, the storage clouds that can be used in the embodiments of the present invention may provide any service other than those related to the storage of entity files. Clouds include public clouds deployed on the internet and provided to general users, private clouds constructed by a company for its own use (for example, inside a firewall), hybrid clouds combining a public cloud with a private cloud, community clouds used jointly by particular groups or groups of companies, virtual private clouds that can divide a public cloud virtually into user areas for use as private clouds, and multi-clouds which is a use-specific cloud constructed across a plurality of cloud services. Storage clouds that can be used in embodiments of the present invention are similar. Herein, the term "entity file" is used to distinguish it from the term "link", but has the same meaning as file.

Figure 1B:
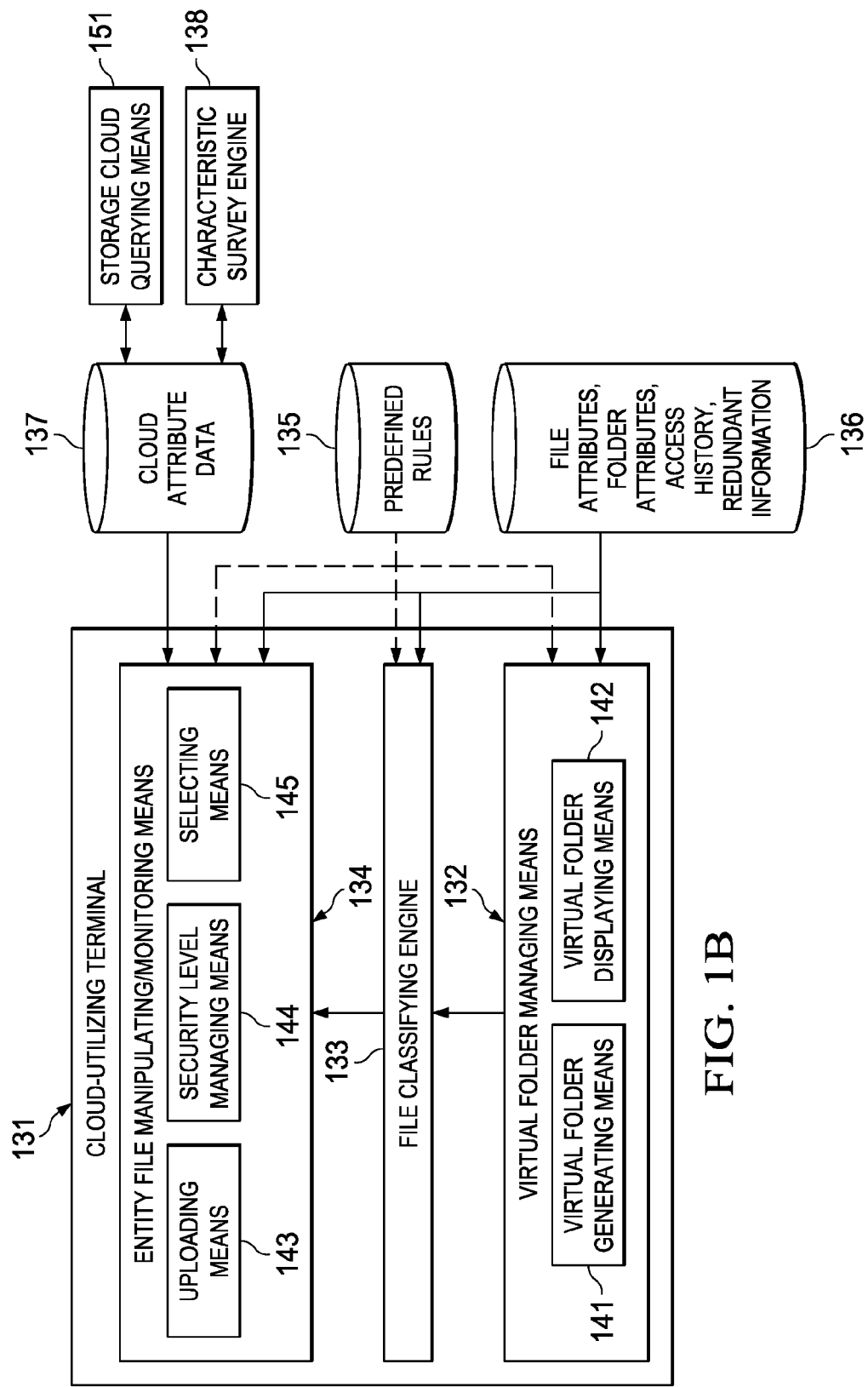
FIG. 1B is a function block diagram of a computer according to an embodiment of the present invention using the preferred hardware configuration shown in FIG. 1A.

FIG. 1B is a function block diagram of a computer (131), more specifically, a cloud-utilizing terminal, according to an embodiment of the present invention using the preferred hardware configuration shown in FIG. 1A. The cloud-utilizing terminal (131) may have the same configurational elements as the computer (101) shown in FIG. 1A, for example, a CPU (102), main memory (103) and disk (108). Also, the cloud-utilizing terminal (131) may have a virtual folder managing means (132), a file classifying engine (133), and an entity file manipulating/monitoring means (134).

The virtual folder managing means (132) may have a virtual folder generating means (141) and a virtual folder displaying means (142).

A virtual folder is a folder that may display links associated with entity files stored in each storage cloud. Therefore, the files stored in the virtual folder are, in principle, links to entity files stored in specific storage clouds satisfying predefined rules or in synchronizing folders associated with these storage clouds. Therefore, a virtual folder may display icons to these links inside the virtual folder.

Also, virtual folders may store entity files under certain conditions. For example, entity files are stored in a virtual folder in response to the entity file being generated in that virtual folder. For example, entity files are stored in a virtual folder in response to the entity file being moved or copied to the virtual folder. The virtual folder may display an icon to an entity file in the virtual folder in response to the entity file being stored in the virtual folder.

An entity file stored in a virtual folder may be deleted from the virtual folder in response to a link associated with the entity file being created in the virtual folder. A link associated with an entity file may be created based on the entity file being copied or moved to a synchronizing folder or stored in a storage cloud. The link can be created using any method common in the art such as a symbolic link. A symbolic link is a mechanism in which a different name is given to a file and the user or application manipulates the entity file with this name (that is, the file itself) in the same way. An icon indicating an entity file and an icon indicating a link associated with the entity file can have the same design or can have different designs so that they can be differentiated. When an icon indicating a link is the same as an icon indicating an entity file, the user cannot differentiate between an entity file and a link based on the icon. However, there are no problems if the manipulation of an icon indicating a link and an icon indicating an entity file similarly result in the manipulation of the entity file. The icon indicating a link may have the same design as a short cut used in Windows® or an alias used in MacOS®.

A single virtual folder may include display of one or more entity files distributed in each storage cloud as links associated with one or more entity files transparently integrated into the single virtual folder.

A virtual folder may be created using any method common in the art, such as a shell extension plugin. In the method for creating a symbolic link using a shell extension plugin, the user right-clicks on a folder to display a menu, and "create a virtual folder" is selected in the menu. The user may also create a virtual folder, for example, by selecting "create virtual folder" from a menu bar. The icon for a virtual folder may have a different design from an icon for a normal folder.

Virtual folders with different functions may be provided depending upon whether there are limits on the use and format of files stored in the virtual folder, whether there is an expiration date for the virtual folder, or whether the virtual folder requires a password. For example, a warning can be displayed indicating that files with specific labels are to be placed in a virtual folder. When there is an expiration date for the virtual folder, the entity files can be deleted on the cloud-utilizing terminal but maintained in the storage cloud containing the entity files. Also, a virtual folder can require a password to prevent unauthorized access.

The virtual folder generating means (141) generates virtual folders in accordance with instructions from the user. The user may create a virtual folder at any location. These include folders in a specific directory, such as on the desktop or in the my documents folder, or in a folder specified by the user or administrator. The administrator may manage the system so that the places in which virtual folders can be generated are restricted to specific locations.

The virtual folder displaying means (142) displays the created virtual folder on the display device (106). Also, the virtual folder displaying means (142) displays links associated with entity files stored in each storage cloud. In addition, the virtual folder displaying means (142) may temporarily display an entity file icon until the link appears. The icon indicating a link and the icon indicating an entity file can be the same or different. If they are the same, the user cannot tell whether the icon is for a link or an entity file. In other words, the user does not have to know whether the icon represents a link or an entity file.

The file classifying engine (133) extracts attributes using text analysis or natural language processing of the content or context of entity files in a synchronizing folder. Also, the file classifying engine (133) can acquire the context by referencing an external source (for example, the location of the cloud-utilizing terminal or the access frequency of the cloud-utilizing terminal) instead of the entity file itself (for example, revision frequency).

The synchronizing folder is where entity files associated to links in the virtual folder are located. The entity files in the synchronizing folder may be synchronized with storage clouds corresponding to the synchronizing folder. In other words, the revised content in an entity file in the synchronizing folder may be reflected in the entity file corresponding to the storage clouds of the synchronizing folder. Synchronization may include the addition and deletion of entity files. When the storage clouds are cache-less, the synchronizing folder is non-persistent and may be deleted from the cloud-utilizing terminal immediately after synchronization or after a predetermined period of time has elapsed. When the storage clouds are cache-less, links to the URL of a storage cloud (a specific URL) may be used instead of a synchronizing folder. Here, the entity file may be uploaded to the link destination from the cloud-utilizing terminal using, for example, the shell expansion function.

The entity file manipulating/monitoring means (134) may include an uploading means (143), a security level managing means (144), and a selecting means (145). The entity file manipulating/monitoring means (134) can be divided into an entity file manipulating means and an entity file monitoring means, but the entity file manipulating means and the entity file monitoring means do not have to be strictly separated. The uploading means (143) uploads an entity file in the synchronizing folder to a storage cloud corresponding to the synchronizing folder. The uploading means (143) can be strictly separated from the entity file manipulating/monitoring means (134), or the entity file manipulating/monitoring means (134) may include the functions of the uploading means (143). The security level managing means (144) manages the entity files from the standpoint of security. The security level managing means (144) can be strictly separated from the entity file manipulating/monitoring means (134), or the entity file manipulating/monitoring means (134) may include the functions of the security level managing means (144). The selecting means (145) references the content, context or combination of these in the files, the attribute values (136), and the attributes (137) of each storage cloud (referred to as "cloud attribute data") obtained from the storage cloud querying means (151) or the characteristic survey engine (138), selects the storage cloud that satisfies predefined rules (135), and identifies the synchronizing folder or virtual folder (when a synchronizing folder is not used) associated with the selected storage cloud. The selecting means (145) can be strictly separated from the entity file manipulating/monitoring means (134), or the entity file manipulating/monitoring means (134) may include the functions of the selecting means (145).

The cloud-utilizing terminal (131) may store the predefined rules (135) and the various attributes (136) in the storage means (108). Also, the cloud-utilizing terminal (131) may obtain the predefined rules (135) and the various attributes (136) of the cloud-utilizing terminal (131) from a storage means external to the cloud-utilizing terminal (131). The cloud-utilizing terminal (131) may also store cloud attribute data (137). The cloud-utilizing terminal (131) may include a characteristic survey engine (138) to collect cloud attribute data (137). Also, the cloud-utilizing terminal (131) may collect cloud attribute data (137) from a storage cloud querying means (151) outside of the cloud-utilizing terminal (131) (for example, in a server).

The predefined rules (135) are rules that have been defined in advance by the administrator and are used to select a storage cloud. The predefined rules (135) may also be established by company policy. The predefined rules (135) may be written, for example, in XML. How to express predefined rules (135) in XML is self-evident to those skilled in the art, so an explanation has been omitted.

The various attributes (136) may include file attributes (attributes of entity files) or context, folder attributes (attributes of virtual folders), access history, and redundancy information. There are no particular restrictions. Any given attribute may be shared across different classifications of file attributes or contexts, folder attributes, access histories, and redundancy information.

Entity file attributes include, but are not limited to, the following: file name, file format, the presence (or absence) of compression and the compression format, the presence (or absence) of encryption and the encryption method, file size, labels, creation dates, the most recent revision date, the data type (including the text content, image content, and video content), the importance of the content, the creator or administrator, the most recent reviser of the data, or any combination of these items. A label may be added on the basis of DLP (data loss prevention/data leak prevention). For an explanation of DLP, refer to Patent Literature 6, Patent Literature 7, and Japanese Patent Application No. 2010-290465 filed by the present applicant. The attributes of an entity file may be periodically revised.

Virtual folder attributes include, but are not limited to, the following: the use of a file stored in the virtual folder, the file format, the expiration date, the presence (or absence) of a password for accessing the virtual folder, the presence (or absence) of sharing of the virtual folder with other users, the ability (or lack of ability) to create subfolders, the presence (or absence) of virtual folder encryption, the creator or administrator, the users able to access the folder, security, and a password, or any combination of these. The attributes of the virtual folder may be established, for example, using the shell expansion function. The attributes of a virtual folder may be periodically revised.

The access history may include, for example, when the user accessed a file, the initial access date, the most recent access date, and the name of the user. The access history may be periodically updated.

The redundancy information may be information providing for redundancy in the file (that is, duplicates). The redundancy information includes, but is not limited to, the following:

When the same entity file is to be stored in a plurality of storage clouds, a link is established in a synchronizing folder (when a synchronizing folder is used) associated with any storage cloud inside a virtual folder or in any storage cloud (when a synchronizing folder is not used) in accordance with the priority defined in the predefined rules, and association information with other storage clouds is stored separately.

The entity files in a synchronizing folder associated with all of the storage clouds is monitored, and changes to an entity file in a synchronizing folder associated with a given storage cloud are automatically reflected in a synchronizing folder associated with another storage cloud.

When the entity file at a link destination with the first priority has been deleted, a link with the next priority is recreated or the entity file in all associated storage clouds is deleted (as either selected by the user or dictated by the predefined rules).

An entity file is converted to a different format and stored in each storage cloud in order to provide an environment in which it can be browsed on a different terminal such as a tablet terminal or smartphone.

The context of the entity file includes, but is not limited to, the following: the revision frequency, utilization frequency, hours worked, workflow status, presence (or absence) of a process being up and running, another entity file associated with the entity file, the name of another entity file being edited at the same time as the entity file, the name of an application being started up at the same time, the role of the user, the location of the user, the current location of the cloud-utilizing terminal, the access frequency of the cloud-utilization terminal, or any combination of these. The context of the entity file may be obtained from the entity file, or may be obtained by referencing an outside device such as a storage medium (136) for storing the context of entity files.

The cloud attribute data (137) may be the characteristics of the service of the storage cloud. The cloud attribute data (137) includes, but is not limited to, the following: the service period, availability (for example, the average occupancy during the period), stability, performance (for example, throughput and bandwidth), redundancy (for example, the backup system and RAID type), location of the storage cloud, billing system, monthly fee or capacity fee, capacity limit (for example, a monthly capacity limit or the maximum size per file), file storage expiration date, contract period, number of connectable clients, number of contracted users, evaluation ranking by a third-party organization, data format system for support, access control system, recovery time objectives, guaranteed response time, security (for example, encryption system) or security level, inspection, multi-tenancy, or any combination of these. The attributes in the cloud attribute data may be periodically updated.

The characteristic survey engine (138) may periodically send and receive test files from each storage cloud to survey the characteristics of the storage clouds (that is, the cloud attribute data). The characteristic survey engine (138) may, for example, be used to obtain the availability, performance, or a combination of these. Also, the characteristic survey engine (138) may determine the availability and performance in the location information for each cloud-utilizing terminal. The location information may be obtained from cloud-utilizing terminals using an existing technology. For example, the location information may be identified using GPS installed in the cloud-utilizing terminals, WiFi access points for the cloud-utilizing terminals, the IP address obtained by cloud-utilizing terminals from the network, or a card with an embedded IC chip used by the user of the cloud-utilizing terminals to identify his or her location. Also, the characteristic survey engine (138) may survey the data stability if necessary from the presence or absence of entity files. The characteristic survey engine (138) may be included in the cloud-utilizing terminal (131). The characteristic survey engine (138) may also be connected to the cloud-utilizing terminal (131) as an external device such as an IC chip or USB device.

The storage cloud querying means (151) may be installed in a server connectable to the storage clouds. As in the case of the characteristic survey engine (138), the storage cloud querying means (151) may periodically send and receive test files to the storage clouds to survey the characteristics (that is, cloud attribute data) of the storage clouds.

Figure 2:
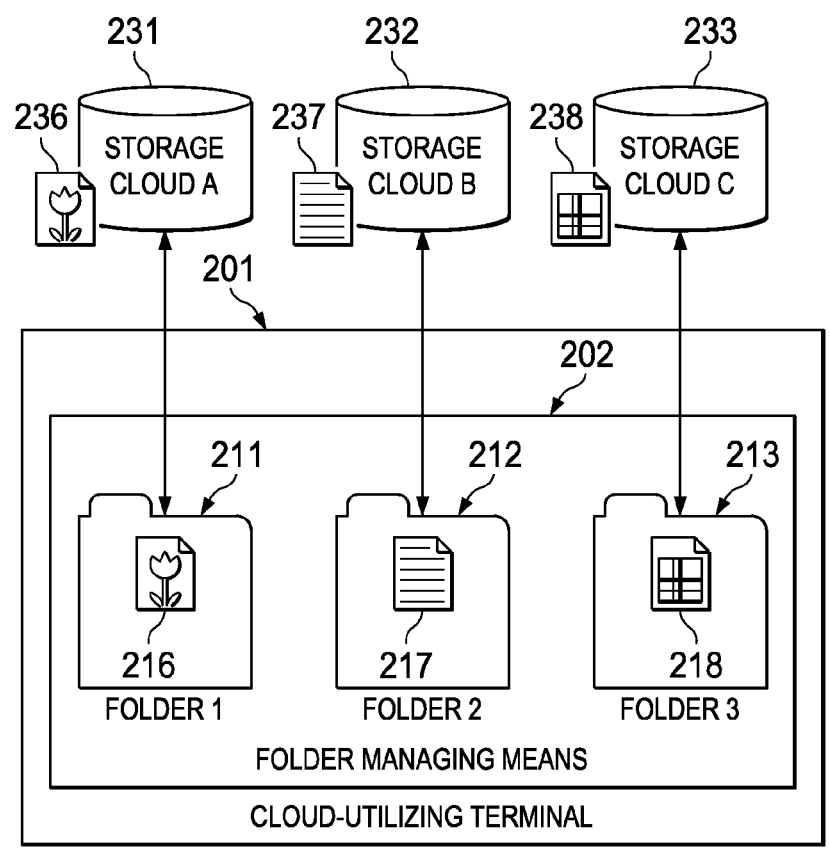
FIG. 2 illustrates view folders in a cloud-utilizing terminal showing files stored in various types of storage clouds according to a previous embodiment.

FIG. 2 illustrates view folders in a cloud-utilizing terminal showing files stored in various types of storage clouds according to a previous embodiment. In the previous embodiment shown in FIG. 2 (referred to below as the "embodiment shown in FIG. 2"), the cloud-utilizing terminal (201) includes a folder managing means (202). The folder managing means (202) manages folders. These folders are also view folders. In addition, the cloud-utilizing terminal (201) is connected via a network to storage cloud A (231), storage cloud B (232), and storage cloud C (233).

The folder managing means (202) detects the creation, copying or moving of an entity file (216) in folder 1 (211). When any of these operations has been detected, the folder managing means (202) uploads the entity file (216) to storage cloud A (231) associated with folder 1 (211). Similarly, the folder managing means (202) detects the creation, copying or moving of an entity file (217) in folder 2 (212). When any of these operations has been detected, the folder managing means (202) uploads the entity file (217) to storage cloud B (232) associated with folder 2 (212). Similarly, the folder managing means (202) detects the creation, copying or moving of an entity file (218) in folder 3 (213). When any of these operations has been detected, the folder managing means (202) uploads the entity file (228) to storage cloud C (233) associated with folder 3 (213).

In the embodiment shown in FIG. 2, there is a one-to-one correspondence between each folder (211, 212, 213) in the cloud-utilizing terminal (201) and the storage clouds A-C (231, 232, 233). Therefore, the storage of a data (entity file) in a storage cloud depends on the folder, and this operation is left up to the user. Therefore, each folder (211, 212, 213) functions as a synchronizing folder for each storage cloud A-C (231, 232, 233). Therefore, the user has to distinguish and manage the folder for each storage cloud, and has to be aware of which data has been stored with which storage cloud service. Also, storage (that is, storage cloud) at a data storage center depends on folders. In addition, the storage clouds at the data storage centers and the view (that is, folder view) in the data display method depend on each other. Therefore, the user sacrifices storage cloud convenience and folder ease-of-use.

Figure 3A:
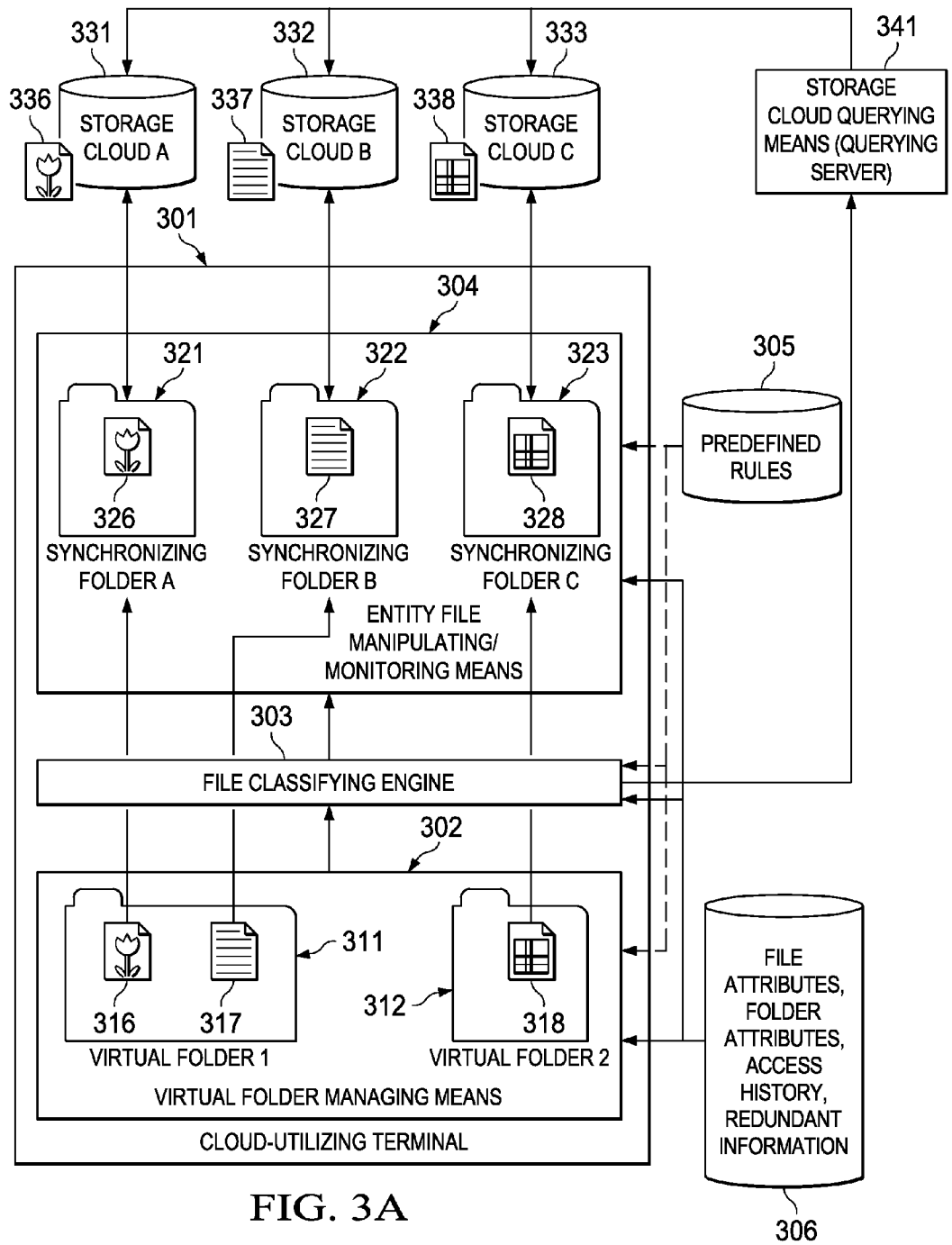
FIG. 3A illustrates view folders in a cloud-utilizing terminal showing files stored in various types of storage clouds according to an embodiment of the present invention.
Figure 3B:
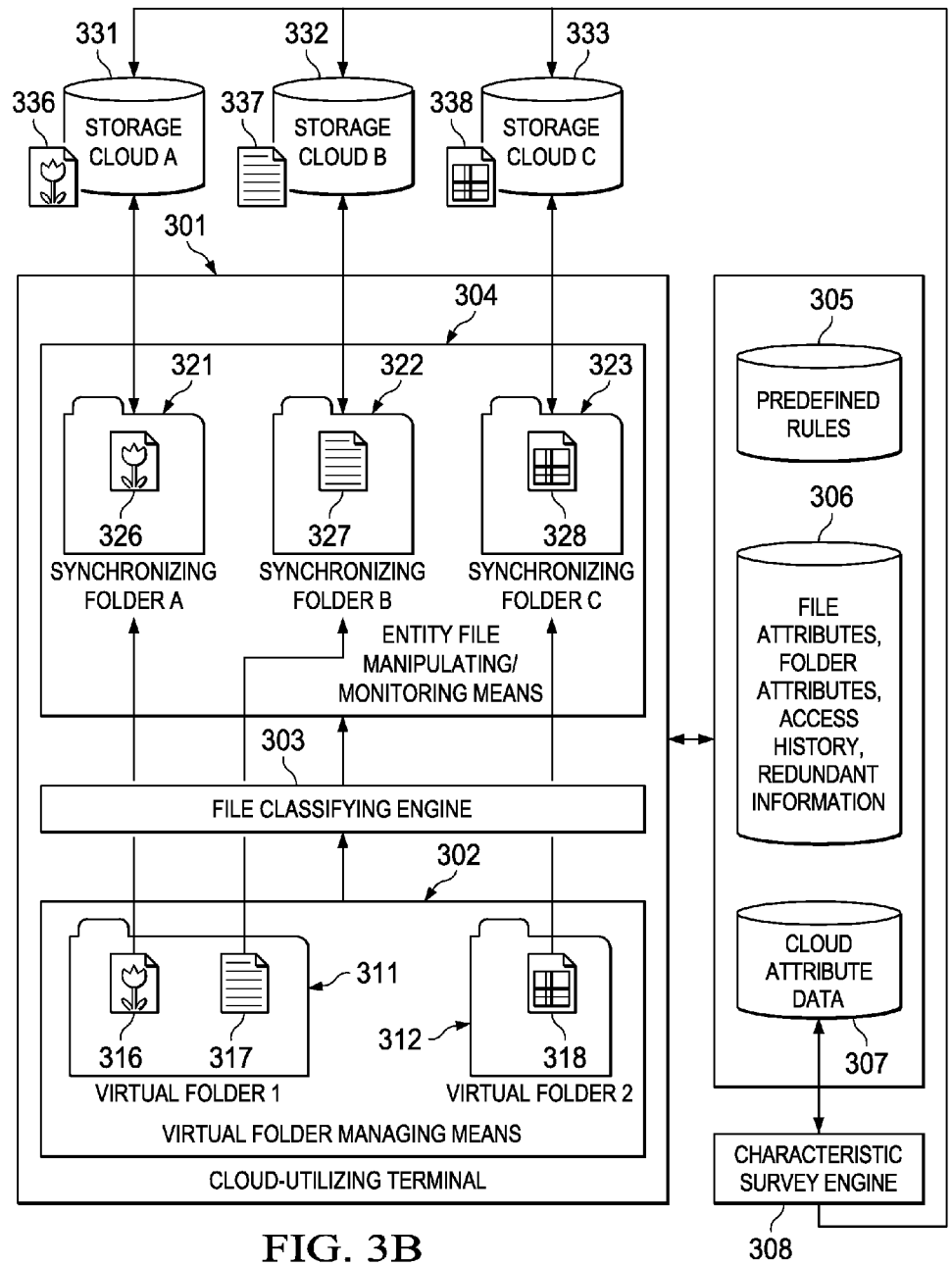
FIG. 3B illustrates view folders in a cloud-utilizing terminal showing files stored in various types of storage clouds according to an embodiment of the present invention.

FIG. 3A and FIG. 3B illustrate view folders in a cloud-utilizing terminal showing files stored in various types of storage clouds according to an embodiment of the present invention.

In both FIG. 3A and FIG. 3B, the cloud-utilizing terminal (301) includes a virtual folder managing means (302), a file classifying engine (303), and an entity file manipulating/monitoring means (304). The cloud-utilizing terminal (301) is also connected via a network to storage cloud A (331), storage cloud B (332), and storage cloud C (333).

The following is an explanation of the embodiment of the present invention shown in FIG. 3A (referred to below as the "embodiment shown in FIG. 3A).

The folder managing means (302) detects the creation, copying or moving of an entity file (316) in folder 1 (311). When any of these operations has been detected, the folder classifying engine (303) uses text analysis or natural language processing to extract attributes from the contents and any context of the detected entity file (316). The selecting means (145) in the entity file manipulating means (304) (referred to below simply as the "entity file manipulating means") references the contents, various attribute values (306), and the cloud attribute data obtained from the storage cloud querying means (341), selects storage cloud A (331) satisfying the predefined rules (305), and identifies synchronizing folder A (321) associated with the selected storage cloud A (331). The uploading means (143) in the entity file manipulating means (304) (referred to below simply as the "entity file manipulating means") moves the entity file (316) in the virtual folder 1 (311) to the identified synchronizing folder A (321). In response to this movement, the virtual folder managing means (302) displays a link to the entity file (326) moved to synchronizing folder A (321) in virtual folder 1 (311). The entity file manipulating means (304) uploads the entity file (326) in synchronizing folder A (321) to storage cloud A (331) associated with synchronizing folder A (321). Storage cloud A (331) stores the entity file (336) uploaded to storage cloud A (331).

Similarly, the folder managing means (302) detects the creation, copying or moving of an entity file (317) in folder 1 (311). When any of these operations has been detected, the folder classifying engine (303) uses text analysis or natural language processing to extract attributes from the contents and any context of the detected entity file (317). The entity file manipulating means (304) references the contents, various attribute values (306), and the cloud attribute data obtained from the storage cloud querying means (341), selects storage cloud B (332) satisfying the predefined rules (305), and identifies synchronizing folder B (322) associated with the selected storage cloud B (332). The entity file manipulating means (304) moves the entity file (317) in the virtual folder 1 (311) to the identified synchronizing folder B (322). In response to this movement, the virtual folder managing means (302) displays a link to the entity file (327) moved to synchronizing folder B (322) in virtual folder 1 (311). The entity file manipulating means (304) uploads the entity file (327) in synchronizing folder B (322) to storage cloud B (332) associated with synchronizing folder B (322). Storage cloud B (332) stores the entity file (337) uploaded to storage cloud B (332).

Similarly, the virtual folder managing means (302) detects the creation, copying or moving of an entity file (318) in folder 2 (312). When any of these operations has been detected, the folder classifying engine (303) uses text analysis or natural language processing to extract attributes from the contents and any context of the detected entity file (318). The entity file manipulating means (304) references the contents, various attribute values (306), and the cloud attribute data obtained from the storage cloud querying means (341), selects storage cloud C (333) satisfying the predefined rules (305), and identifies synchronizing folder C (323) associated with the selected storage cloud C (333). The entity file manipulating means (304) moves the entity file (318) in the virtual folder 2 (312) to the identified synchronizing folder C (323). In response to this movement, the virtual folder managing means (302) displays a link to the entity file (328) moved to synchronizing folder C (323) in virtual folder 2 (312). The entity file manipulating means (304) uploads the entity file (328) in synchronizing folder C (323) to storage cloud C (333) associated with synchronizing folder C (323). Storage cloud C (333) stores the entity file (338) uploaded to storage cloud C (333).

In the embodiment shown in FIG. 3A, the file (316) in virtual folder A (311) was stored in storage cloud A (331), and the file (317) in virtual folder A (311) was stored in storage cloud B (332). Thus, when there is a plurality of files in the same virtual folder (that is, in a single virtual folder), the files do not have to be stored in the same storage cloud. They can be distributed to a plurality of storage clouds. Also, the user does not have to be conscious or aware of which storage cloud the files are stored in.

In the prior art, as shown for example in FIG. 2, two different files are distributed to, and managed and displayed in different folders (211 and 212) in the cloud-utilizing terminal (201). However, as shown in the embodiment of the present invention in FIG. 3A, two different files can be integrated and displayed in a single virtual folder (311) in the cloud-utilizing terminal (301). In other words, in the embodiment shown in FIG. 3A, the virtual folders (311 and 312) in the cloud-utilizing terminal (301) and the storage clouds A-C (331, 332 and 333) do not have a one-to-one correspondence. This means a particular folder (that is, virtual folder) in the cloud-utilizing terminal is not associated with a synchronizing folder. Thus, in the embodiment of the present invention, the files distributed to each storage service can be displayed in a transparently integrated virtual folder (that is, view). This means that the user can create and manage a virtual folder from the standpoint of the view, for example, a virtual folder limited to files related to a particular project or a virtual folder limited to files of a particular format, but that the files stored in a single virtual folder can be distributed and managed in different storage clouds.

In the embodiment shown in FIG. 3A, a storage cloud is selected to satisfy predefined rules (305), and a particular folder in a cloud-utilizing terminal is dynamically associated with a synchronizing folder associated with the selected storage cloud. The storage of data (entity files) in a given storage cloud is automatically determined to satisfy predefined rules (305). Therefore, the user does not have to distribute and manage folders in each storage cloud, and does not even have to be conscious or aware of how the data has been assigned to storage cloud services. Also, storage at a particular data storage center (that is, storage cloud) does not depend on the folder (that is, storage is independent). Thus, for the user, storage in storage clouds is convenient and folders are easier to use.

The following is an explanation of the embodiment of the present invention shown in FIG. 3B (referred to below as the "embodiment shown in FIG. 3B").

Instead of the storage cloud querying means (341) in the embodiment shown in FIG. 3A, the embodiment shown in FIG. 3B uses a characteristic survey engine (308). Therefore, in the embodiment shown in FIG. 3B, the cloud attribute data is provided by the characteristic survey engine (308). Because the rest of the embodiment is identical to the embodiment shown in FIG. 3A, further explanation has been omitted.

A characteristic survey engine (308) may be used when the user of the cloud-utilizing terminal does not belong to an organization such as a company or government agency but is using the terminal for personal (private) reasons. In the following embodiment, the characteristic survey engine (308) is being used in a situation in which the cloud-utilizing terminal is being used by the user for private reasons. Because the user uses storage clouds according to an embodiment of the present invention, it is important that the user understand that the characteristics of the storage clouds (that is, the cloud attribute data) serve as the defined rules. In one example, the characteristic survey engine (308) in the cloud-utilizing terminal may periodically send and receive test files to the storage clouds to survey the characteristics (that is, cloud attribute data) of the storage clouds so that the user understands those characteristics. The results obtained by the characteristic survey engine (308) are stored in the cloud-attribute data (307).

When the attributes cannot be surveyed using the characteristic survey engine (308), the user has to (manually) enter these attributes based on materials obtained from the storage clouds, for example, the terms of use. The attributes obtained from these materials by the user may include the following: storage cloud capacity; file expiration date (files stored in a storage cloud which will disappear after a predetermined period of time regardless of access, or files stored in a storage cloud which will disappear when there is no access for a predetermined period of time); the maximum size per file uploadable to a storage cloud; automatic operation permission (use of the characteristic survey engine (308) when the storage cloud does not allow for automatic operations); whether or not a storage cloud account has been deleted when there has been no access after a predetermined period of time; redundancy such as the presence (or absence) of backup; and security (encrypted storage of files) or security level.

FIG. 4A and FIG. 4B show an example of the attributes of storage clouds that may be used in an embodiment of the present invention. The attributes for storage clouds A-F shown in FIG. 4A are service period, availability, performance, redundancy, location of servers realizing the storage cloud, security, monthly fee, and maximum capacity. Here, the attribute "availability" is the average occupancy rate during the period. The attribute "performance" is the throughput. The attribute "server location" is "external accessibility", which means the storage cloud is connected to the general lines including connection to a WAN accessible to anyone without a firewall, and which can be accessed outside of the company or organization, such as at the user's residence. The attributes of the storage clouds G-I shown in FIG. 4B are service period, availability, performance, redundancy, security, maximum capacity per file, expiration date, monthly fee, and maximum capacity.

The attributes of the storage cloud may change over time. Therefore, the attributes of the storage clouds are periodically queried and updated by a storage cloud querying means (341) in a querying server connectable to each storage cloud via a network, or are periodically queried and updated by a characteristic survey engine (308) in the cloud-utilizing terminal.

Figure 5A:
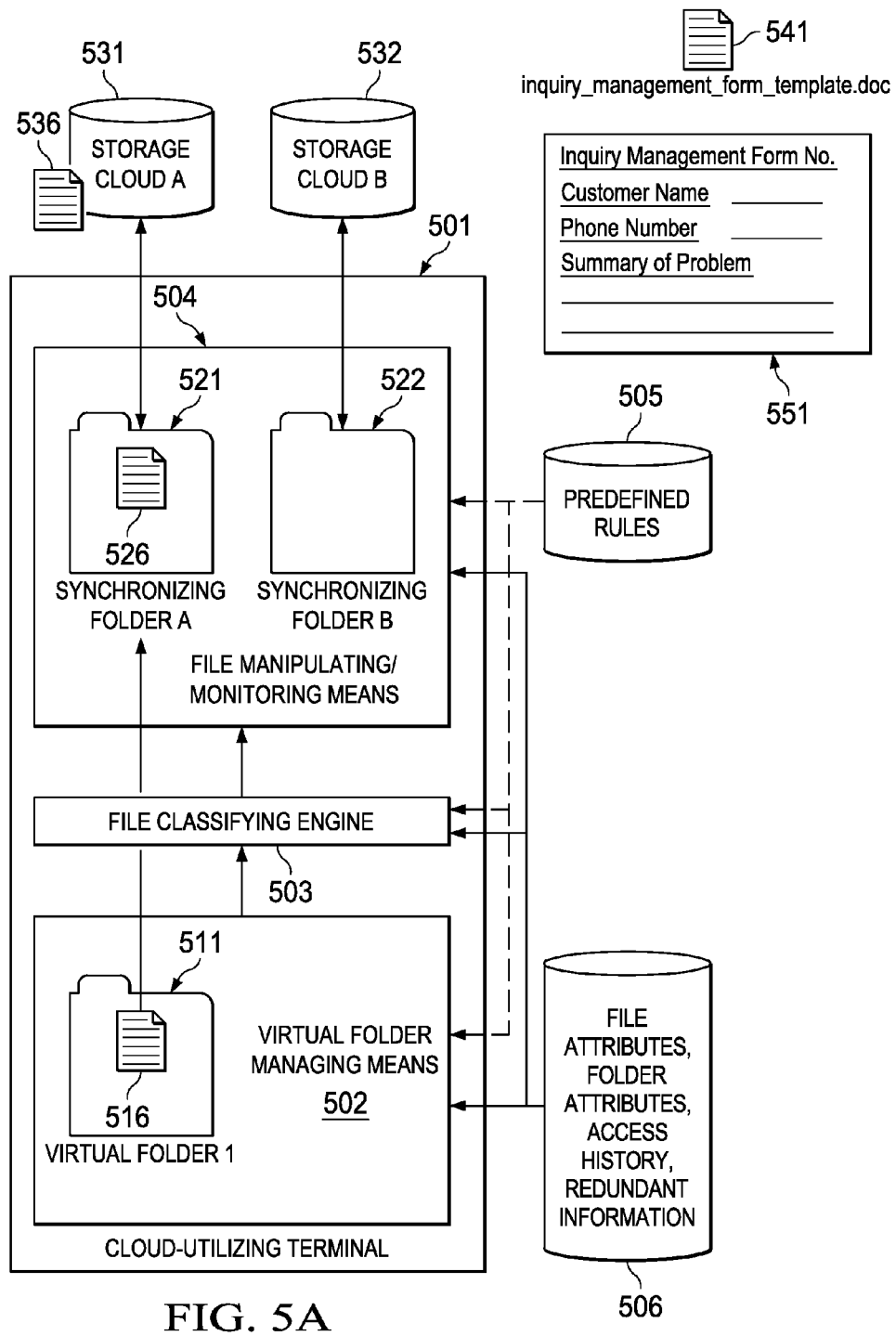
FIG. 5A shows an example of an entity file used by an employee of a call center, and an example of storage cloud synchronization of the entity file in the cloud-utilizing terminal using synchronizing folders according to an embodiment of the present invention.
Figure 5B:
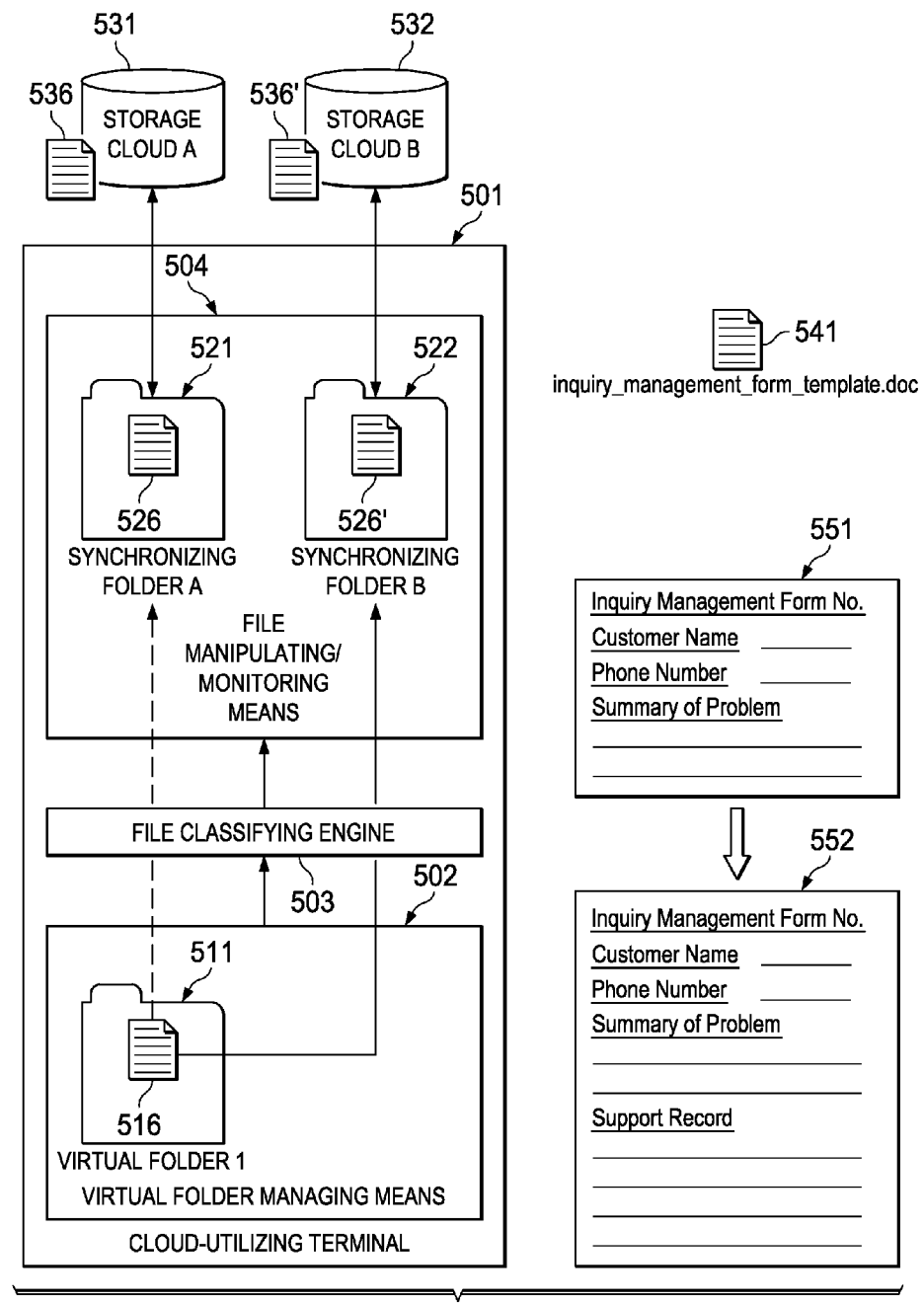
FIG. 5B shows an example of an entity file used by an employee of a call center, and an example of storage cloud synchronization of the entity file in the cloud-utilizing terminal using synchronizing folders according to an embodiment of the present invention.
Figure 5C:
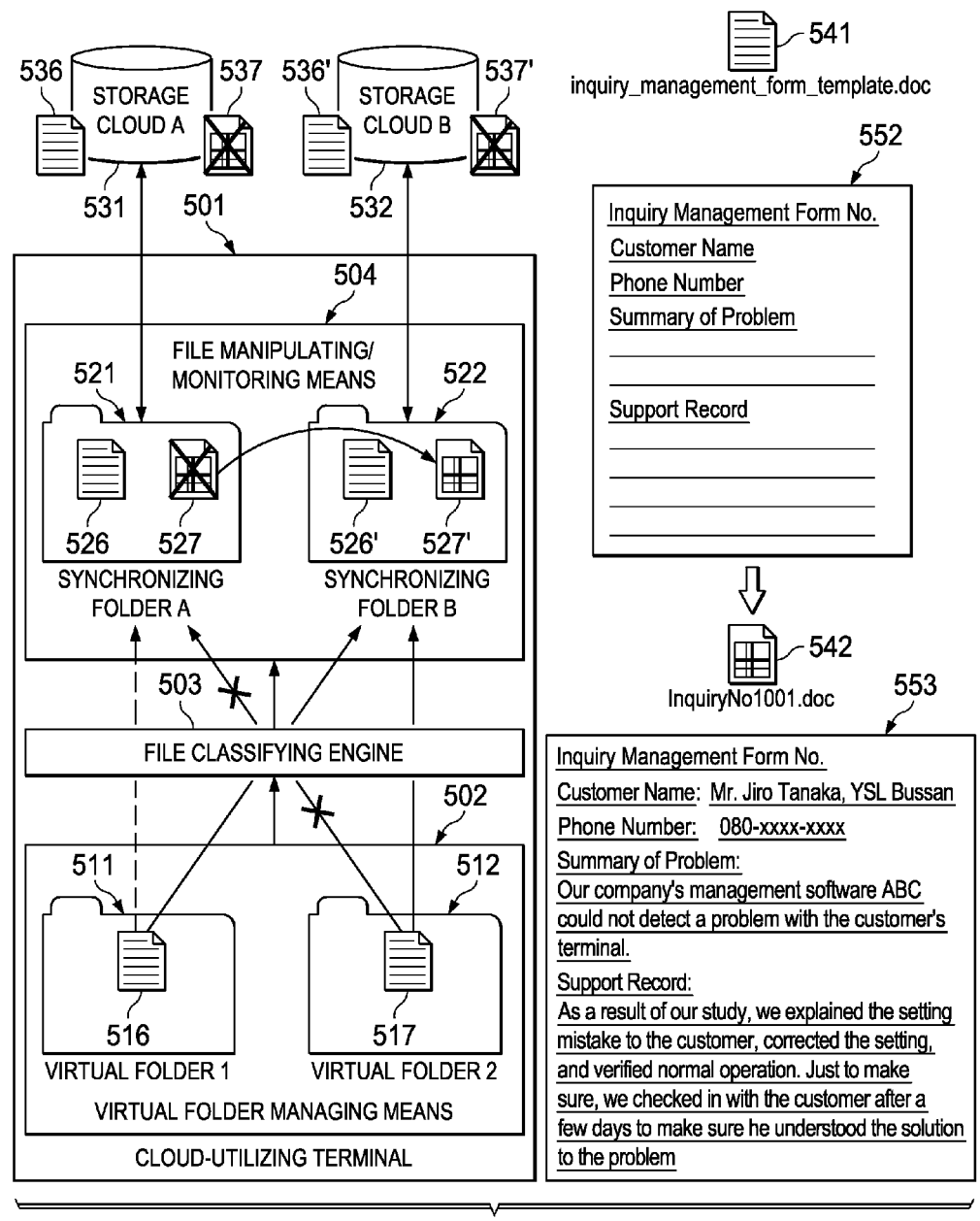
FIG. 5C shows an example of an entity file used by an employee of a call center, and an example of storage cloud synchronization of the entity file in the cloud-utilizing terminal using synchronizing folders according to an embodiment of the present invention.

FIG. 5A, FIG. 5B and FIG. 5C show examples of entity files used by an employee of a call center, and examples of storage cloud synchronization of the entity files in the cloud-utilizing terminal using synchronizing folders according to an embodiment of the present invention. The following are the business details and predefined rules (505) in these examples.

(1) The employees at a call center provide customer support at the call center. The employees use an electronic or hard copy manual to provide technical advice to customers, and check the support status of a product or the price and provides this information to customers.

(2) The following are the predefined rules (505).

1) Access Period: Weekdays 9:00-18:00;
2) Availability: ≥99% (customer inquiries will be answered promptly);
3) Security and Backup Settings 1: Confidential files including text specified as confidential or estimated to be confidential, and files determined to include personal information such as customer names, addresses and phone numbers are stored in a high-security storage cloud. When a high-security storage cloud does not provide file backup services, a backup is created in another high-security storage cloud;
4) Security and Backup Settings 2: Other files containing public information or in-house information are stored in at least a low-security storage cloud. Files that are frequently updated are temporarily stored in another storage cloud, and links are created in a high-performance storage cloud (from a synchronizing folder). When a file has not been used or updated at a predetermined frequency threshold, the latest version of the file is kept on the original low-security storage cloud, and the corresponding files are deleted from other storage clouds.
5) Accessibility: Access to confidential files and files determined to include personal information is not permitted outside of the company such as at home; a warning alerts any employee who attempts to access confidential files and files determined to include personal information (may be any rule); and
6) Redundancy: When there is another storage cloud with good performance at the current location of the user, and a file can be duplicated in the other storage cloud, the file is duplicated in the other storage cloud, and a link is temporarily created to the file in the other storage cloud. When use of the file has been completed, the latest version of the file remains in the original storage cloud, but the corresponding file is deleted from the other storage cloud.

In FIG. 5A, there is a link (516) to the file "inquiry_management_form_template.doc" in virtual folder 1 (511), and the entity file (536) corresponding to this link (516) is stored in storage cloud A (531). The file "inquiry_management_form_template.doc" (541) is a template file with the following items: reference number, customer name, telephone number, and summary of the problem. In this template, information has not yet been entered into the items (see 551).

At home, the employee creates virtual folder 1 (511) in the cloud-utilizing terminal (501). The employee uses the mouse to drag "inquiry_management_form_template.doc" (541) created beforehand into virtual folder 1 (511).

The virtual folder managing means (502) detects movement of an entity file (516) in virtual folder 1 (511). The folder classifying engine (503) uses text analysis or natural language processing to extract attributes from the contents and any context of the detected entity file (516). The entity file manipulating means (504) references the contents, various attribute values (306), and the cloud attribute data obtained from the storage cloud querying means (341), selects storage cloud A (531) satisfying the predefined rules (505) from among storage cloud A (531) and storage cloud B (532), and identifies synchronizing folder A (521) associated with the selected storage cloud A (531). In this embodiment, storage cloud A (531) satisfies the predefined rules (505) because "inquiry_management_form_template.doc" does not include confidential information. Next, the entity file manipulating means (504) moves the entity file (516) in the virtual folder 1 (511) to the identified synchronizing folder A (521). In response to this movement, the virtual folder managing means (502) displays a link to the entity file (526) moved to synchronizing folder A (521) in virtual folder 1 (511). The entity file manipulating means (504) uploads the entity file (526) in synchronizing folder A (521) to storage cloud A (531) associated with synchronizing folder A (521). Storage cloud A (531) stores the entity file (536) uploaded to storage cloud A (531).

In FIG. 5B, there is a link (516) to the file "inquiry_management_form_template.doc" in virtual folder 1 (511), and the entity file (536) corresponding to this link (516) is moved from storage cloud A (531) to storage cloud B (532).

At the company, the employee clicks on the link (516) to the file "inquiry_management_form_template.doc" (541) in virtual folder 1 (511) to open entity file "inquiry_management_form_template.doc" (526) in the corresponding synchronizing folder A (521). The item "corresponding record" is added, and the document is saved (see 552).

The virtual file monitoring means (504) detects a change to the entity file. In response, the folder classifying engine (503) uses text analysis or natural language processing to extract attributes from the contents and any context of the entity file (526). In this embodiment, the changed "inquiry_management_form_template.doc" does not include confidential information. However, the entity file monitoring means (504) detects from the addition of "corresponding record" that the file "inquiry_management_form_template.doc" (541) has been frequently accessed. Therefore, the entity file manipulating means (504) references the contents, various attribute values (306), and the cloud attribute data obtained from the storage cloud querying means (341), and stores the changed "inquiry_management_form_template.doc" in storage cloud B (532) satisfying the predefined rules (505). As a result, the entity file manipulating means (504) copies the entity file (526) in synchronizing folder A (521) to the synchronizing folder B (522). The entity file manipulating means (504) uploads the entity file (526') in synchronizing folder B (522) to the storage cloud B (532) associated with the synchronizing folder B (522). The storage cloud B (532) stores the entity file (536') uploaded to the storage cloud B (532). Access performance to the changed "inquiry_management_form_template.doc" from inside the company is better from storage cloud B (532) than storage cloud A (531). Therefore, the virtual folder managing means (502) temporarily rewrites (that is, changes) the link destination of the link (516) in virtual folder 1 (511) from synchronizing folder A (521) to synchronizing folder B (522). Also, the virtual folder managing means (502) changes the priority ranking of the link (516) so that synchronizing folder B (522) is higher than synchronizing folder A (521).

Employees may attempt to access the entity file (536') in storage cloud B (532) inside the company and outside of the company (for example, at home). However, because storage cloud B (532) has high security (see FIG. 4A), the employee cannot access the entity file (536') outside of the company. However, when the access attempt is detected, the virtual folder managing means (502) writes the link destination of the link (516) in the virtual folder 1 (511) from synchronizing folder B (522) to synchronizing folder A (521) associated with low-security storage cloud A (531) (see FIG. 4A). Also, the virtual folder managing means (502) changes the priority ranking of the link (516) so that synchronizing folder A (521) is higher than synchronizing folder B (522). In other words, the priority ranking of the link (516) is changed so that the link destination is returned to its original state. This change allows the employee to transparently access the entity file (536) in the storage cloud A (531).

FIG. 5C shows edited storage in which the file "inquiry_management_form_template.doc" (link (516)) in virtual folder 1 (511) is copied to virtual folder 2 (512), and the file name is changed from "inquiry_management_form_template.doc" to "inquiry_No1001.doc" in virtual folder 2 (512).

At home, the employee copies "inquiry_management_form_template.doc" (541) in virtual folder 1 (511) to virtual folder 2 (512).

The virtual folder managing means (502) detects copying of "inquiry_management_form_template.doc" in virtual folder 2 (512). In response, the folder classifying engine (503) uses text analysis or natural language processing to extract attributes from the contents and any context of the copied file "inquiry_management_form_template.doc". The entity file manipulating means (504) references the contents, various attribute values (306), and the cloud attribute data obtained from the storage cloud querying means (341), selects storage cloud A (531) satisfying the predefined rules (505) from among storage cloud A (531) and storage cloud B (532), and identifies synchronizing folder A (521) associated with the selected storage cloud A (531). In this embodiment, storage cloud A (531) satisfies the predefined rules (505) because the copied file "inquiry_management_form_template.doc" does not include confidential information. Next, the entity file manipulating means (504) moves the entity file (517) in the virtual folder 2 (512) to the identified synchronizing folder A (521). In response to this movement, the virtual folder managing means (502) displays a link to the entity file (527) moved to synchronizing folder A (521) in virtual folder 2 (512). The entity file manipulating means (504) uploads the entity file (527) in synchronizing folder A (521) to storage cloud A (531) associated with synchronizing folder A (521). Storage cloud A (531) stores the entity file (537) uploaded to storage cloud A (531).

Next, at the company, the employee opens file "inquiry_management_form_template.doc" in virtual folder 2 (512) using an application, clicks on the link with the file name, opens the corresponding entity file "inquiry_management_form_template.doc" (526), changes the file name from "inquiry_management_form_template.doc" (541) to "inquiry_management_No1001.doc" (542), fills in items "reference number", "customer name", "phone number", "summary of problem", and "corresponding record", and saves the changes (see 553).

The virtual file monitoring means (504) detects a change to the entity file. In response, the folder classifying engine (503) uses text analysis or natural language processing to extract attributes from the contents and any context of the entity file (527). Next, the entity file manipulating means (504) references the contents, various attribute values (306), and the cloud attribute data obtained from the storage cloud querying means (341), selects storage cloud B (532) satisfying the predefined rules (505) from among storage cloud A (531) and storage cloud B (532), and identifies synchronizing folder B (522) associated with the selected storage cloud B (532). In this embodiment, storage cloud B (532) satisfies the predefined rules (505) because "inquiry_No1001.doc" includes confidential information such as the customer name and phone number. Next, the entity file manipulating means (504) moves the entity file (527) in synchronizing file A (521) to the identified synchronizing folder B (522). In response, the virtual folder managing means (502) changes the link destination for the link (517) in synchronizing folder B (522) from synchronizing folder A (521) to synchronizing folder B (522). The entity file manipulating means (504) uploads the entity file (527') in synchronizing folder B (522) to storage cloud B (532) associated with synchronizing folder B (522). The storage cloud B (532) stores the entity file (537') uploaded to the storage cloud B (532). Also, the entity file manipulating means (504) detects the deletion by moving the entity file (527) from synchronizing folder A (521) to synchronizing folder B (522). In response, the storage cloud A (531) deletes the entity file (537) from storage cloud A (531).

Employees may attempt to access the entity file (537') in storage cloud B (532) inside the company and outside of the company (for example, at home). However, because storage cloud B (532) has high security (see FIG. 4A), the employee cannot access the entity file (537') outside of the company. Also, because entity file (537') includes confidential information such as the customer's name and phone number, the entity file (537') in storage cloud B (532) is not copied or moved to storage cloud A (531) as in the embodiment explained in FIG. 5B. Therefore, the employee cannot access entity file (537') outside of the company.

Figure 5D:
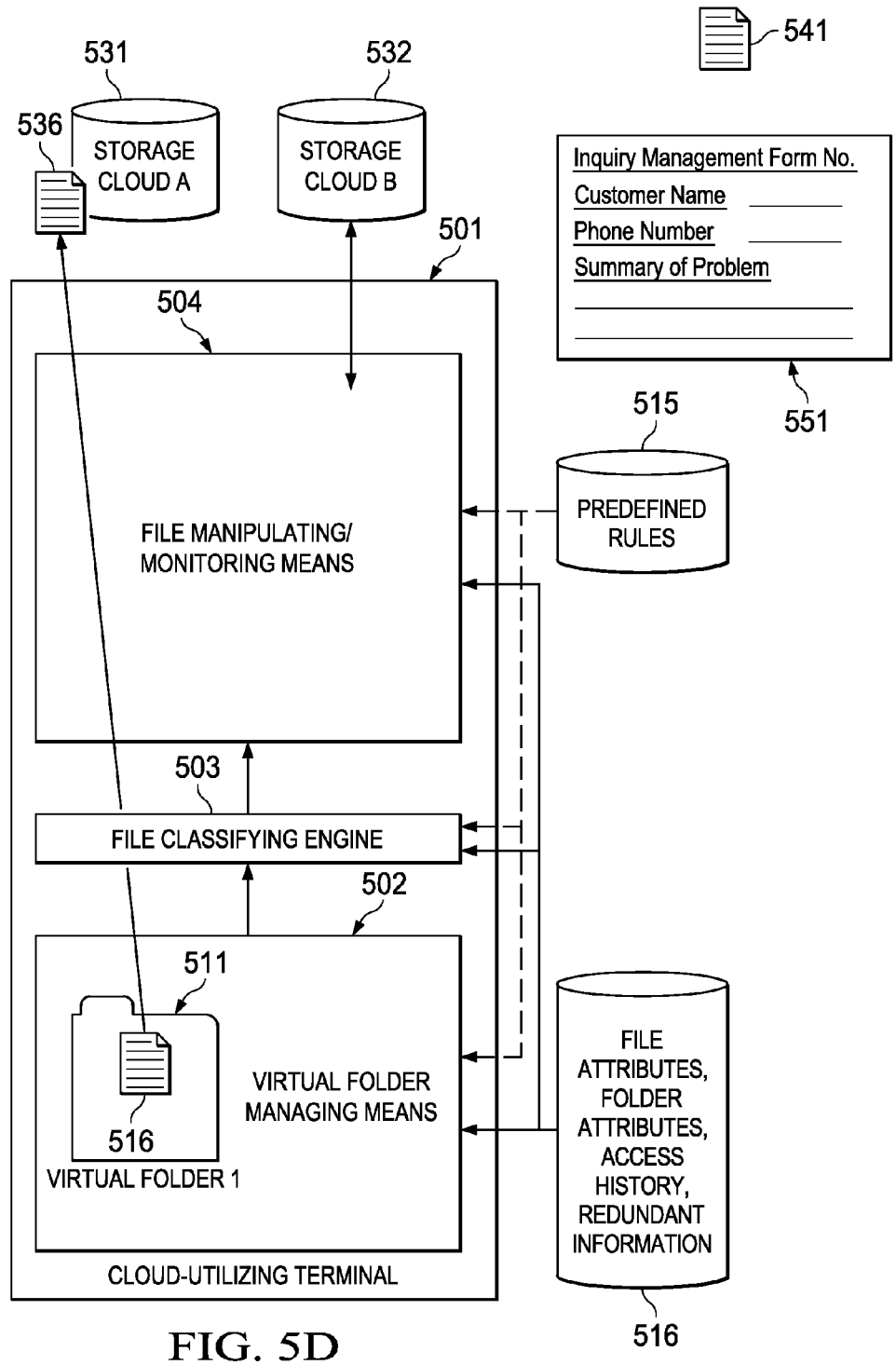
FIG. 5D shows an example of an entity file used by an employee of a call center, and an example of synchronizing an entity file in the cloud-utilizing terminal with storage clouds using synchronizing folders according to an embodiment of the present invention.
Figure 5E:
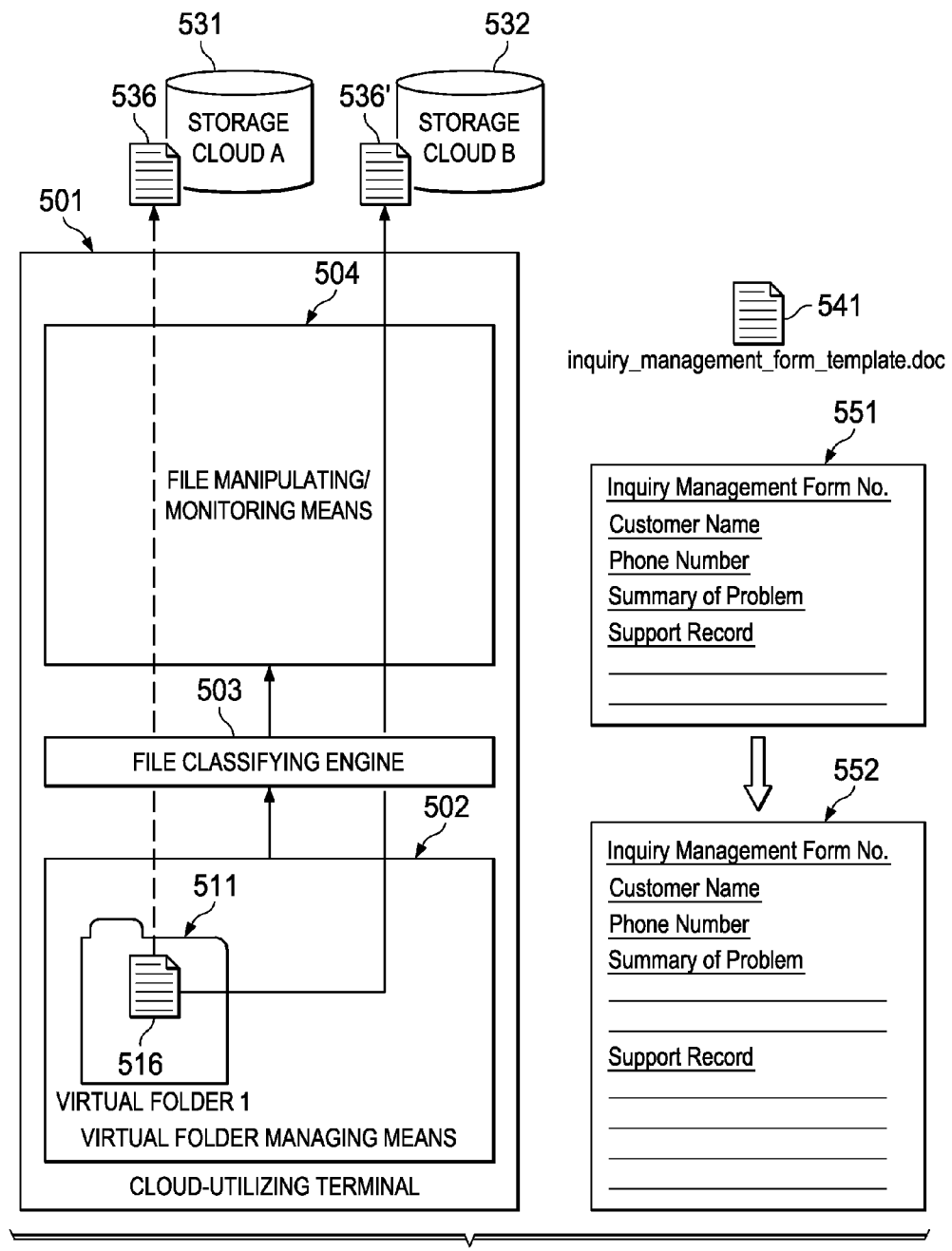
FIG. 5E shows an example of an entity file used by an employee of a call center, and an example of synchronizing an entity file in the cloud-utilizing terminal with storage clouds using synchronizing folders according to an embodiment of the present invention.
Figure 5F:
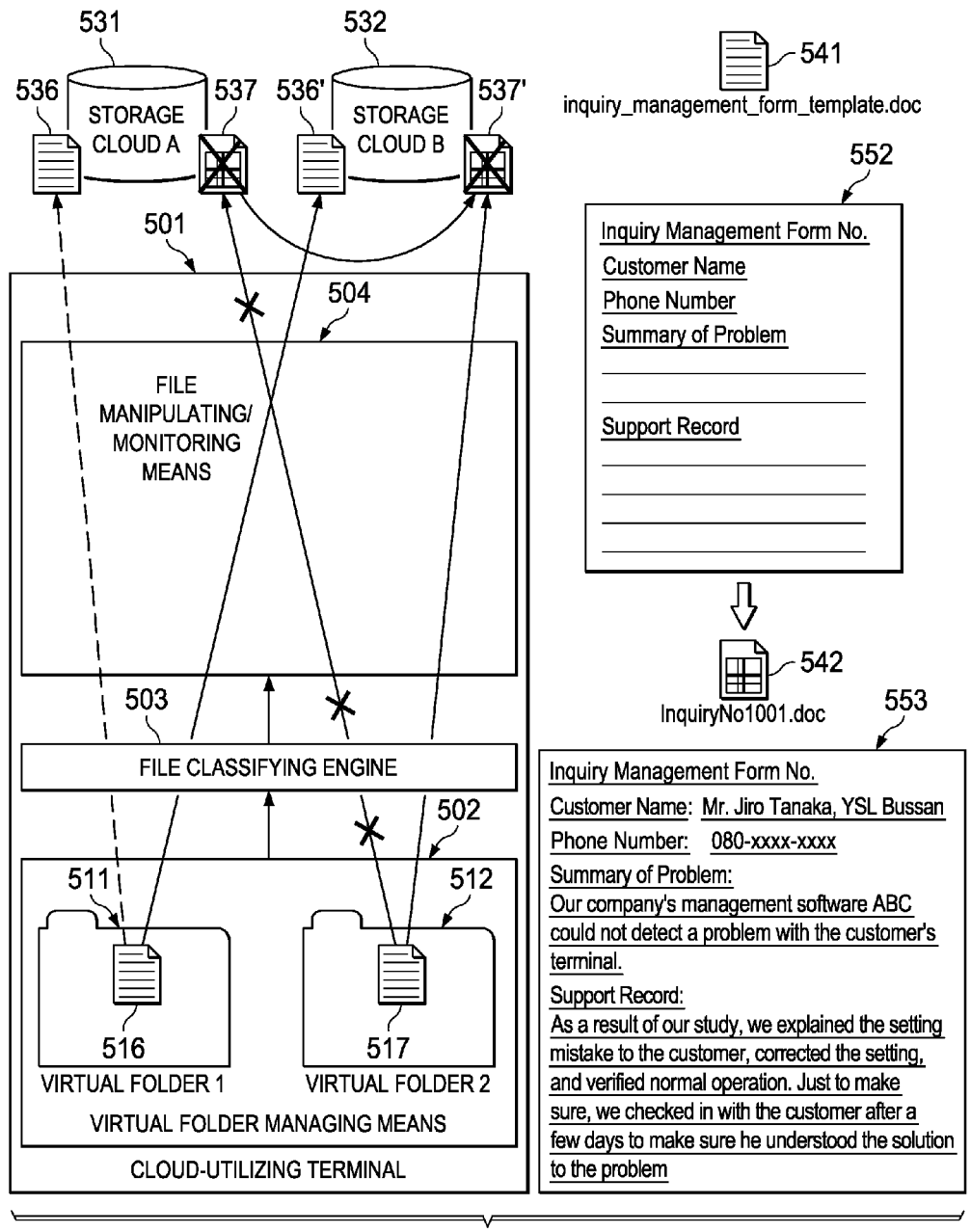
FIG. 5F shows an example of an entity file used by an employee of a call center, and an example of synchronizing an entity file in the cloud-utilizing terminal with storage clouds using synchronizing folders according to an embodiment of the present invention.

FIG. 5D, FIG. 5E and FIG. 5F show examples of entity files used by an employee of a call center, and examples of storage cloud synchronization of the entity files in the cloud-utilizing terminal using synchronizing folders according to an embodiment of the present invention. The business details and predefined rules (515) in these examples are the same as those above except that the following has been added to the predefined rules (505) for FIG. 5A through FIG. 5C.

7) Synchronizing Folder: A synchronizing folder (that is, local cache) is not used.

In FIG. 5D, there is a link (516) to the file "inquiry_management_form_template.doc" in virtual folder 1 (511), and the entity file (536) corresponding to this link (516) is stored in storage cloud A (531).

At home, the employee creates virtual folder 1 (511) in the cloud-utilizing terminal (501). The employee uses the mouse to drag "inquiry_management_form_template.doc" (541) created beforehand into virtual folder 1 (511).

The virtual folder managing means (502) detects movement of an entity file (516) in virtual folder 1 (511). The folder classifying engine (503) uses text analysis or natural language processing to extract attributes from the contents and any context of the detected entity file (516). The entity file manipulating means (504) references the contents, various attribute values (306), and the cloud attribute data obtained from the storage cloud querying means (341), selects storage cloud A (531) satisfying the predefined rules (505) from among storage cloud A (531) and storage cloud B (532). In this embodiment, storage cloud A (531) satisfies the predefined rules (505) because "inquiry_management_form_template.doc" does not include confidential information. Next, the entity file manipulating means (504) uploads the entity file (516) in the virtual folder 1 (511) to the selected storage cloud A (531). Storage cloud A (531) stores the entity file (536) uploaded to storage cloud A (531). The virtual folder managing means (502) displays a link (for example, a URL link) to the entity file (536) uploaded to storage cloud A (531) in virtual folder 1 (511).

In FIG. 5E, there is a link (516) to the file "inquiry_management_form_template.doc" in virtual folder 1 (511), and the entity file (536) corresponding to this link (516) is moved from storage cloud A (531) to storage cloud B (532).

At the company, the employee clicks on the link (516) to the file "inquiry_management_form_template.doc" in virtual folder 1 (511) to download the corresponding entity file "inquiry_management_form_template.doc" (526) from storage cloud A (531). The item "corresponding record" is added, and the document is saved (see 552).

The virtual file monitoring means (504) detects a change to the entity file. In response, the folder classifying engine (503) uses text analysis or natural language processing to extract attributes from the contents and any context of the entity file. In this embodiment, the changed "inquiry_management_form_template.doc" does not include confidential information. However, the entity file monitoring means (504) detects from the addition of "corresponding record" that the file "inquiry_management_form_template.doc" (541) has been frequently accessed. Therefore, the entity file manipulating means (504) references the contents, various attribute values (306), and the cloud attribute data obtained from the storage cloud querying means (341), and stores the changed "inquiry_management_form_template.doc" in storage cloud B (532) satisfying the predefined rules (505). As a result, the entity file manipulating means (504) uploads the downloaded entity file "inquiry_management_form_template.doc" to storage cloud B (532). The storage cloud B (532) stores the entity file (536') uploaded to the storage cloud B (532). Access performance to the changed "inquiry_management_form_template.doc" from inside the company is better from storage cloud B (532) than storage cloud A (531). Therefore, the virtual folder managing means (502) temporarily rewrites (that is, changes) the link destination of the link (516) in virtual folder 1 (511) from storage cloud A (531) to storage cloud B (532). Also, the virtual folder managing means (502) changes the priority ranking of the link (516) so that storage cloud B (532) is higher than storage cloud A (531).

Employees may attempt to access the entity file (536') in storage cloud B (532) inside the company and outside of the company (for example, at home). However, because storage cloud B (532) has high security (see FIG. 4A), the employee cannot access the entity file (536') outside of the company. However, when the access attempt is detected, the virtual folder managing means (502) writes the link destination of the link (516) in the virtual folder 1 (511) from storage cloud B (532) to low-security storage cloud A (531) (see FIG. 4A). Also, the virtual folder managing means (502) changes the priority ranking of the link (516) so that storage cloud A (531) is higher than storage cloud B (532). In other words, the priority ranking of the link (516) is changed so that the link destination is returned to its original state. This change allows the employee to transparently access the entity file (536) in the storage cloud A (531).

FIG. 5F shows edited storage in which the file "inquiry_management_form_template.doc" (link (516)) in virtual folder 1 (511) is copied to virtual folder 2 (512), and the file name is changed from "inquiry_management_form_template.doc" to "inquiry_No1001.doc" in virtual folder 2 (512).

At home, the employee copies "inquiry_management_form_template.doc" (541) in virtual folder 1 (511) to virtual folder 2 (512).

The virtual folder managing means (502) detects copying of "inquiry_management_form_template.doc" in virtual folder 2 (512). In response, the folder classifying engine (503) uses text analysis or natural language processing to extract attributes from the contents and any context of the copied file "inquiry_management_form_template.doc". The entity file manipulating means (504) references the contents, various attribute values (306), and the cloud attribute data obtained from the storage cloud querying means (341), and selects storage cloud A (531) satisfying the predefined rules (505) from among storage cloud A (531) and storage cloud B (532). In this embodiment, storage cloud A (531) satisfies the predefined rules (505) because the copied file "inquiry_management_form_template.doc" does not include confidential information. Next, the entity file manipulating means (504) uploads the entity file (517) in the virtual folder 2 (512) to the selected storage cloud A (531). Storage cloud A (531) stores the entity file (537) uploaded to storage cloud A (531). The virtual folder managing means (502) displays a link (for example, a URL link) to the entity file (537) uploaded to storage cloud A (531) in virtual folder 2 (512).

Next, at the company, the employee opens file "inquiry_management_form_template.doc" in virtual folder 2 (512) using an application, clicks on the link with the file name, opens the corresponding entity file "inquiry_management_form_template.doc" (526), changes the file name from "inquiry_management_form_template.doc" (541) to "inquiry_management_No1001.doc" (542), fills in items "reference number", "customer name", "phone number", "summary of problem", and "corresponding record", and saves the changes (see 553).

The virtual file monitoring means (504) detects a change to the entity file. In response, the folder classifying engine (503) uses text analysis or natural language processing to extract attributes from the contents and any context of the entity file. Next, the entity file manipulating means (504) references the contents, various attribute values (306), and the cloud attribute data obtained from the storage cloud querying means (341), selects storage cloud B (532) satisfying the predefined rules (505) from among storage cloud A (531) and storage cloud B (532), and identifies synchronizing folder B (522) associated with the selected storage cloud B (532). In this embodiment, storage cloud B (532) satisfies the predefined rules (505) because "inquiry_No1001.doc" includes confidential information such as the customer name and phone number. Next, the entity file manipulating means (504) moves the downloaded and edited entity file to storage cloud B (532). The storage cloud B (532) stores the entity file (537') uploaded to the storage cloud B (532). In response, the virtual folder managing means (502) changes the link destination for the link (517) in storage cloud B (532) from storage cloud A (531) to storage cloud B (522). Also, the storage cloud A (531) deletes the entity file (537) from storage cloud A (531).

Employees may attempt to access the entity file (537') in storage cloud B (532) inside the company and outside of the company (for example, at home). However, because storage cloud B (532) has high security (see FIG. 4A), the employee cannot access the entity file (537') outside of the company. Also, because entity file (537') includes confidential information such as the customer's name and phone number, the entity file (537') in storage cloud B (532) is not copied or moved to storage cloud A (531) as in the embodiment explained in FIG. 5B. Therefore, the employee cannot access entity file (537') outside of the company.

Figure 6A:
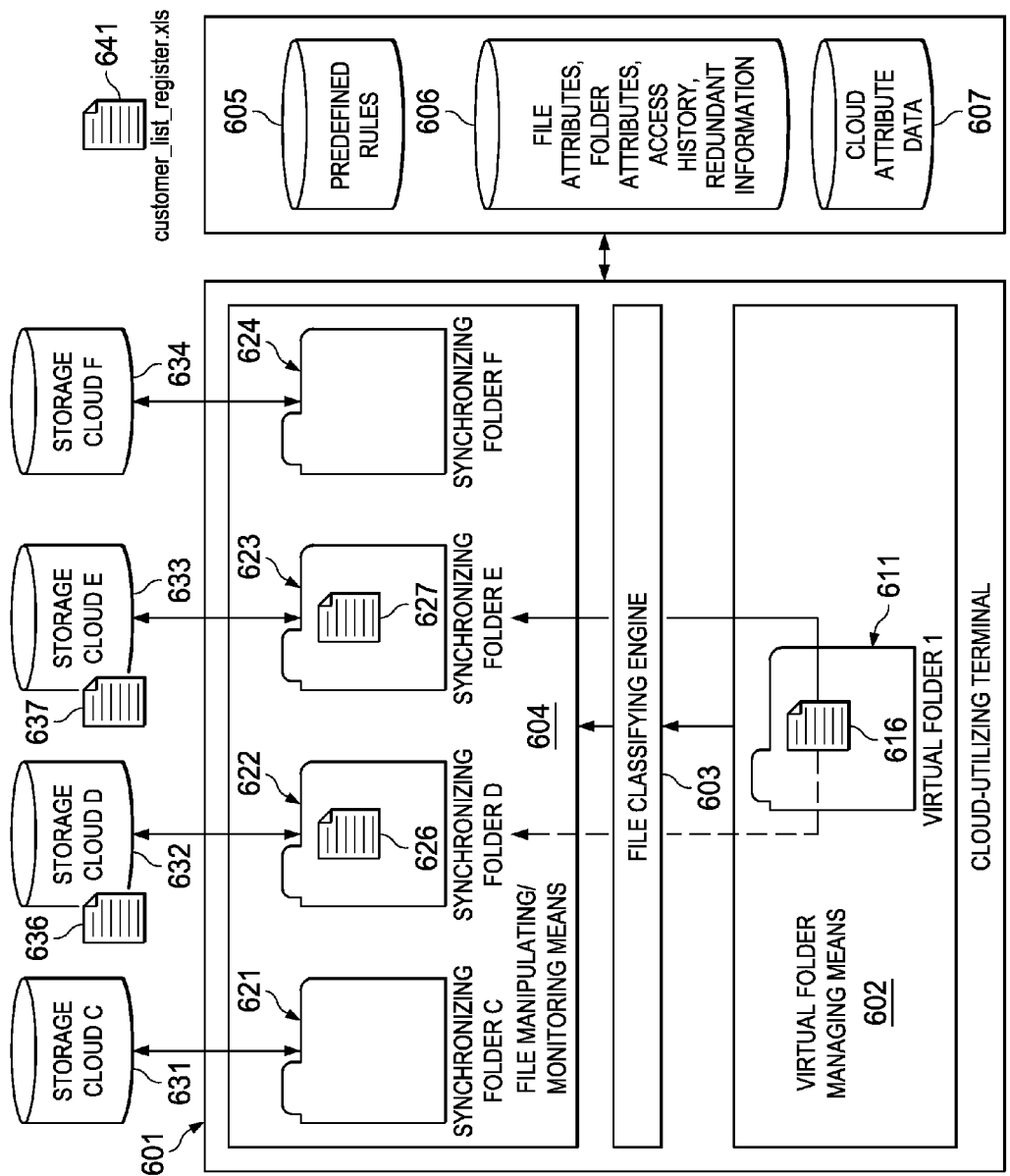
FIG. 6A shows an example of an entity file used by an employee of a sales office, and an example of storage cloud synchronization of the entity file in the cloud-utilizing terminal using synchronizing folders according to an embodiment of the present invention.
Figure 6B:
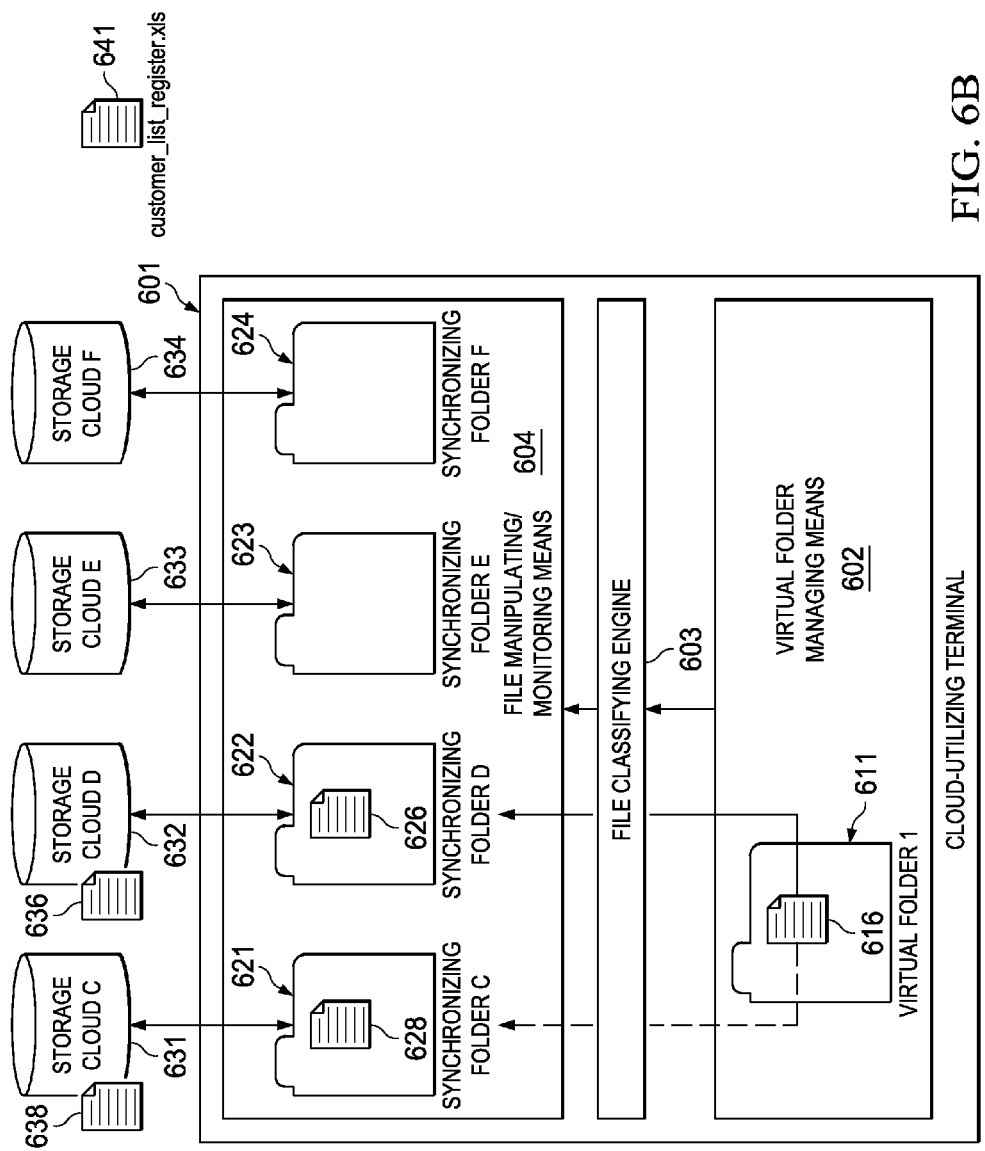
FIG. 6B shows an example of an entity file used by an employee of a sales office, and an example of storage cloud synchronization of the entity file in the cloud-utilizing terminal using synchronizing folders according to an embodiment of the present invention.
Figure 6C:
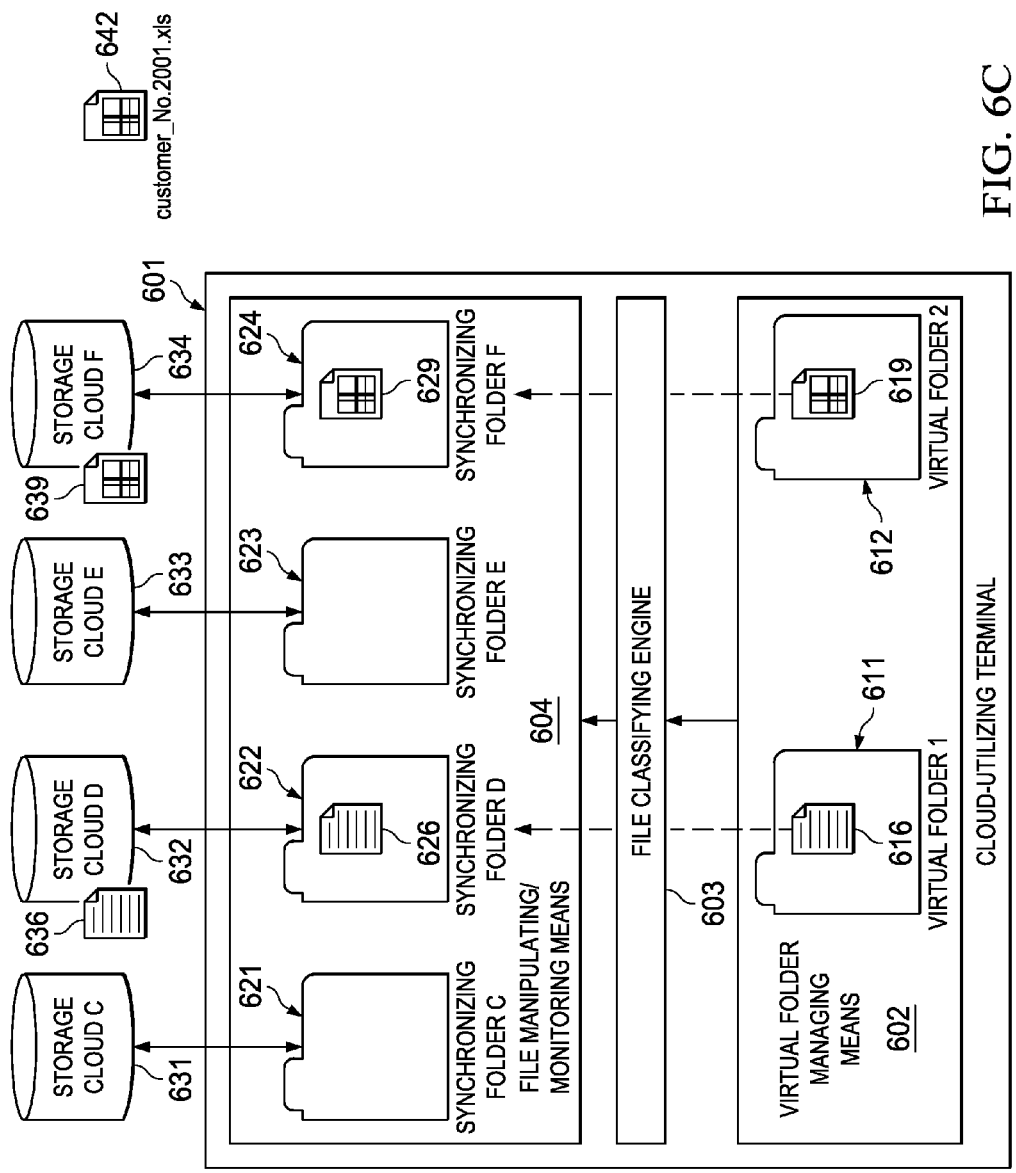
FIG. 6C shows an example of an entity file used by an employee of a sales office, and an example of storage cloud synchronization of the entity file in the cloud-utilizing terminal using synchronizing folders according to an embodiment of the present invention.

FIG. 6A, FIG. 6B and FIG. 6C show examples of entity files used by an employee (user) in a sales office, and examples of storage cloud synchronization of the entity files in the cloud-utilizing terminal using synchronizing folders according to an embodiment of the present invention. The following are the business details and predefined rules (605) in these examples.

(1) The employees in the sales office sell products at the sales office. The employees create materials for customers in order to promote sales.

(2) The following are the predefined rules (605).

1) Access Period: Weekdays 9:00-20:00;

2) Availability: ≥95% (the availability of employees in a sales office is lower than that of employees at a call center because the employees in a sales office more than employees working at a call center are able to put off work to do other work when the storage cloud cannot be accessed);

3) Security and Backup Settings 1: Confidential files including text specified as confidential or estimated to be confidential, and files determined to include personal information such as customer names, addresses and phone numbers are stored in a high-security storage cloud. When a high-security storage cloud does not provide file backup services, a backup is created in another high-security storage cloud;
4) Security and Backup Settings 2: Other files containing public information or in-house information are stored in at least a low-security storage cloud. Files that are frequently updated are temporarily stored in another storage cloud, and links are created in a high-performance storage cloud (from a synchronizing folder). When a file has not been used or updated at a predetermined frequency threshold, the latest version of the file is kept on the original low-security storage cloud, and the corresponding files are deleted from other storage clouds.
5) Accessibility: Access to confidential files and files determined to include personal information is permitted outside of the company such as at home; however, uploading of confidential files and files determined to include personal information is not permitted outside of the company such as at home. Downloaded files are temporarily stored in a synchronizing folder (local cache). However, when the downloaded file has not been updated for 24 hours, the file is automatically deleted from the synchronizing folder (local cache); when an employee (returning to the office) is able to upload an entity file stored in the synchronizing folder (local cache) from the company to a storage cloud, whether to upload or delete the temporarily stored filed is confirmed by the employee (may be any rule);
6) Redundancy: When there is another storage cloud with good performance at the current location of the user, and a file can be duplicated in the other storage cloud, the file is duplicated in the other storage cloud, and a link is temporarily created to the file in the other storage cloud. When use of the file has been completed, the latest version of the file remains in the original storage cloud, but the corresponding file is deleted from the other storage cloud; and
7) Synchronizing Folder: Downloaded files are basically stored in the local cache; employees may transparently access the local cache where there is no connection to the network (may be any rule).

In FIG. 6A, there is a link (616) to the file "customer_list_register.xls" in virtual folder 1 (611), and the entity file (636) corresponding to this link (616) is stored in storage cloud D (632), and the entity file (637) corresponding to entity file (636) is stored by the user in storage cloud E (633). The file "customer_list_register.xls" (441) is a template file with the following items: reference number, customer name, address, and telephone number. Thus, information has not yet been entered into the items.

At home, the employee creates virtual folder 1 (611) in the cloud-utilizing terminal (601). The employee uses the mouse to copy "customer_list_register.xls" (641) created beforehand into virtual folder 1 (611).

The virtual folder managing means (602) detects movement of an entity file (616) in virtual folder 1 (611). The folder classifying engine (603) uses text analysis or natural language processing to extract attributes from the contents and any context of the detected entity file (616). The entity file manipulating means (604) references the contents, various attribute values (306), and the cloud attribute data obtained from the storage cloud querying means (341), selects storage cloud D (632) satisfying the predefined rules (605) from among storage clouds C-F (631-634), and identifies synchronizing folder D (622) associated with the selected storage cloud D (632). In this embodiment, storage cloud D (632) satisfies the predefined rules (605) because "customer_list_register.xls" does not include confidential information. Next, the entity file manipulating means (604) moves the entity file (616) in the virtual folder 1 (611) to the identified synchronizing folder D (622). In response to this movement, the virtual folder managing means (602) displays a link (616) to the entity file (626) moved to synchronizing folder D (622) in virtual folder 1 (611). The entity file manipulating means (604) uploads the entity file (626) in synchronizing folder D (622) to storage cloud D (632) associated with synchronizing folder D (622). Storage cloud D (632) stores the entity file (636) uploaded to storage cloud D (632).

At the company, the employee clicks on the link (616) to the file "customer_list_register.xls" (641) in virtual folder 1 (611) to open entity file "customer_list_register.xls" (626), update the content, and save the file.

The virtual file monitoring means (604) detects a change to the entity file. In response, the folder classifying engine (603) uses text analysis or natural language processing to extract attributes from the contents and any context of the entity file (626). In this embodiment, the changed "customer_list_register.xls" (626) does not include confidential information. However, the entity file monitoring means (604) detects from the addition of "corresponding record" that the file "customer_list_register.xls" (626) has been frequently accessed. Therefore, the entity file manipulating means (604) references the contents, various attribute values (306), and the cloud attribute data obtained from the storage cloud querying means (341), and stores the changed "customer_list_register.xls" in storage cloud E (633) satisfying the predefined rules (605). As a result, the entity file manipulating means (604) copies the entity file (626) in synchronizing folder D (622) to the synchronizing folder E (623). The entity file manipulating means (604) uploads the entity file (627) in synchronizing folder E (623) to the storage cloud E (633) associated with the synchronizing folder E (623). The storage cloud E (633) stores the entity file (637) uploaded to the storage cloud E (633). Access performance to the changed "customer_list_register.xls" from inside the company is better from storage cloud E (633) than storage cloud D (632). Therefore, the virtual folder managing means (602) temporarily rewrites the link destination of the link (616) in virtual folder 1 (611) from synchronizing folder D (622) to synchronizing folder E (623). Also, the virtual folder managing means (602) changes the priority ranking of the link (616) so that synchronizing folder E (623) is higher than synchronizing folder D (622).

Employees may attempt to access the entity file (637) in storage cloud E (633) inside the company and outside of the company (for example, at home). However, because storage cloud E (633) has high security (see FIG. 4A), the employee cannot access the entity file (637) outside of the company. However, when the access attempt is detected, the virtual folder managing means (602) writes the link destination of the link (616) in the virtual folder 1 (611) from synchronizing folder E (623) to synchronizing folder D (622) associated with low-security storage cloud D (632) (see FIG. 4A). Also, the virtual folder managing means (602) changes the priority ranking of the link (616) so that synchronizing folder D (622) is higher than synchronizing folder E (623). In other words, the priority ranking of the link (616) is changed so that the link destination is returned to its original state. This change allows the employee to transparently access the entity file (636) in the storage cloud D (632).

In FIG. 6B, there is a link (616) to the file "customer_list_register.xls" in virtual folder 1 (611), and the entity file (636) corresponding to this link (616) is moved from storage cloud D (632) to storage cloud C (631).

On a business trip in Nagoya, the employee clicks on the link (616) to the file "customer_list_register.xls" (641) in virtual folder 1 (611) to open the corresponding entity file "customer_list_register.xls" (626). Access performance to the accessed "customer_list_register.xls" from outside the company is better from storage cloud C (631) than storage cloud D (632). Therefore, the virtual folder managing means (602) temporarily rewrites (that is, changes) the link destination of the link (616) in virtual folder 1 (611) from synchronizing folder D (622) to synchronizing folder C (621). Also, the virtual folder managing means (602) changes the priority ranking of the link (616) so that synchronizing folder C (621) is higher than synchronizing folder D (622).

FIG. 6C shows edited storage in which the file "customer_list_register.xls" (link (616)) in virtual folder 1 (611) is opened and edited, and the file name is changed from "customer_list_register.xls" to "customer_No2001.xls" in virtual folder 2 (612).

At the company, the employee opens the file "customer_list_register.xls" (641) in virtual folder 1 (611), enters customer information, changes the file name from "customer_list_register.xls" to "customer_No2001.xls", and stores the document in virtual folder 2 (612).

The virtual folder managing means (602) detects storage of "customer_No2001.xls" in virtual folder 2 (612). In response, the folder classifying engine (603) uses text analysis or natural language processing to extract attributes from the contents and any context of the entity file. In this embodiment, "customer_No2001.xls" contains customer information, which is confidential information. The entity file manipulating means (604) references the contents, various attribute values (306), and the cloud attribute data obtained from the storage cloud querying means (341), selects storage cloud F (634) satisfying the predefined rules (605) from among storage clouds C-F (631-634), and identifies synchronizing folder F (624) associated with the selected storage cloud F (634). In this embodiment, storage cloud F (634) satisfies the predefined rules (605) because the copied file "customer_No2001.xls" includes confidential information. Next, the entity file manipulating means (604) copies the entity file (626) in synchronizing folder D (622) to synchronizing folder F (624). In response, the virtual folder managing means (602) displays a link to the entity file (629) copied to synchronizing folder F (624) in virtual folder 2 (612) (see 619). The entity file manipulating means (604) uploads the entity file (629) in synchronizing folder F (624) to storage cloud F (634) associated with synchronizing folder F (624). Storage cloud F (634) stores the entity file (639) uploaded to storage cloud F (634).

Outside of the company, the employee attempts to open and edit file "customer_No2001.xls" (619) in virtual folder 2 (612). Because "customer_No2001.xls" (619) in virtual folder 2 (612) is actually a link, the employee edits the entity file (629) corresponding to this link.

The entity file monitoring means (604) detects this editing. Because file "customer_No2001.xls" (619) is being edited by the user outside of the company, the entity file manipulating means (604) does not upload the edited entity file (629) to the storage cloud F (634) in accordance with policy 5) in the predefined rules (605). In other words, entity file (629) in synchronizing folder (624) is not synchronized with entity file (639) in storage cloud F (634). As a result, the user can edit and update only entity file (629) in the synchronizing folder (624).

The employee returns to the company from the business trip. The position of the employee may be identified by GPS installed in the cloud-utilizing terminal, the IP address obtained by cloud-utilizing terminals from the network, or a card with an embedded IC chip used by the user of the cloud-utilizing terminals to identify his or her location.

Because the edited entity file (629) detected earlier has not been uploaded to the storage cloud F (634), the entity file monitoring means (604) prompts the user to enter an instruction on whether to upload the edited entity file (629) to the storage cloud F (634) in accordance with the predefined rules 5). In response to an uploading instruction from the user, the entity file manipulating means (604) uploads the entity file (629) in the synchronizing folder F (624) to the storage cloud F (634). The storage cloud (634) writes over the existing entity file in the storage cloud F (634) with the uploaded entity file (639).

Figure 7:
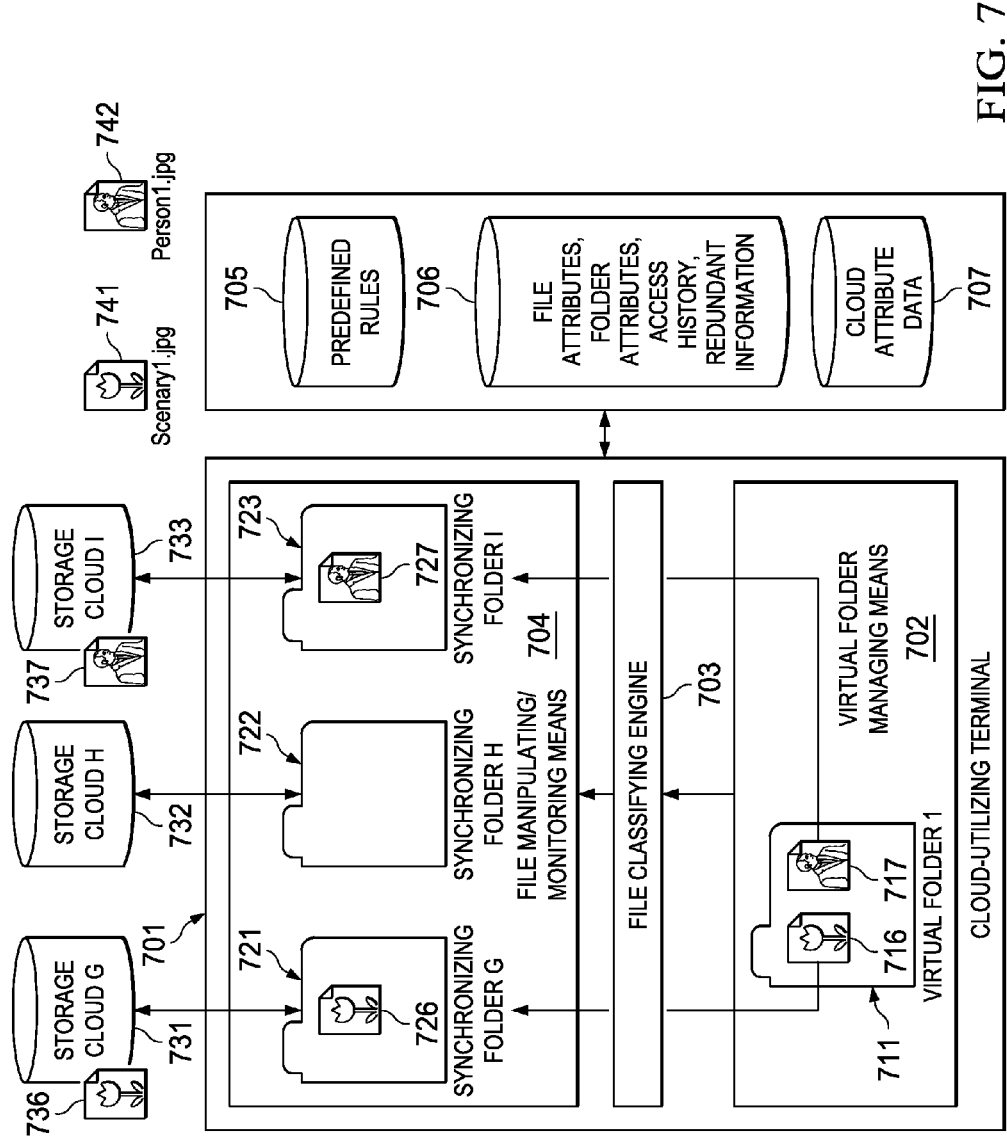
FIG. 7 shows an example of an entity file used by a user, and an example of storage cloud synchronization of the entity file in the cloud-utilizing terminal using synchronizing folders according to an embodiment of the present invention.

FIG. 7 shows an example of an entity file used by a user (for example, a private user), and an example of storage cloud synchronization of the entity file in the cloud-utilizing terminal using synchronizing folders according to an embodiment of the present invention. The predefined rules (705) are as follows:

1) Security and Backup Settings 1: Business files containing confidential information or personal information are stored in a high-security storage cloud; other business files are stored in a medium-security storage cloud or higher; files presumed to be for private use, such as files containing personal information, and image files or video files including the faces of individuals are stored in a high-security storage cloud; all other files are basically stored in low-security storage clouds or higher;
2) Security and Backup Settings 2: Files requiring permanent storage are periodically accessed so as not to be deleted or copied to the same storage cloud prior to the storage deadline; and
3) Redundancy: When a file is frequently updated, the file is temporarily duplicated at another storage cloud and a link is temporarily established from the synchronizing folder to the file in the higher-performance storage cloud.

When the file has not been used or updated at a predetermined frequency threshold, the file in the original storage cloud is kept, and the corresponding files are deleted from other storage clouds.

In FIG. 7, there are two links (716 and 717) to image files in virtual file 2, the entity file (736) corresponding to link (716) is stored in storage cloud G (731), and the entity file (737) corresponding to link (717) is stored in storage cloud I (733).

At home, the user attempts to create virtual folder 1 (711) in a cloud-utilizing terminal (701). The user attaches the attribute "permanent storage" to virtual folder 1 (711) and stores "scenery1.jpg" (741), which is an image including only scenery, in the folder.

The virtual folder managing means (702) detects storage of entity file (741) in virtual folder 1 (711). In response, the folder classifying engine (703) uses text analysis or natural language processing to extract attributes from the contents and any context of the entity file (741). The entity file manipulating means (704) references the contents, various attribute values (306), and the cloud attribute data obtained from the characteristic survey engine (138), selects storage cloud G (731) satisfying the predefined rules (705) from among storage clouds G-I (731-733), and identifies synchronizing folder G (721) associated with the selected storage cloud G (731). In this embodiment, low-security storage cloud G (731) satisfies the predefined rules (705) because the file "scenery1.jpg" includes confidential information or personal information. Next, the entity file manipulating means (704) copies the entity file (716) in virtual folder 1 (711) to synchronizing folder G (721). In response, the virtual folder managing means (702) displays a link (716) to the entity file (726) moved to synchronizing folder G (721) in virtual folder 1 (711). The entity file manipulating means (704) uploads the entity file (726) in synchronizing folder G (721) to storage cloud G (731) associated with synchronizing folder G (721). Storage cloud G (731) stores the entity file (736) uploaded to storage cloud G (731).

Storage cloud G (731) has an expiration date in which the files stored in storage cloud G (731) are deleted unless they have been accessed in the past week (see FIG. 4B). Therefore, the user may set the entity file monitoring means (704) to automatically access the entity file (736) in the storage cloud G (731) before the expiration date is reached. The entity file manipulating means (704) may display a screen prompting the user to establish this setting. The entity file monitoring means (704) then automatically accesses the entity file (736) in the storage cloud G (731) before the expiration date is reached in accordance with the settings. When the entity file monitoring means (704) cannot access the network or the storage cloud G (731) before the expiration date has been reached, the user may be warned before the expiration date has been reached that the entity file (736) will be deleted from the storage cloud (731).

At home, the user also stores image file "person1.jpg" (742) taken of a person in virtual folder 1 (711) with the attribute "permanent storage".

The virtual folder managing means (702) detects storage of entity file (742) in virtual folder 1 (711). In response, the folder classifying engine (703) uses text analysis or natural language processing to extract attributes from the contents and any context of the entity file (742). The entity file manipulating means (704) references the contents, various attribute values (306), and the cloud attribute data obtained from the characteristic survey engine (138), selects storage cloud I (733) satisfying the predefined rules (705) from among storage clouds G-I (731-733), and identifies synchronizing folder I (723) associated with the selected storage cloud I (733). In this embodiment, high-security storage cloud I (733) satisfies the predefined rules (705) because the file "person1.jpg" includes personal information. Next, the entity file manipulating means (704) copies the entity file (717) in virtual folder 1 (711) to synchronizing folder I (723). In response, the virtual folder managing means (702) displays a link (717) to the entity file (727) moved to synchronizing folder I (723). The entity file manipulating means (704) uploads the entity file (727) in synchronizing folder I (723) to storage cloud I (733) associated with synchronizing folder I (723). Storage cloud I (733) stores the entity file (737) uploaded to storage cloud I (733).

Storage cloud I (733) does not have an expiration date for deleting files stored in storage cloud I (733) (see FIG. 4B). Therefore, the entity file (737) in storage cloud I (733) is not deleted.

Figure 8:
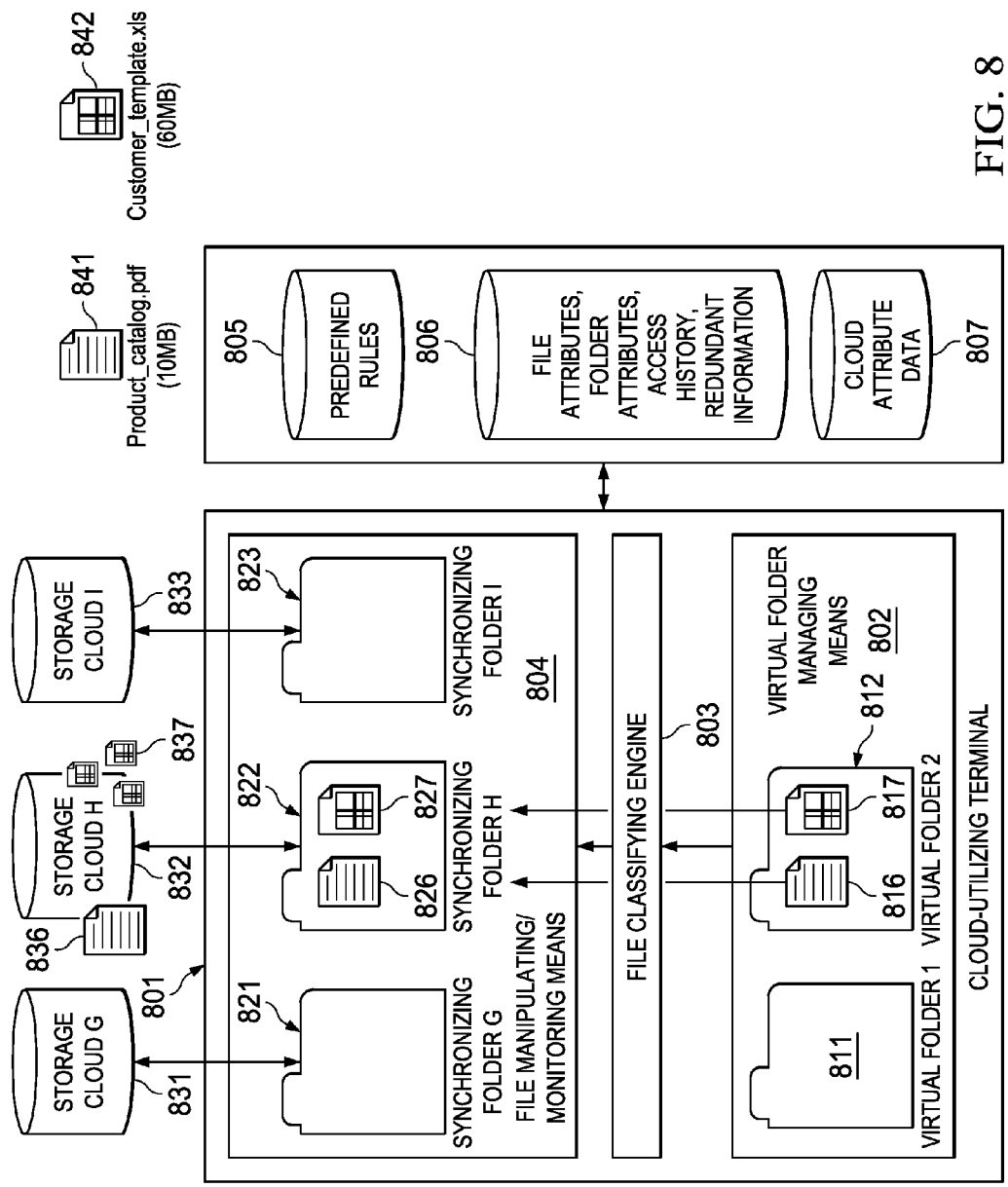
FIG. 8 shows an example of an entity file used by a user at the office, and an example of storage cloud synchronization of the entity file in the cloud-utilizing terminal using synchronizing folders according to an embodiment of the present invention.

FIG. 8 shows an example of an entity file used by a user at the office, and an example of storage cloud synchronization of the entity file in the cloud-utilizing terminal using synchronizing folders according to an embodiment of the present invention. The predefined rules (805) are the same as the predefined rules (705) described in the explanation of FIG. 7.

In FIG. 8, there is a link (816) to the file "product_catalog.pdf" and a link (817) to the file "customer_template.xls" (842) in virtual folder 2 (812), the entity file (836) corresponding to link (816) is stored in storage cloud H (832), and the entity file (827) corresponding to link (817) is divided into a plurality of sections and stored in storage cloud H (832).

At work, the user creates virtual folder 2 (812) in the cloud-utilizing terminal (801). The user stores the file "product_catalog.pdf" (841) in virtual folder 2 (812) which has the attribute "not permanent storage". The file size of "product_catalog.pdf" (841) is 10 M bytes.

The virtual folder managing means (802) detects storage of entity file (841) in virtual folder 2 (812). In response, the folder classifying engine (803) uses text analysis or natural language processing to extract attributes from the contents and any context of the entity file (841). The entity file manipulating means (804) references the contents, various attribute values (306), and the cloud attribute data obtained from the characteristic survey engine (138), selects storage cloud H (832) satisfying the predefined rules (805) from among storage clouds G-I (831-833), and identifies synchronizing folder H (822) associated with the selected storage cloud H (832). In this embodiment, medium-security storage cloud H (832) satisfies the predefined rules (805) because the file "product_catalog.pdf" (841) is a business file that does not include either confidential information or personal information. Next, the entity file manipulating means (804) copies the entity file (816) in virtual folder 2 (812) to synchronizing folder H (822). In response, the virtual folder managing means (802) displays a link (816) to the entity file (826) moved to synchronizing folder H (822) in virtual folder 2 (812). The entity file manipulating means (804) uploads the entity file (826) in synchronizing folder H (822) to storage cloud H (832) associated with synchronizing folder H (822). Storage cloud H (832) stores the entity file (836) uploaded to storage cloud H (832). Because storage cloud H (832) has a per-file limit of 25 M, the entity file manipulating means (804) uploads entity file (826) (file size: 10 M) to storage cloud H (832) without dividing the file into sections.

Storage cloud H (832) has an expiration date in which the files stored in storage cloud H (832) are deleted unless they have been accessed in the past week (see FIG. 4B). The entity file monitoring means (804) may display a warning before the expiration date has been reached that the entity file (836) will be deleted from the storage cloud H (832). If no such instruction has been provided by the user, storage cloud H (832) deletes entity file (836). Also, the entity file monitoring means (804) deletes the entity file (826) in the synchronizing folder (822). The entity file monitoring means (804) may be set to copy (that is, update) the entity file (836) in the storage cloud H (832) or store the file in another storage cloud before the expiration date is reached. The entity file manipulating means (704) may display a screen to prompt the user to establish these settings.

At work, the user stores the file "client_template.xls" (842) in virtual folder 2 (812) which has the attribute "permanent storage". The file size of "client_template.xls" (842) is 60 M bytes.

The virtual folder managing means (802) detects storage of entity file (842) in virtual folder 2 (812). In response, the folder classifying engine (803) uses text analysis or natural language processing to extract attributes from the contents and any context of the entity file (842). The entity file manipulating means (804) references the contents, various attribute values (306), and the cloud attribute data obtained from the characteristic survey engine (138), selects storage cloud H (832) satisfying the predefined rules (805) from among storage clouds G-I (831-833), and identifies synchronizing folder H (822) associated with the selected storage cloud H (832). In this embodiment, medium-security storage cloud H (832) satisfies the predefined rules (805) because the file "client_template.xls" (842) is a business file that does not include either confidential information or personal information. Next, the entity file manipulating means (804) copies the entity file (817) in virtual folder 2 (812) to synchronizing folder H (822). In response, the virtual folder managing means (802) displays a link (817) to the entity file (827) moved to synchronizing folder H (822) in virtual folder 2 (812). The entity file manipulating means (804) uploads the entity file (827) in synchronizing folder H (822) to storage cloud H (832) associated with synchronizing folder H (822). Storage cloud H (832) stores the entity file (837) uploaded to storage cloud H (832). Because storage cloud H (832) has a per-file limit of 25 M, the entity file manipulating means (804) uploads entity file (827) (file size: 60 M) to storage cloud H (832) after dividing the file into three sections that do not exceed the per-file limit of 25 M.

Storage cloud H (832) has an expiration date in which the files stored in storage cloud H (832) are deleted unless they have been accessed in the past week (see FIG. 4B). The entity file monitoring means (804) may display a warning before the expiration date has been reached that the three files constituting entity file (837) will be deleted from the storage cloud H (832). If no such instruction has been provided by the user, storage cloud H (832) deletes entity file (837). Also, the entity file monitoring means (804) deletes the entity file (827) in the synchronizing folder (822). The entity file monitoring means (804) may be set to copy (that is, update) the entity file (837) in the storage cloud H (832) or store the file in another storage cloud before the expiration date is reached. The entity file manipulating means (804) may display a screen to prompt the user to establish these settings.

Figure 9:
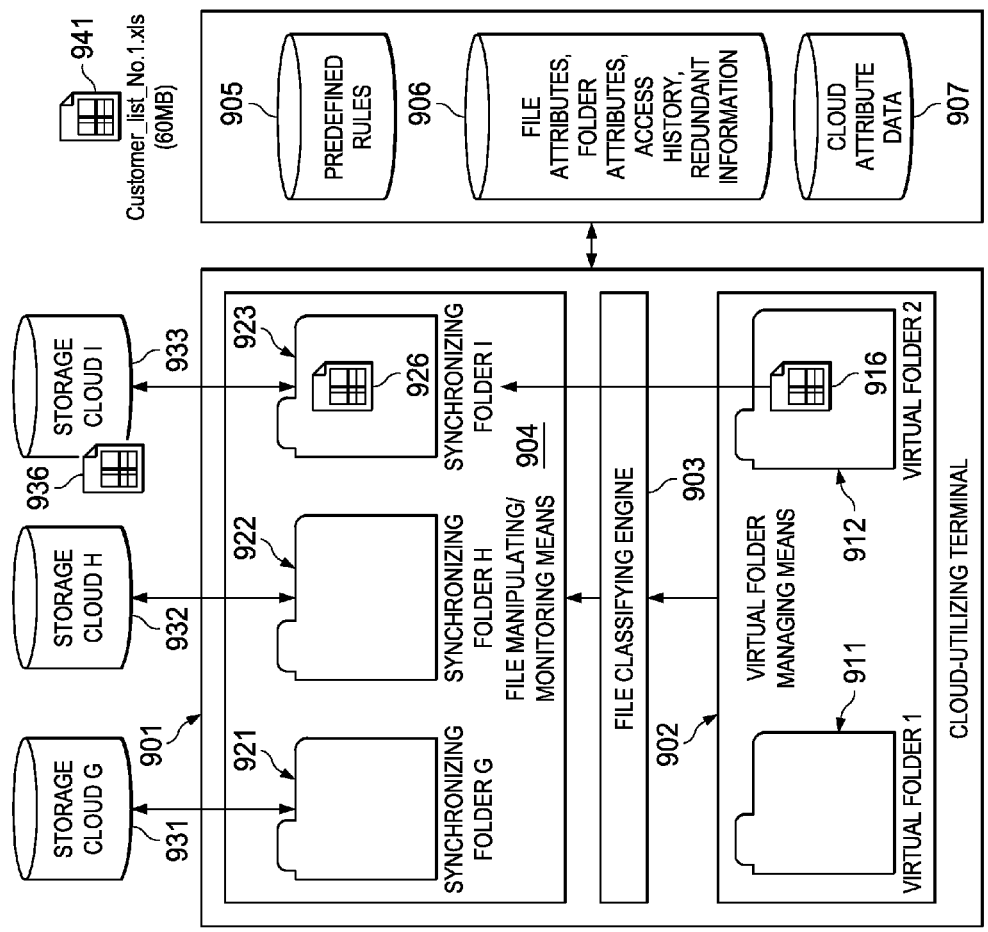
FIG. 9 shows an example of an entity file used by a user at the office, and an example of storage cloud synchronization of the entity file in the cloud-utilizing terminal using synchronizing folders according to an embodiment of the present invention.

FIG. 9 shows an example of an entity file used by a user at the office, and an example of storage cloud synchronization of the entity file in the cloud-utilizing terminal using synchronizing folders according to an embodiment of the present invention. The predefined rules (905) are the same as the predefined rules (705) described in the explanation of FIG. 7.

In FIG. 9, there is a link (916) to the file "customer_list_No1.xls" (941), and the entity file (936) corresponding to link (916) is stored in storage cloud I (933).

At work, the user creates virtual folder 2 (912) in the cloud-utilizing terminal (901). The user stores the file "customer_list_No1.xls" (941) in virtual folder 2 (912) which has the attribute "permanent storage". The file size of "customer_list_No1.xls" (941) is 60 M bytes.

The virtual folder managing means (902) detects storage of entity file (941) in virtual folder 2 (912). In response, the folder classifying engine (903) uses text analysis or natural language processing to extract attributes from the contents and any context of the entity file (941). The entity file manipulating means (904) references the contents, various attribute values (306), and the cloud attribute data obtained from the characteristic survey engine (138), selects storage cloud I (933) satisfying the predefined rules (905) from among storage clouds G-I (931-933), and identifies synchronizing folder I (923) associated with the selected storage cloud I (933). In this embodiment, high-security storage cloud I (933) satisfies the predefined rules because the file "customer_list_No1.xls" (941) is a business file including either confidential information or personal information. Next, the entity file manipulating means (904) copies the entity file (916) in virtual folder 2 (912) to synchronizing folder I (923). In response, the virtual folder managing means (902) displays a link (916) to the entity file (926) moved to synchronizing folder I (923) in virtual folder 2 (912). The entity file manipulating means (904) uploads the entity file (926) in synchronizing folder I (923) to storage cloud I (933) associated with synchronizing folder I (923). Storage cloud I (933) stores the entity file (936) uploaded to storage cloud I (933). Because storage cloud I (933) does not have a per-file limit, the entity file manipulating means (904) uploads entity file (926) (file size: 60 M) to storage cloud I (933) without dividing the file into sections.

Storage cloud I (933) does not have an expiration date for deleting files stored in storage cloud I (933) (see FIG. 4B). Therefore, the entity file (737) in storage cloud I (933) is not deleted.

Figure 10A:
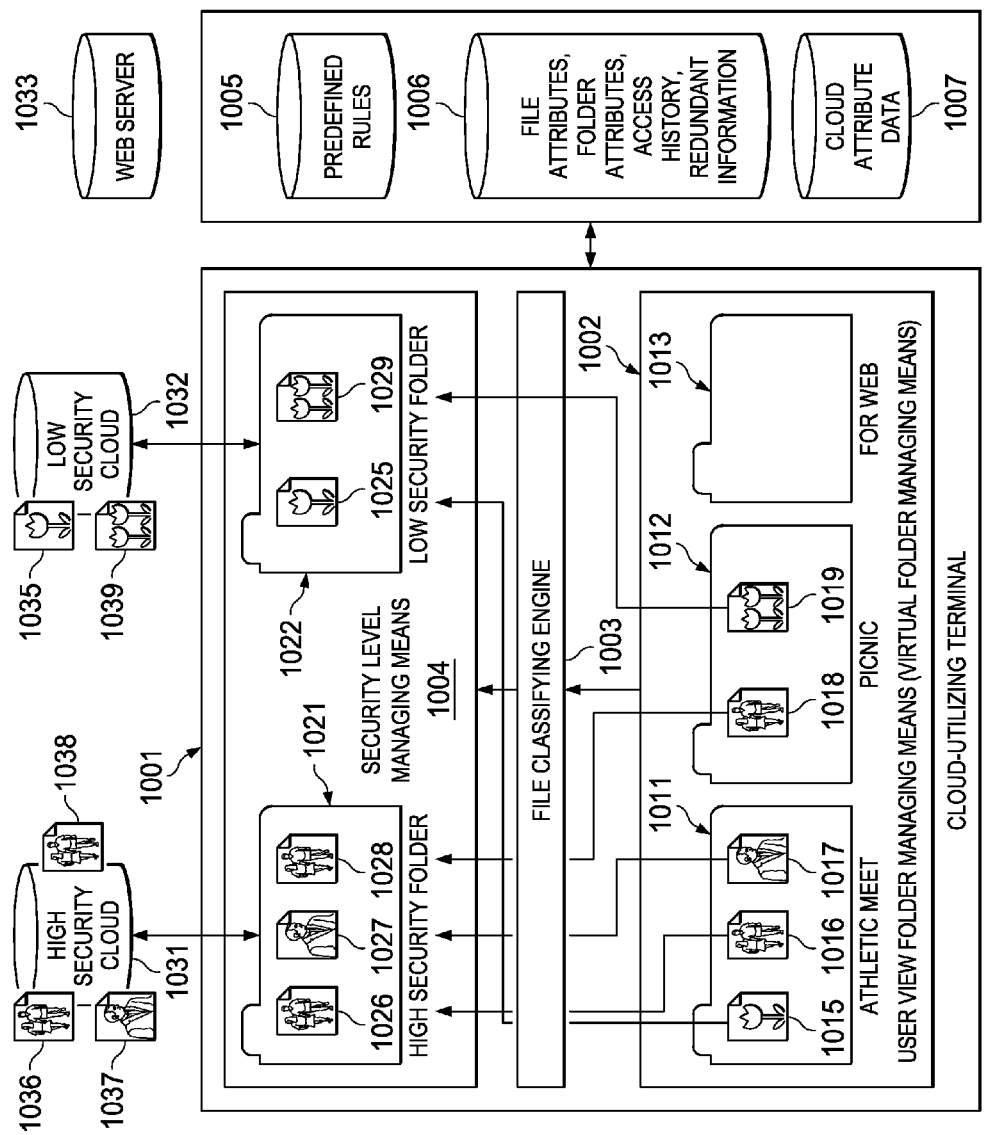
FIG. 10A shows an example of an entity file classified according to the security level of the entity file, and an example of storage cloud synchronization of the entity file in the cloud-utilizing terminal using synchronizing folders according to an embodiment of the present invention.
Figure 10B:
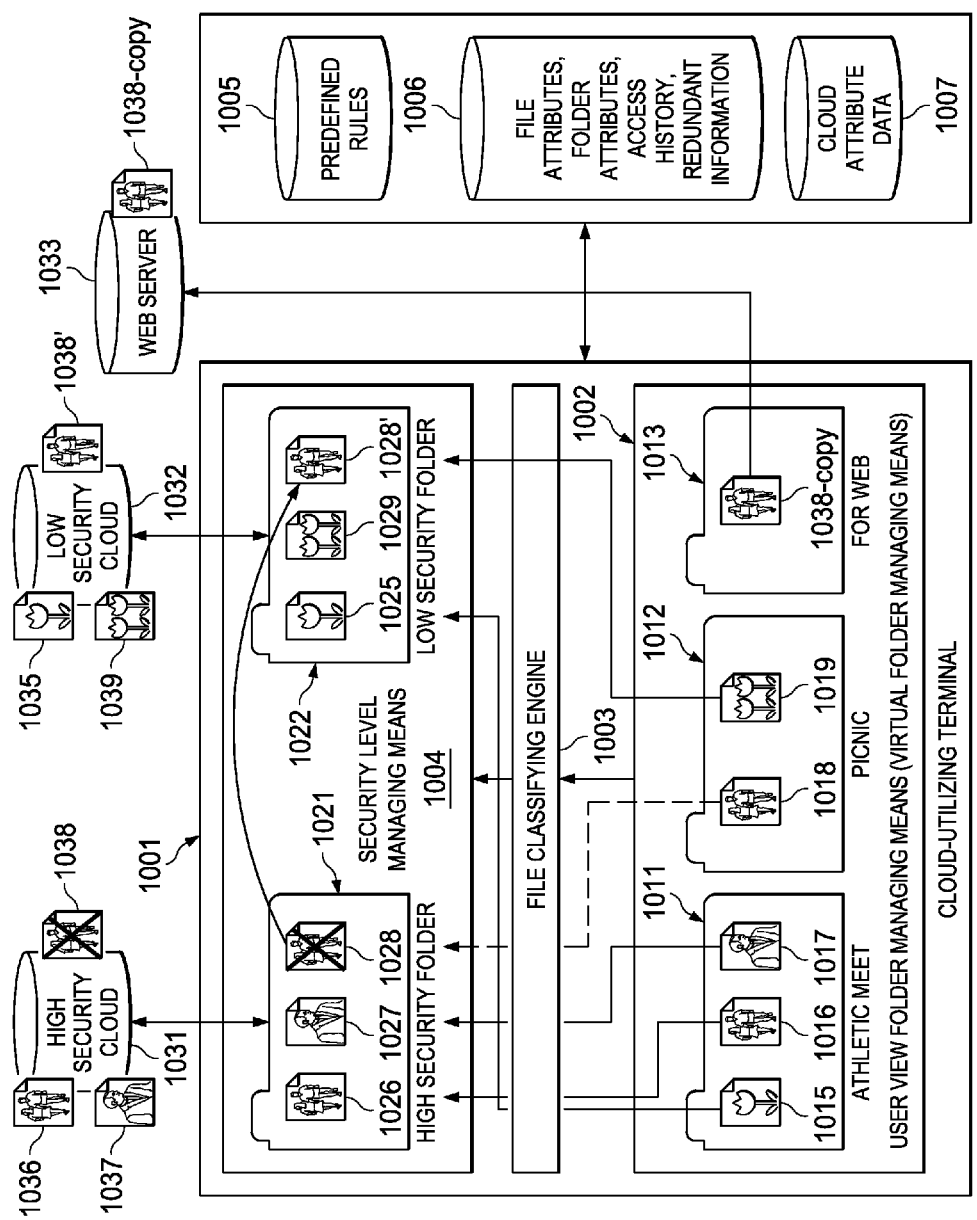
FIG. 10B shows an example of an entity file classified according to the security level of the entity file, and an example of storage cloud synchronization of the entity file in the cloud-utilizing terminal using synchronizing folders according to an embodiment of the present invention.

FIG. 10A and FIG. 10B show examples of an entity file classified according to the security level of the entity file, and examples of storage cloud synchronization of the entity file in the cloud-utilizing terminal using synchronizing folders according to an embodiment of the present invention. The predefined rules (1005) are the same as the predefined rules (705) described in the explanation of FIG. 7.

In FIG. 10A, an individual user manages photographs by event ("2011 athletic meet" and "2012 picnic") on a tablet terminal. In FIG. 10A, there is a link (1015) to a scenery image file and two links (1016 and 1017) to person image files in virtual folder 1 "2011 athletic meet" (1011), and a link (1018) to a person image file and a link (1019) to a scenery image file in virtual folder 2 "2012 picnic" (1012). The entity files (1036, 1037, 1038) corresponding to the links (1016, 1017, 1018) to the person image files are stored in a high-security storage cloud (referred to as the "high-security cloud" below) (1031), and the entity files (1035, 1039) corresponding to the links (1015, 1019) to the scenery image files are stored in a low-security storage cloud (referred to as the "low-security cloud" below) (1032).

The virtual folder managing means (1002) detects storage of a scenery image file in virtual folder 1 (1011). In response, the folder classifying engine (1003) uses text analysis or natural language processing to extract attributes from the contents and any context of the scenery image file. The entity file manipulating means (1004) references the contents, various attribute values (306), and the cloud attribute data obtained from the characteristic survey engine (138), selects the low-security storage cloud (1032) satisfying the predefined rules (1005) from among the high-security storage cloud (1031) and the low-security storage cloud (1032), and identifies the low-security synchronizing folder (1022) associated with the selected low-security storage cloud (1032). In this embodiment, the low-security storage cloud (1032) satisfies the predefined rules (1005) because the scenery image file does not include confidential information or personal information. Next, the entity file manipulating means (1004) copies the entity file (1015) in virtual folder 1 (1011) to low-security synchronizing folder (1022). In response, the virtual folder managing means (1002) displays a link (1015) to the entity file (1025) moved to the low-security synchronizing folder (1022) in virtual folder 1 (1011). The entity file manipulating means (1004) uploads the entity file (1025) in the low-security synchronizing folder (1022) to the low-security cloud (1032) associated with the low-security synchronizing folder (1022). The low-security cloud (1032) stores the entity file (1035) uploaded to the low-security cloud (1032).

The virtual folder managing means (1002) detects storage of a person image file in virtual folder 1 (1011). In response, the folder classifying engine (1003) uses text analysis or natural language processing to extract attributes from the contents and any context of the person image file. The entity file manipulating means (1004) references the contents, various attribute values (306), and the cloud attribute data obtained from the characteristic survey engine (138), selects the high-security storage cloud (1031) satisfying the predefined rules (1005) from among the high-security storage cloud (1031) and the low-security storage cloud (1032), and identifies the high-security synchronizing folder (1021) associated with the selected high-security storage cloud (1031). In this embodiment, the high-security storage cloud (1031) satisfies the predefined rules (1005) because the person image file includes personal information. Next, the entity file manipulating means (1004) copies the entity files (1016 and 1017) in virtual folder 1 (1011) to high-security synchronizing folder (1021). In response, the virtual folder managing means (1002) displays links (1016 and 1017) to the entity files (1026 and 1027) moved to the high-security synchronizing folder (1021) in virtual folder 1 (1011). The entity file manipulating means (1004) uploads the entity files (1026 and 1027) in the high-security synchronizing folder (1021) to the high-security cloud (1031) associated with the high-security synchronizing folder (1021). The high-security cloud (1031) stores the entity files (1036 and 1037) uploaded to the high-security cloud (1031).

The virtual folder managing means (1002) detects storage of a person image file in virtual folder 2 (1012). In response, the folder classifying engine (1003) uses text analysis or natural language processing to extract attributes from the contents and any context of the person image file. The entity file manipulating means (1004) references the contents, various attribute values (306), and the cloud attribute data obtained from the characteristic survey engine (138), selects the high-security storage cloud (1031) satisfying the predefined rules (1005) from among the high-security storage cloud (1031) and the low-security storage cloud (1032), and identifies the high-security synchronizing folder (1021) associated with the selected high-security storage cloud (1031). In this embodiment, the high-security storage cloud (1031) satisfies the predefined rules (1005) because the person image file includes personal information. Next, the entity file manipulating means (1004) copies the entity file (1018) in virtual folder 2 (1011) to the selected high-security synchronizing folder (1021). In response, the virtual folder managing means (1002) displays a link (1018) to the entity file (1028) moved to the high-security synchronizing folder (1021) in virtual folder 2 (1012). The entity file manipulating means (1004) uploads the entity file (1028) in the high-security synchronizing folder (1021) to the high-security cloud (1031) associated with the high-security synchronizing folder (1021). The high-security cloud (1031) stores the entity file (1038) uploaded to the high-security cloud (1031).

The virtual folder managing means (1002) detects storage of a scenery image file in virtual folder 2 (1012). In response, the folder classifying engine (1003) uses text analysis or natural language processing to extract attributes from the contents and any context of the scenery image file. The entity file manipulating means (1004) references the contents, various attribute values (306), and the cloud attribute data obtained from the characteristic survey engine (138), selects the low-security storage cloud (1032) satisfying the predefined rules (1005) from among the high-security storage cloud (1031) and the low-security storage cloud (1032), and identifies the low-security synchronizing folder (1022) associated with the selected low-security storage cloud (1032). In this embodiment, the low-security storage cloud (1032) satisfies the predefined rules (1005) because the scenery image file does not include personal information. Next, the entity file manipulating means (1004) copies the entity file (1019) in virtual folder 2 (1012) to the selected low-security synchronizing folder (1022). In response, the virtual folder managing means (1002) displays a link (1019) to the entity file (1029) moved to the low-security synchronizing folder (1022) in virtual folder 2 (1012). The entity file manipulating means (1004) uploads the entity file (1029) in the low-security synchronizing folder (1022) to the low-security cloud (1032) associated with the low-security synchronizing folder (1022). The low-security cloud (1032) stores the entity file (1039) uploaded to the low-security cloud (1032).

In FIG. 10A, as mentioned above, an individual user manages photographs on a tablet terminal by event, but the photographs are also classified by security level and automatically uploaded to the storage cloud with the appropriate security level. Therefore, the individual user can simply classify the photographs by event without having to give any thought to the security level.

In FIG. 10B, the individual user, after the operations shown in FIG. 10A, copies (1018-copy) the person image files (1018) (actually, the links) in the virtual folder 2 "2012 picnic" (1012) to web folder (1013) in order to upload (1038-copy) them to web server (1033) where they are made public.

The virtual folder managing means (1002) detects the copying of a person image file in virtual folder 2 (1012) to the web folder. In response, the folder classifying engine (1003) uses text analysis or natural language processing to extract attributes from the contents and any context of the copied person image file. As a result, the entity file manipulating means (1004) references the contents, various attribute values (306), and the cloud attribute data obtained from the characteristic survey engine (138), selects the low-security storage cloud (1032) satisfying the predefined rules (1005) from among the high-security storage cloud (1031) and the low-security storage cloud (1032), and identifies the low-security synchronizing folder (1022) associated with the selected low-security storage cloud (1032). In this embodiment, the low-security storage cloud (1032) satisfies the predefined rules (1005) because the results of the determination are that the person image file has a low security level. Next, the entity file manipulating means (1004) moves the entity file (1028) in the high-security synchronizing folder (1021) to the selected low-security synchronizing folder (1022). In response, the virtual folder managing means (1002) writes over the link (1019) in the low-security synchronizing folder (1022) from the entity file (1028) in the high-security synchronizing folder (1021) to the entity file (1028') in the low-security synchronizing folder (1022). The entity file manipulating means (1004) uploads the entity file (1028') in the low-security synchronizing folder (1022) to the low-security cloud (1032) associated with the low-security synchronizing folder (1022). The low-security cloud (1032) stores the entity file (1038') uploaded to the low-security cloud (1032). The entity file manipulating means (1004) then synchronizes the entity file in the high-security synchronizing folder (1021) with the entity file in the high-security cloud (1031). Because the moving operation deletes the entity file (1028) in the high-security synchronizing folder (1021), the high-security cloud (1031) deletes the entity file (1038) from the high-security cloud (1031).

Figure 11A:
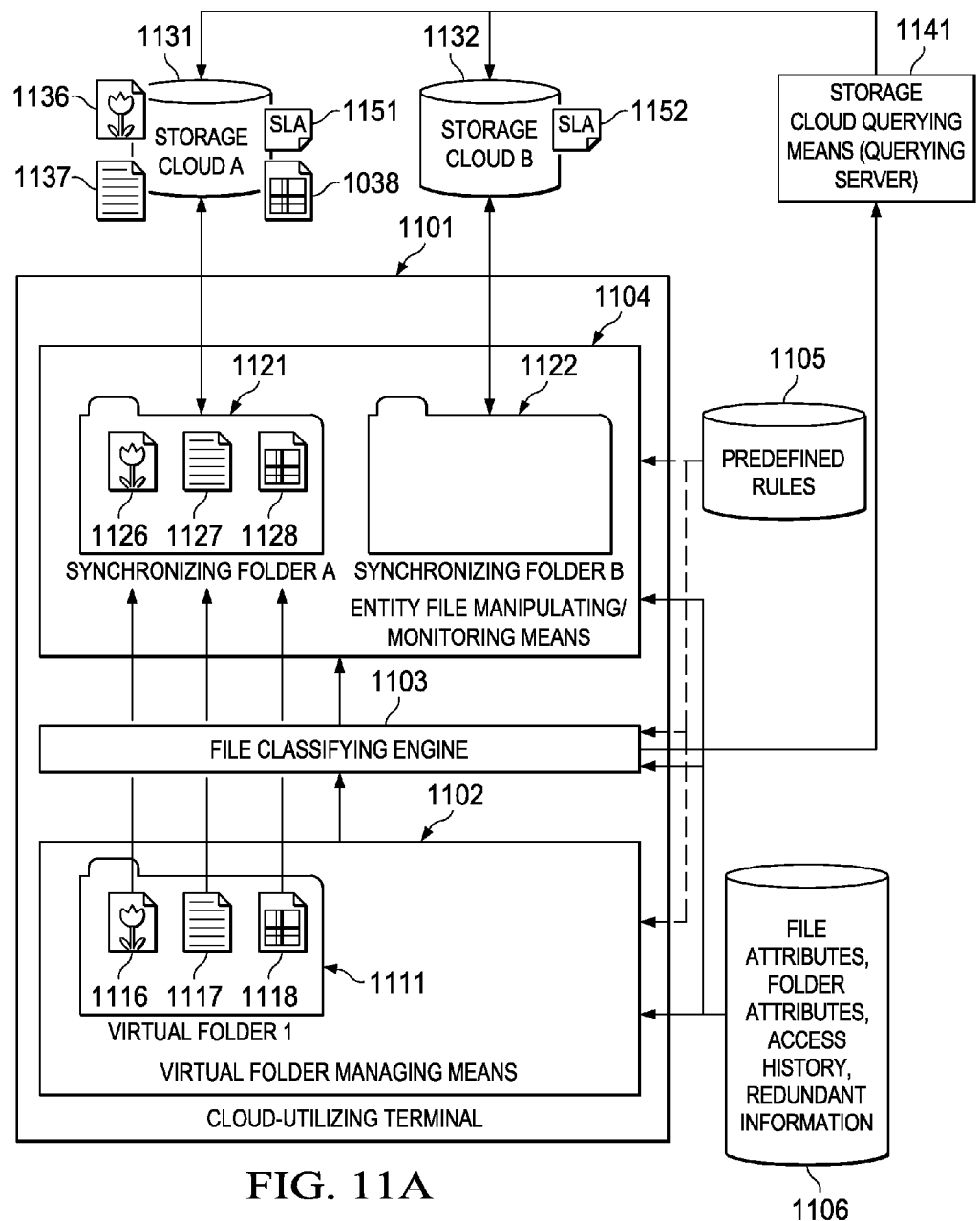
FIG. 11A shows an example of the automatic switching of storage clouds based on changes to the terms and conditions for use of the storage clouds, and an example of storage cloud synchronization of the entity file in the cloud-utilizing terminal using synchronizing folders according to an embodiment of the present invention.
Figure 11B:
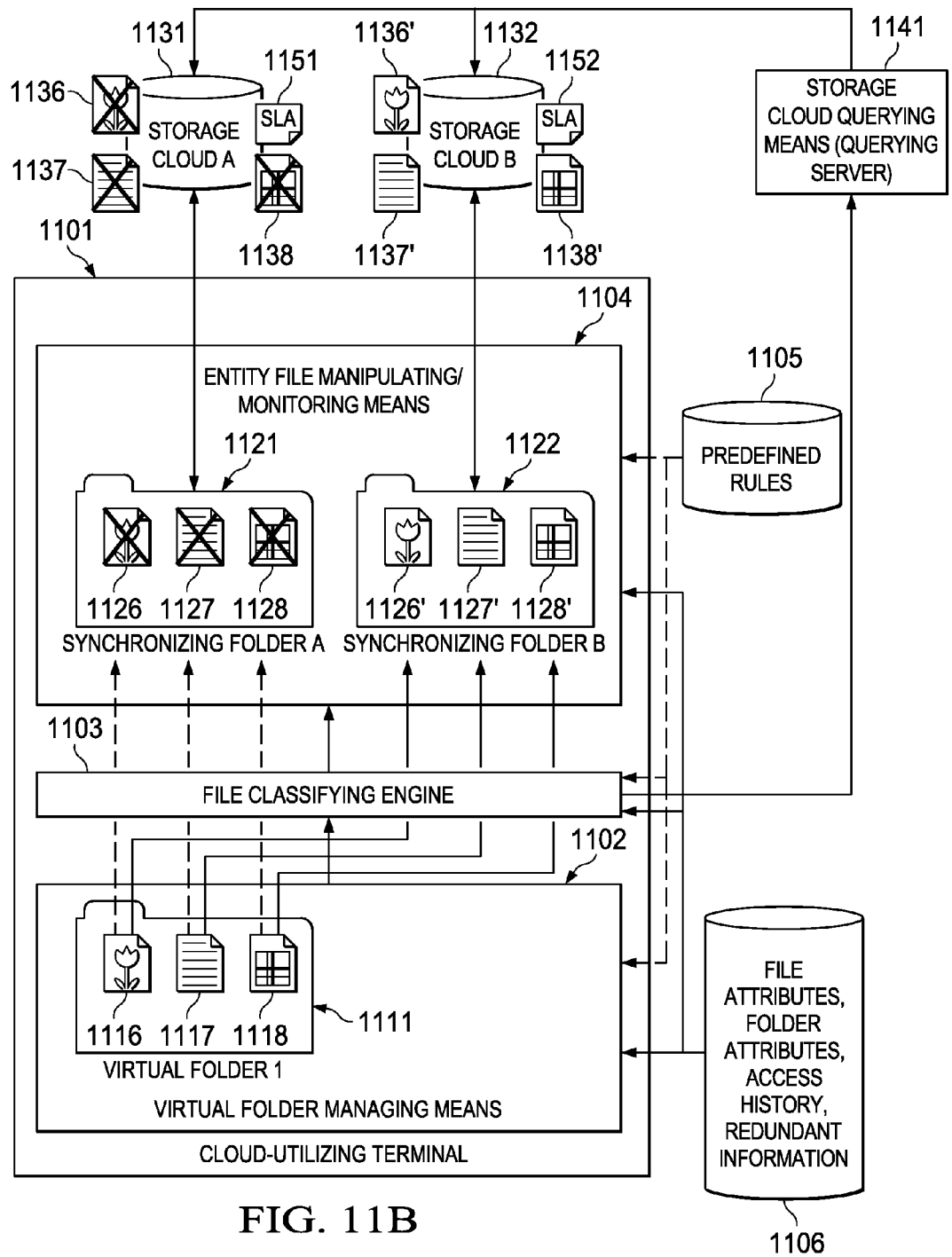
FIG. 11B shows an example of the automatic switching of storage clouds based on changes to the terms and conditions for use of the storage clouds, and an example of storage cloud synchronization of the entity file in the cloud-utilizing terminal using synchronizing folders according to an embodiment of the present invention.

FIG. 11A and FIG. 11B show examples of the automatic switching of storage clouds based on changes to the terms and conditions for use of the storage clouds, and examples of storage cloud synchronization of the entity file in the cloud-utilizing terminal using synchronizing folders according to an embodiment of the present invention. In FIG. 11A, there are links (1116, 1117, 1118) to three files in virtual folder 1

(1111), and the entity files (1136, 1137, 1138) corresponding to these links (1116, 1117, 1118) are stored in storage cloud A (1131).

The storage cloud A (1131) being used has a service licensing agreement (SLA) (1151). However, the SLA (1151) may be unilaterally changed by the administrator of the storage cloud A (1131). After the change, the SLA may no longer satisfy the predefined rules (1105) associated with the cloud-utilizing terminal (1101). Because any revision of contract terms to a storage cloud A (1131) currently in use may increase the risk of personal information or confidential information being divulged, there has to be an automatic switch to another storage cloud with an SLA identical to the SLA (1151) prior to the change (that is, which satisfies the predefined rules (1105) associated with the cloud-utilizing terminal (1101)). In order to be able to perform this automatic switch, a storage cloud querying means (for example, a querying server) (1141) is provided by in-house or by a third-party organization. The storage cloud querying means (1141) standardizes and manages the service agreement terms of each storage cloud. The storage cloud querying means (1141), for example, matches the services of storage clouds satisfying the predefined rules (1105) in response to a request from a cloud-utilizing terminal (1101). Also, the storage cloud querying means (1141) indicates the evaluation priorities for each policy term in the predefined rules (1105) in the cloud attribute data, and provides a list of storage clouds meeting the evaluation priorities in descending order. If public specifications or a standardized application programming interface (API) is provided for storage clouds, a storage cloud querying means (1141) is not required.

In FIG. 11B, there is an automatic switch from storage cloud A (1131) to storage cloud B (1132) when the SLA (1151) of storage cloud A (1131) is changed.

The entity file manipulating means (1104) detects a change to the SLA (1151) of the storage cloud A (1131). The entity file manipulating means (1104) references the changed SLA, the contents of the entity files, various attribute values (306), and the cloud attribute data obtained from the characteristic survey engine (138), and determines that storage cloud A (1131) no longer satisfies the predefined rules (1105). The entity file manipulating means (1004) searches for storage clouds that satisfy the predefined rules (1105), and determines that storage cloud B (1132) satisfies the predefined rules (1105). The entity file manipulating means (1104) moves the entity files (1126, 1127, 1128) in the synchronizing folder A (1121) to the synchronizing folder B (1122) associated with the identified storage cloud B (1132). The entity file manipulating means (1104) then uploads the entity files (1126', 1127', 1128') in the synchronizing folder B (1122) to the storage cloud B (1132) associated with the synchronizing folder B (1122). In response, the virtual folder managing means (1102) rewrites the links (1116, 1117, 1118) in virtual folder 1 (1111) from synchronizing folder A (1121) to synchronizing folder B (1122). In response, the entity file manipulating means (1104) synchronizes the entity files in synchronizing folder A (1121) and storage cloud A (1131). In accordance with this synchronization, storage cloud A (1131) deletes the entity files (1136, 1137, 1138) from storage cloud A (1131).

With this operation, the storage cloud is automatically switched from storage cloud A (1131) to storage cloud B (1132) in accordance with the changes to the storage cloud contract terms.

When entity file manipulating means (1104) performs a search for storage clouds satisfying the predefined rules (1105), evaluation priorities may be indicated for each policy term in the predefined rules (1105). The following is an example of evaluation priorities (priority order) in descending order with No. 1 being the highest priority.

Figure 12:
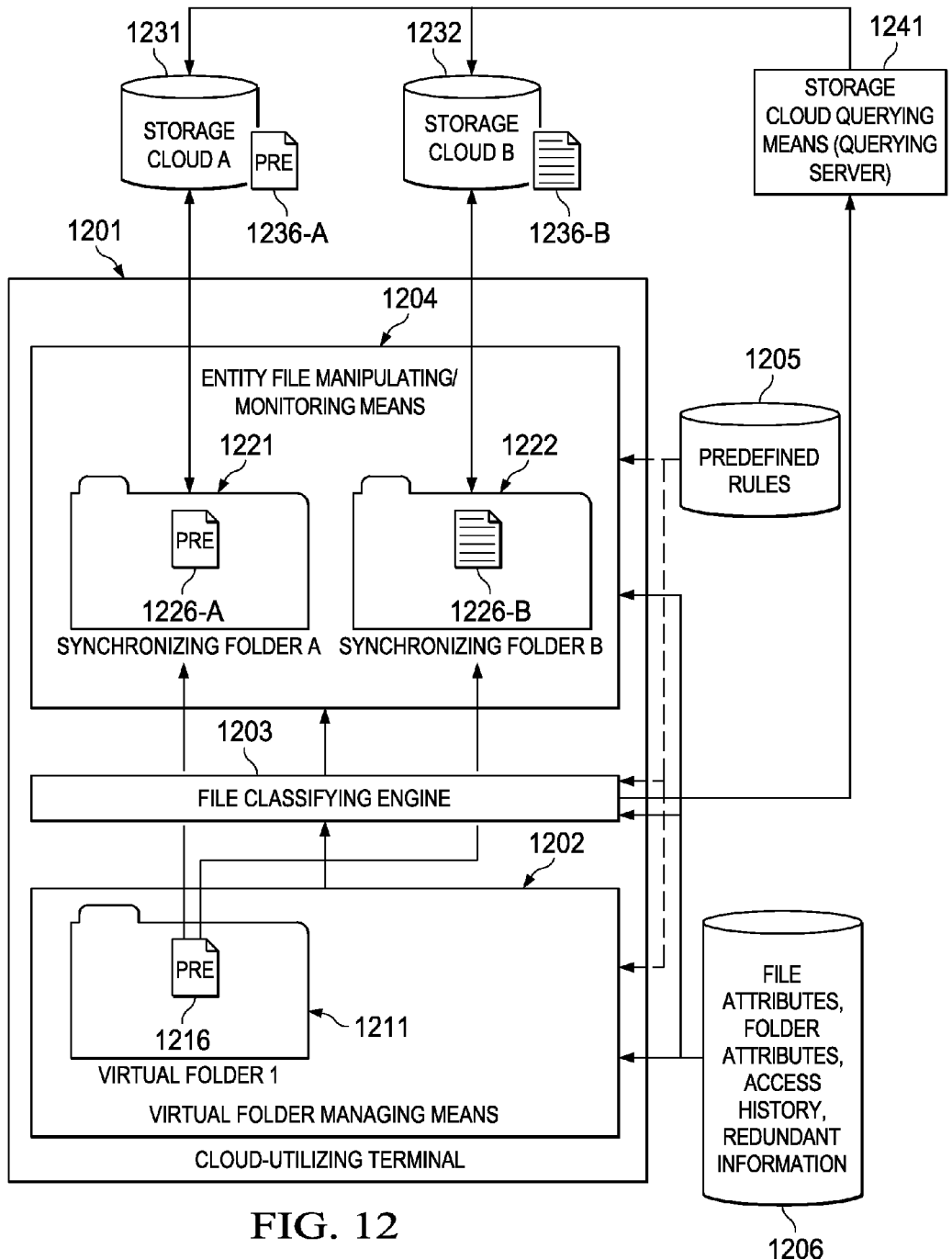
FIG. 12 shows an example of storing entity files in storage clouds depending on whether the files contain confidential information or non-confidential information, and an example of storage cloud synchronization of the entity file in the cloud-utilizing terminal using synchronizing folders according to an embodiment of the present invention.

1. Safety: Encryption Strength
2. Availability: ≥95%
3. Capacity Limit: 2 GB Minimum
4. Contract Period: 3 Months From Now
5. Low Cost: ≤$10/KB FIG. 12 shows an example of storing entity files in storage clouds depending on whether the files contain confidential information or non-confidential information, and an example of storage cloud synchronization of the entity file in the cloud-utilizing terminal using synchronizing folders according to an embodiment of the present invention. In FIG. 12, there is a link (1216) to a presentation file in virtual folder 1 (1211), the entity file corresponding to the link (1216) is divided in two sections based on the content, and the sections are stored in storage cloud A (1231) and storage cloud B (1232).

The virtual folder managing means (1202) detects copying of the entity file in virtual folder 1 (1211). The folder classifying engine (1203) uses text analysis or natural language processing to extract attributes from the contents and any context of the entity file. The entity file has a portion containing personal information and a portion not containing personal information. In the predefined rules (1205), portions of entity files containing personal information are divided as meta-data files, and portions of entity files containing personal information undergo mask processing. The file classifying engine (1203) divides entity files into entity files (1226-A) with mask-processed portions containing personal information, and meta-data files (1226-B) with portions including personal information in accordance with the predefined rules (1205).

The entity file manipulating means (1204) references the contents of the entity file, various attribute values (306), and the cloud attribute data obtained from the characteristic survey engine (138), selects storage cloud A (1231) satisfying the predefined rules (1205) from among the storage cloud A (1231) and storage cloud B (1232), and identifies the synchronizing folder A (1221) associated with the selected storage cloud A (1231). Because entity file (1226-A) does not contain personal information, storage cloud A (1231) satisfies the predefined rules (1205). Next, the entity file manipulating means (1204) stores the entity file (1226-A) in synchronizing folder A (1221). The entity file manipulating means (1204) uploads the entity file (1226-A) in the synchronizing folder A (1221) to storage cloud A (1231) associated with synchronizing folder A (1221). Storage cloud A (1231) stores the entity file (1236-A) uploaded to storage cloud A (1231).

The entity file manipulating means (1204) references the contents of the entity file, various attribute values (306), and the cloud attribute data obtained from the characteristic survey engine (138), selects storage cloud B (1232) satisfying the predefined rules (1205) from among the storage cloud A (1231) and storage cloud B (1232), and identifies the synchronizing folder B (1222) associated with the selected storage cloud B (1232). Because meta-data file (1226-B) contains personal information, storage cloud B (1232) satisfies the predefined rules (1205). Next, the entity file manipulating means (1204) stores the meta-data file (1226-B) in synchronizing folder B (1222). The entity file manipulating means (1204) uploads the meta-data file (1226-B) in the synchronizing folder B (1222) to storage cloud B (1232) associated with synchronizing folder B (1222). Storage cloud B (1232) stores the meta-data file (1236-B) uploaded to storage cloud B (1232).

The virtual folder managing means (1202) displays in virtual folder 1 (1211) the links (1216) to the entity files (1226-A) stored in synchronizing folder A (1221) and the entity meta-data files (1226-B) stored in synchronizing folder B (1222).

By performing these operations, portions of an entity file containing confidential information and portions of an entity file not containing confidential information can be automatically stored in different storage clouds.

Figure 13:
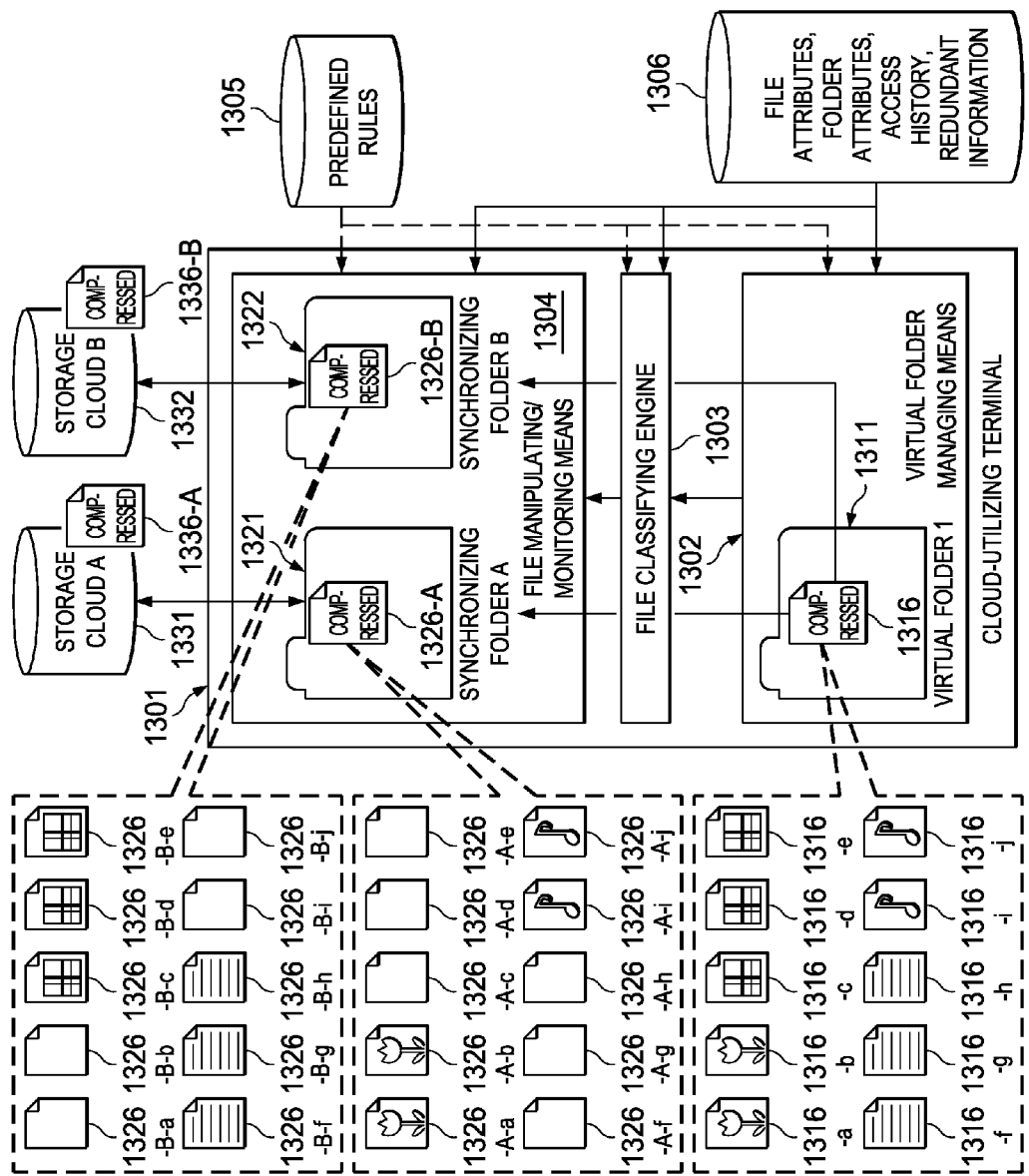
FIG. 13 shows an example of compressing and storing compressed entity files in storage clouds depending on whether the files contain confidential information or non-confidential information, and an example of storage cloud synchronization of the entity file in the cloud-utilizing terminal using synchronizing folders according to an embodiment of the present invention.

FIG. 13 shows an example of compressing and storing compressed entity files in storage clouds depending on whether the files contain confidential information or non-confidential information, and an example of storage cloud synchronization of the entity file in the cloud-utilizing terminal using synchronizing folders according to an embodiment of the present invention. In FIG. 13, there is a link (1316) to a compressed file in virtual folder 1 (1311), the entity file corresponding to the link (1316) is divided in two sections based on the content, and the sections are stored in storage cloud A (1331) and storage cloud B (1332).

The virtual folder managing means (1302) detects copying of the entity files in virtual folder 1 (1311). The folder classifying engine (1303) uses text analysis or natural language processing to extract attributes from the contents and any context of the entity files. The compressed entity files include files containing personal information (1316-c, -d, -e, -f, -g, -h) and files including no personal information (1316-a, -b, -i, -j). In the predefined rules (1305), files containing personal information are separated from files not containing personal information. The file classifying engine (1303) divides compressed entity files into entity files containing personal information (1326-B-c, -d, -e, -f, -g, -h) and entity files not containing personal information (1326-A-a, -b, -i, -j) in accordance with the predefined rules (1305). These are referred to as compressed files (1326-B, 1326-A), respectively.

The entity file manipulating means (1304) references the contents of the compressed files (1326-A), various attribute values (306), and the cloud attribute data obtained from the characteristic survey engine (138), selects storage cloud A (1331) satisfying the predefined rules (1305) from among the storage cloud A (1331) and storage cloud B (1332) for the compressed files (1326-A), and identifies the synchronizing folder A (1321) associated with the selected storage cloud A (1331). Because compressed file (1326-A) does not contain personal information, storage cloud A (1331) satisfies the predefined rules (1305). Next, the entity file manipulating means (1304) stores the compressed file (1326-A) in synchronizing folder A (1321). The entity file manipulating means (1304) uploads the entity file (1326-A) in the synchronizing folder A (1321) to storage cloud A (1331) associated with synchronizing folder A (1321). Storage cloud A (1331) stores the entity file (1336-A) uploaded to storage cloud A (1331).

The entity file manipulating means (1304) references the contents of the compressed files (1326-B), various attribute values (306), and the cloud attribute data obtained from the characteristic survey engine (138), selects storage cloud B (1332) satisfying the predefined rules (1305) from among the storage cloud A (1331) and storage cloud B (1332), and identifies the synchronizing folder B (1322) associated with the selected storage cloud B (1332). Because compressed file (1326-B) contains personal information, storage cloud B (1332) satisfies the predefined rules (1305). Next, the entity file manipulating means (1304) stores the compressed file (1326-B) in synchronizing folder B (1322). The entity file manipulating means (1304) uploads the entity file (1326-B) in the synchronizing folder B (1322) to storage cloud B (1332) associated with synchronizing folder B (1322). Storage cloud B (1332) stores the entity file (1336-A) uploaded to storage cloud B (1332).

The virtual folder managing means (1302) displays in virtual folder 1 (1311) the links (1316) to the compressed files (1326-A) stored in synchronizing folder A (1321) and the compressed files (1326-B) stored in synchronizing folder B (1322).

By performing these operations, compressed files containing confidential information and compressed files not containing confidential information can be automatically stored in different storage clouds.

Figure 14A:
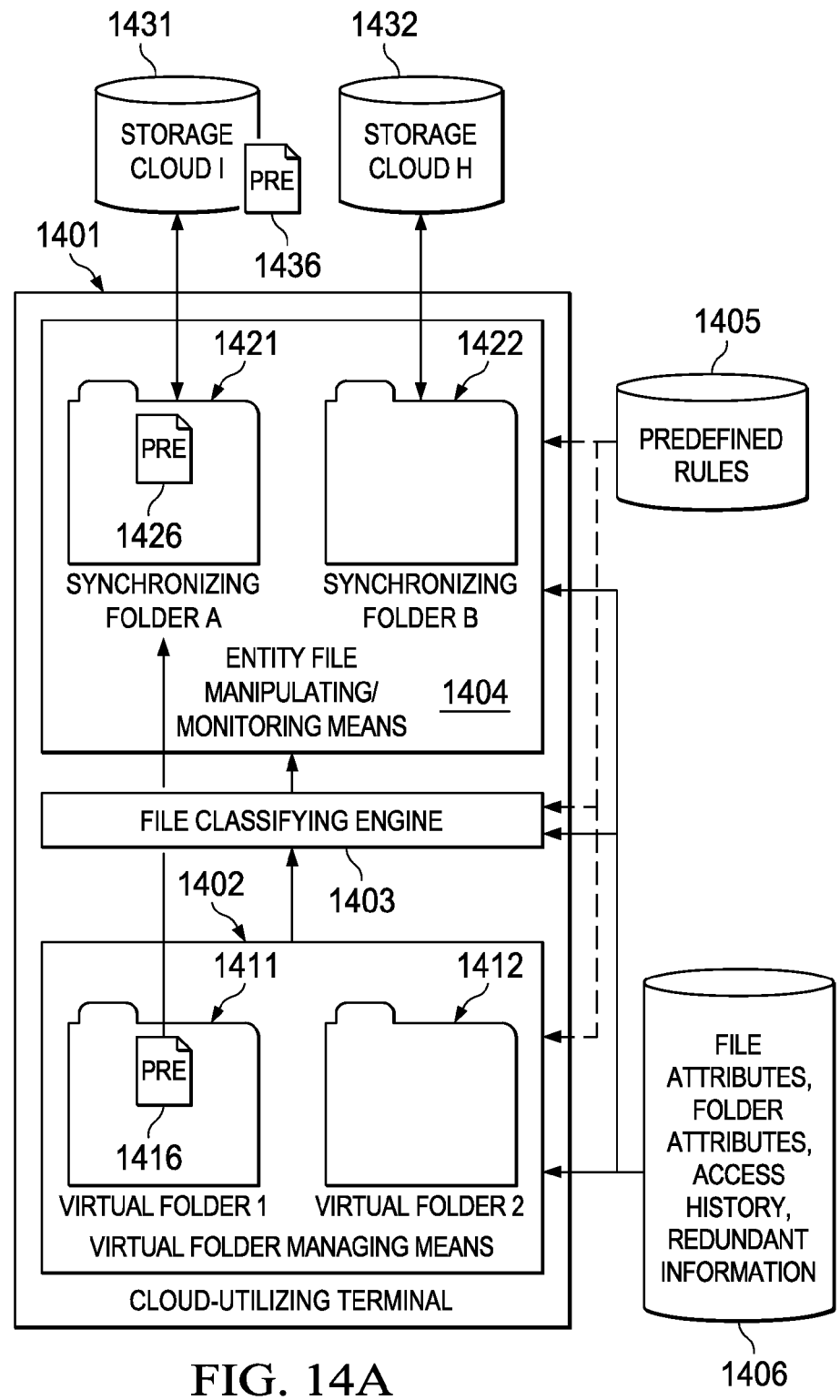
FIG. 14A shows an example enabling temporary call up of an entity file from a storage cloud, and an example of storage cloud synchronization of the entity file in the cloud-utilizing terminal using synchronizing folders according to an embodiment of the present invention.
Figure 14B:
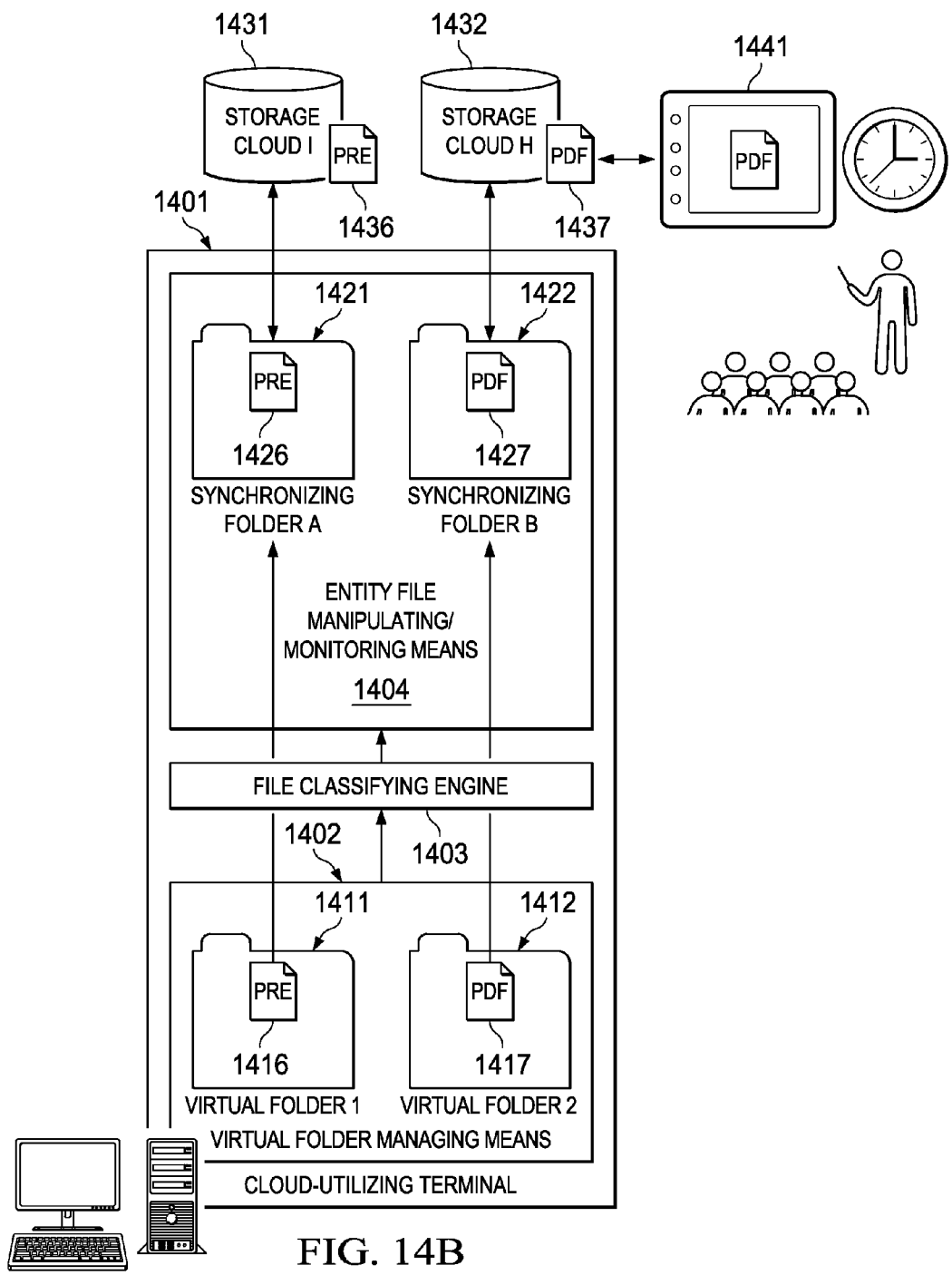
FIG. 14B shows an example enabling temporary call up of an entity file from a storage cloud, and an example of storage cloud synchronization of the entity file in the cloud-utilizing terminal using synchronizing folders according to an embodiment of the present invention.

FIG. 14A and FIG. 14B show examples enabling temporary call up of an entity file from a storage cloud, and examples of storage cloud synchronization of the entity file in the cloud-utilizing terminal using synchronizing folders according to an embodiment of the present invention. In FIG. 14A, there is a link (1416) to a presentation file in virtual folder 1 (1411), and the entity file corresponding to this link (1416) is stored in storage cloud I (1431). The business data handled by the cloud-utilizing terminal (1401) is stored as a general rule in storage cloud I (1431). Only pre-registered cloud-utilizing terminal (1401) is able to browse data stored in storage cloud I (1431).

A user may wish to temporarily display data from a presentation on a tablet for demonstration purposes to customers. However, the data stored in the storage cloud I (1431) cannot be browsed because the tablet has not been pre-registered.

In FIG. 14B, there is a link (1416) to a presentation file in virtual folder 1 (1411), the presentation file corresponding to the link (1416) is stored in storage cloud A (1431), there is a link (1417) to a file in virtual folder 2 (1412) in which the presentation file has been converted to a read-only PDF file, and the PDF file corresponding to the link (1417) has been stored in storage cloud H (1432).

The user converts the presentation file in virtual folder 1 (1411) to a read-only PDF file, and stores the file in virtual folder 2 (1412).

The virtual folder managing means (1402) detects storage of the PDF file in virtual folder 2 (1412). In response, the folder classifying engine (1403) uses text analysis or natural language processing to extract attributes from the contents and any context of the PDF file. The security level managing means (not shown) references the format of the entity file, various attribute values (306), and the cloud attribute data obtained from the characteristic survey engine (138), selects storage cloud H (1432) satisfying the predefined rules (1405) from among storage cloud I (1431) and storage cloud H (1432), and identifies the synchronizing folder B (1422) associated with storage cloud H (1432). In this embodiment, the predefined rules (1405) state that a read-only PDF file is stored in storage cloud H (1432). Thus, storage cloud H (1432) satisfies the predefined rules (1405). Next, the entity file manipulating means (1404) copies the PDF file (1417) in virtual folder 2 (1412) to the indicated synchronizing folder B (1422). In response, the virtual folder managing means (1402) displays a link (1417) to the PDF file (1427) in synchronizing folder B (1422) in virtual folder 2 (1412). The entity file manipulating means (1404) uploads the PDF file (1427) in synchronizing folder B (1422) to storage cloud H (1432) associated with synchronizing folder B (1422). Storage cloud H (1432) stores the PDF file (1437) uploaded to storage cloud H (1432).

These operations allow a tablet terminal (1441) to access storage cloud H (1432) and download the PDF file (1437). As a result, the user can use the downloaded PDF file in demonstrations to customers.

A time limit may be set for allowing the read-only PDF file in the storage cloud H (1432) to be browsed. For example, the read-only PDF file in the storage cloud H (1432) may be synchronized with the tablet terminal (1441) for a certain amount of time (for example, for six hours after conversion to a read-only PDF file). When the time limit expires, the entity file manipulating means (1404) in the cloud-utilizing terminal (1404) deletes the PDF file (1427) from the synchronizing folder B (1422). When the PDF file (1427) is deleted from synchronizing folder B (1422), the PDF file (1437) in storage cloud H (1432) is deleted at the same time as the file in synchronizing folder B (1422). Also, the PDF file downloaded from the tablet terminal (1441) is deleted.

In FIG. 14A and FIG. 14B, virtual folder 2 (1412) is prepared, a link (1417) is placed in virtual folder 2 (1412) to a presentation file converted into a read-only PDF file, and the PDF file corresponding to the link (1417) is stored in storage cloud H (1432). In another embodiment, virtual folder 2 (1412) is not prepared. Instead, the presentation file corresponding to the link (1416) in virtual folder 1 (1411) is converted by an extended function of virtual folder 1 (1411) to a PDF file, and the converted PDF file is stored directly in synchronizing folder B (1422). This is because the purpose of the PDF file (1427) is to be browsed on a tablet terminal (1441), and the cloud-utilizing terminal (1401) does not require a view in virtual folder 2 (1412).

Figure 15:
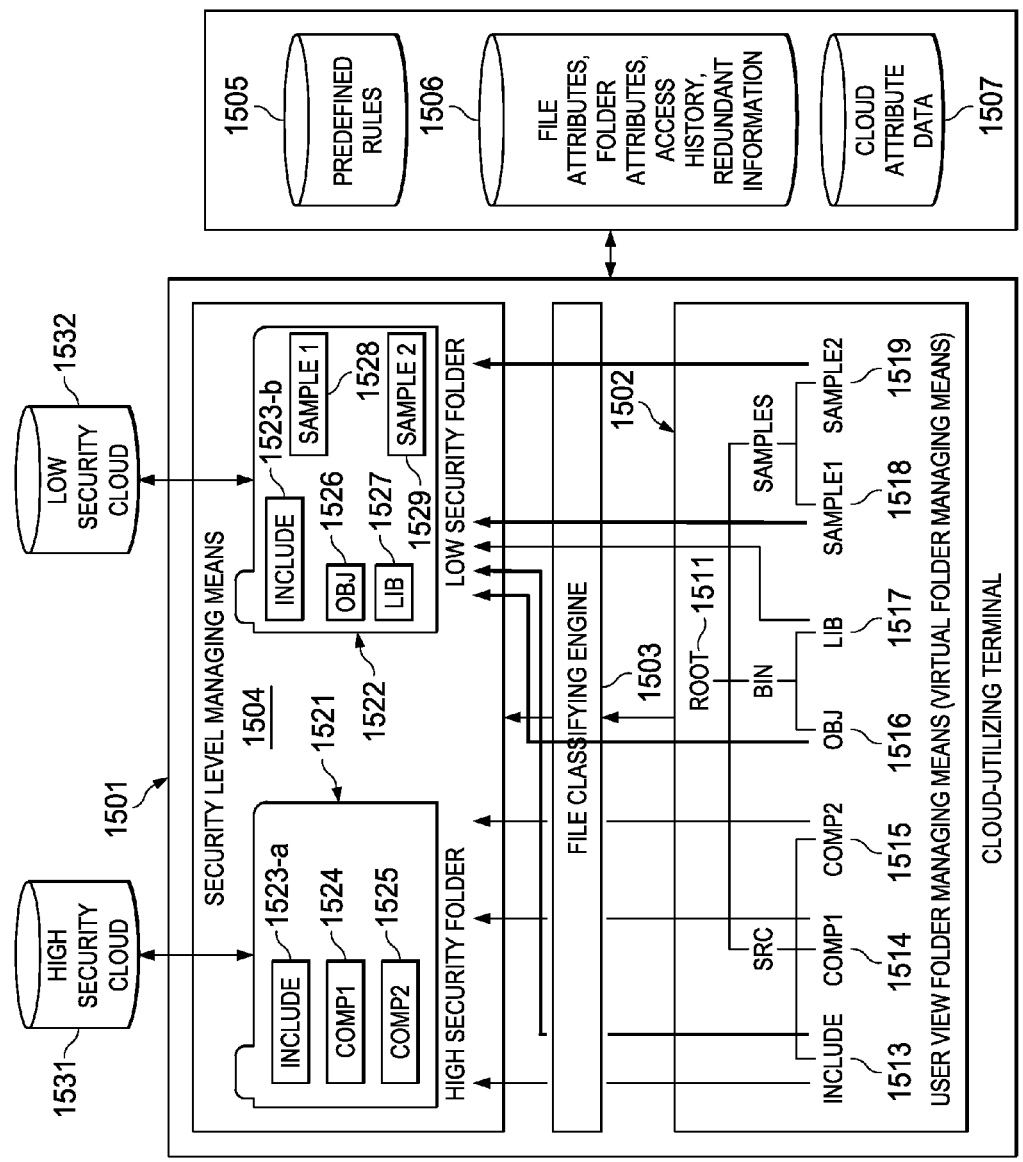
FIG. 15 shows an example of storing source code in storage clouds with different levels of security, and an example of storage cloud synchronization of an entity source code file in the cloud-utilizing terminal using synchronizing folders according to an embodiment of the present invention.

FIG. 15 shows an example of storing source code in storage clouds with different levels of security, and an example of storage cloud synchronization of an entity source code file in the cloud-utilizing terminal using synchronizing folders according to an embodiment of the present invention. In FIG. 15, a source code managing system provides a software development kit (SDK), the "include" and source code (Comp1 and Comp2) that does not have to be publicly disclosed are stored in a high-security storage cloud (1531) (referred to below simply as the "high-security cloud"), and the "include", objects (obj), libraries (Lib), and samples (Sample1 and Sample2) that have to be publicly disclosed are stored in a low-security storage cloud (1532) (referred to below simply as the "low-security cloud").

The virtual folder managing means (1502) detects storage of source code files in a virtual folder, such as a group of source code files represented by a tree structure. The file classifying engine (1503) extracts attributes from the content of the source code files or any context using, for example, text analysis or natural language processing. The file classifying engine (1503) separates source code not to be disclosed publicly (some of 1513, 1514, and 1515) from source code to be disclosed publicly (some of 1513, 1516, 1517, 1518, and 1519). The entity file manipulating means (1504) stores the source code not to be disclosed publicly (some of 1513, 1514, and 1515) in the high-security folder (1521) as (1523-*a*, 1524, and 1525), and the source code to be disclosed publicly (some of 1513, 1516, 1517, 1518, and 1519) in the low-security folder (1522) as (1523-*b*, 1526, 1527, 1528, and 1529)

The entity file manipulating means (1504) references the contents of the entity files, various attribute values (306), and the cloud attribute data obtained from the characteristic survey engine (138), and selects high-security cloud (1531) satisfying the predefined rules (1505) from among the high-security cloud (1531) and the low-security cloud (1532) for the source code not to be publicly disclosed (1523-*a*, 1524, 1525). Next, the entity file manipulating means (1504) uploads the entity files (1523-*a*, 1524, 1525) in the high-security folder (1521) to the high-security cloud (1531). The high-security cloud (1531) stores the entity files uploaded to the high-security cloud (1531).

The entity file manipulating means (1504) references the contents of the entity files, various attribute values (306), and the cloud attribute data obtained from the characteristic survey engine (138), and selects low-security cloud (1532) satisfying the predefined rules (1505) from among the high-security cloud (1531) and the low-security cloud (1532) for the source code to be publicly disclosed (1523-*b*, 1526, 1527, 1528, and 1529). Next, the entity file manipulating means (1504) uploads the entity files (1523-*b*, 1526, 1527, 1528, and 1529) in the low-security folder (1522) to the low-security cloud (1532). The low-security cloud (1532) stores the entity files uploaded to the low-security cloud (1532).

These operations allow a user to automatically store source code in storage clouds with different security levels.

Figure 16A:
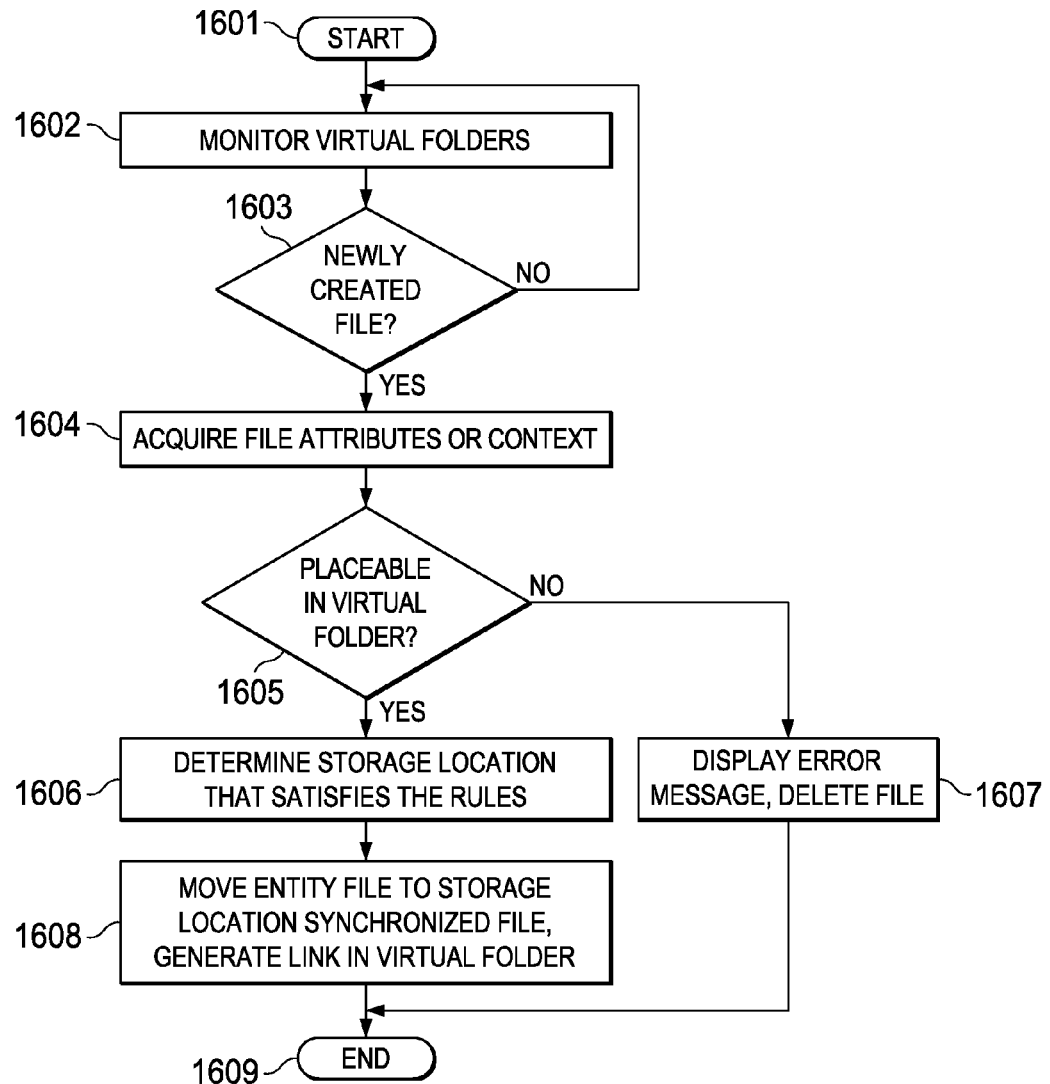
FIG. 16A shows a flowchart for monitoring virtual folders in a cloud-utilizing terminal according to an embodiment of the present invention.

FIG. 16A shows a flowchart for monitoring virtual folders in a cloud-utilizing terminal according to an embodiment of the present invention.

In Step 1601, the virtual folder managing means (132) begins the process of monitoring the virtual folders. The process of managing the virtual folders may begin as soon as a virtual folder is created.

In Step 1602, the virtual folder managing means (132) begins to monitor the virtual folders as soon as the process begins.

In Step 1603, the virtual folder managing means (132) determines whether the processing of a virtual folder is the creation of a new entity file in the virtual folder, or the copying or moving of an entity file to the virtual folder. When the processing of a virtual folder is the creation of a new entity file in the virtual folder, or the copying or moving of an entity file to the virtual folder, the processing advances to Step 1604. When the processing of a virtual folder is not the creation of a new entity file in the virtual folder, or the copying or moving of an entity file to the virtual folder, the process returns to Step 1602. The copying or moving stores an entity file in the virtual folder.

In Step 1604, the file classifying engine (133) acquires the attributes of the entity file (referred to below as the "file attributes"), the context of the entity file, the attributes of the virtual folder, the attributes of the storage clouds, or any combination of these.

In Step 1605, the virtual folder managing means (132) determines whether the entity file created, copied or moved in Step 1603 can be placed in the virtual folder based on the acquired file attributes, context, virtual folder attributes, storage cloud attributes, or any combination of these. The decision criteria may be managed independently of the predefined rules as properties of the virtual folder (for example, as a registry or INI file). When the entity file can be placed in the virtual folder, the process advances to Step 1606. When the entity file cannot be placed in the virtual folder, the process returns to Step 1607.

In Step 1606, the entity file manipulating/monitoring means (134) references the predefined rules (135) to determine whether one or more storage clouds satisfies the predefined rules. For the decision method, refer to the examples in FIG. 17 through FIG. 19.

In Step 1607, the virtual folder managing means (132) displays an error message on the screen (106) indicating that the file cannot be placed in the virtual folder, and the entity file generated in Step 1603 is deleted. The virtual folder managing means (132) then advances to Step 1609 where the process is ended.

In Step 1608, the entity file manipulating/monitoring means (134) moves the entity file from the virtual folder to the synchronizing folder corresponding to the storage cloud determined in Step 1606. The virtual folder managing means (132) generates a link to the entity file moved to the synchronizing folder. An icon for the link is then displayed in the synchronizing folder.

In Step 1609, when a link has been generated in Step 1608 or an entity file has been deleted in Step 1607, the virtual folder managing means (132) ends the process of monitoring the virtual folders.

Figure 16B:
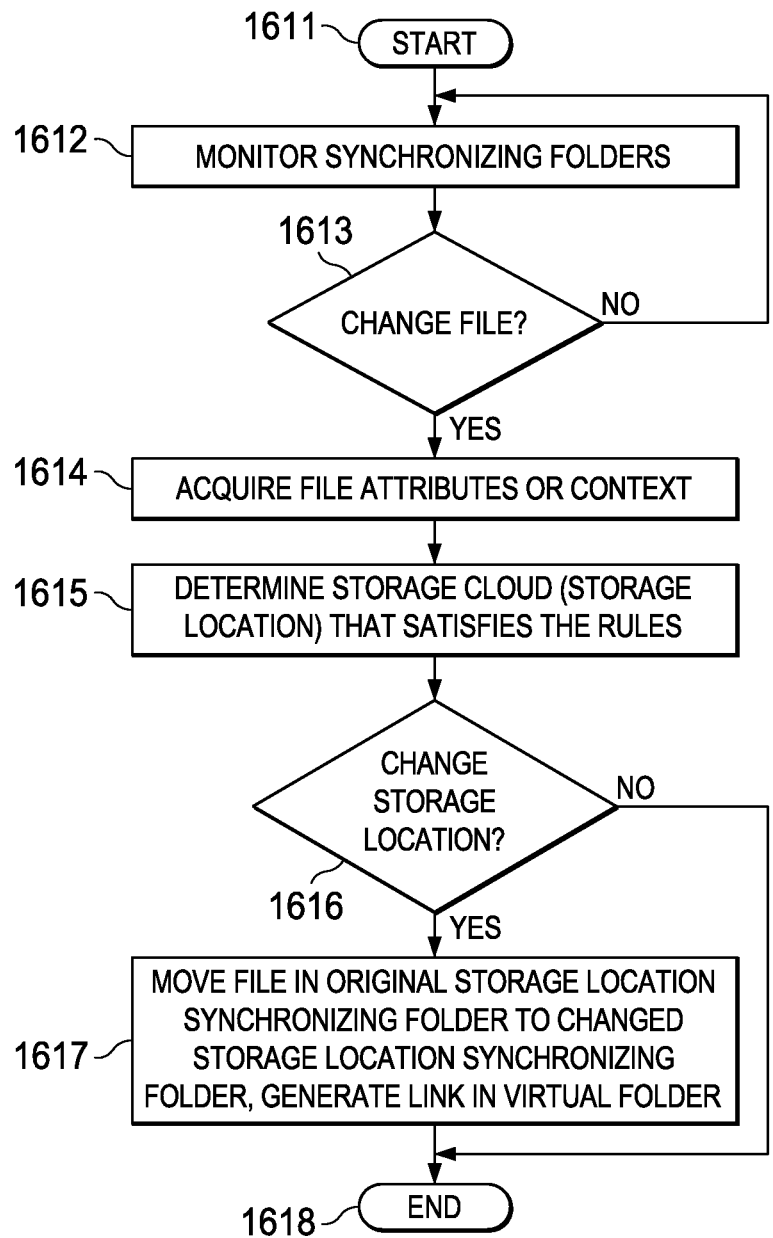
FIG. 16B shows a flowchart for monitoring virtual folders in a cloud-utilizing terminal according to an embodiment of the present invention.

FIG. 16B shows a flowchart for monitoring virtual folders according to an embodiment of the present invention.

In Step 1611, the entity file manipulating/monitoring means (134) begins the process of monitoring the synchronizing folders. The process of managing the synchronizing folders may begin as soon as a synchronizing folder is created.

In Step 1612, the entity file manipulating/monitoring means (134) begins to monitor the synchronizing folders as soon as the process begins.

In Step 1613, the entity file manipulating/monitoring means (134) determines whether the processing of a synchronizing folder is a change in an entity file (for example, editing) in the synchronizing folder. When the processing of a synchronizing folder is a change in an entity file, the processing advances to Step 1614. When the processing of a synchronizing folder is not the changing of an entity file, the process returns to Step 1612.

In Step 1614, the file classifying engine (133) acquires the file attributes, the context of the entity file, or any combination of the two.

In Step 1615, the entity file manipulating/monitoring means (134) references the acquired file attributes, the context of the entity file, the attributes of the virtual folder, the attributes of the storage clouds, or any combination of these, and determines which storage cloud satisfies the predefined rules. For the decision method, see the examples in FIG. 17 through FIG. 19.

In Step 1616, the entity file manipulating/monitoring means (134) determines whether the storage cloud in which the entity files are stored has been changed. When the storage cloud in which the entity files are stored has been changed, the process advances to Step 1617. When the storage cloud in which the entity files are stored has not been changed, the process advances to Step 1618.

In Step 1617, when the storage cloud for storing an entity file has changed, the entity file manipulating/monitoring means (134) moves the entity file in the synchronizing folder associated with the original storage cloud to the synchronizing folder associated with the changed storage cloud. The entity file manipulating/monitoring means (134) uploads the entity file in the synchronizing folder associated with the changed storage cloud to the changed storage cloud. The virtual folder managing means (132) changes the link in the virtual folder from the synchronizing folder associated with the original storage cloud to the synchronizing folder associated with the changed storage cloud.

In Step 1618, when a link has been changed in Step 1617 or a storage destination has been changed in Step 1616, the entity file manipulating/monitoring means (134) ends the process of monitoring the virtual folders.

As shown in the flowchart of FIG. 16B, compliance with internal policy can be ensured by re-evaluating the storage clouds satisfying predefined rules as soon as an entity file is changed (for example, the content of the entity file is changed). Also, content can be better protected in response to the importance of the content of an entity file or a change in the importance, the document status of an entity file or a change in the status, or the ownership of an entity file or a change in ownership. For example, an entity file can be reassigned to a high-security cloud when there is an increase in the importance of the entity file, and an entity file can be reassigned to a low-security cloud when there is a decrease in the importance of the entity file.

Also, the flowchart in FIG. 16B can be used to re-evaluate a storage cloud based, for example, on access to an entity file, access frequency, or the current location of a user accessing a first entity file from a cloud-utilizing terminal. Also, the flowchart in FIG. 16B can be used to periodically delete infrequently accessed entity files from storage clouds.

FIG. 17 shows a flowchart for selecting at least one storage cloud for storing an entity file in a cloud-utilizing terminal according to an embodiment of the present invention.

In Step 1701, the selecting means (145) starts the process for selecting a storage cloud when the process in Step 1615 of FIG. 16B has been started.

In Step 1702, the selecting means (145) selects the storage cloud to be evaluated from, for example, a predetermined list. For example, the storage cloud to be evaluated is storage cloud A, B, C, D, E or F.

In Step 1703, the selecting means (145) determines whether or not an entity file in the synchronizing folder contains confidential information. When the entity file contains confidential information, the process advances to Step 1704. When the entity file does not contain confidential information, the process advances to Step 1705.

In Step 1704, when the entity file contains confidential information, the selecting means (145) excludes storage clouds with low encryption strength from the candidates. For example, storage clouds A and D are excluded.

In Step 1705, the selecting means (145) determines whether or not the operating time for the storage cloud includes from 9 AM to 9 PM. When the operating time for the storage cloud includes from 9 AM to 9 PM, the process advances to Step 1706. When the operating time for the storage cloud does not include from 9 AM to 9 PM, the process advances to Step 1707.

In Step 1706, the selecting means (145), when the operating time for the storage cloud includes from 9 AM to 9 PM, the storage clouds outside of this operating time are excluded from the candidates. For example, storage clouds C and E are excluded.

In Step 1707, the selecting means (145) determine whether or not the location of the storage cloud is near the current location of the cloud-utilizing terminal (131). Here, "near" can mean, for example, a distance within the communication range of the cloud-utilizing terminal (131), such as on the national or regional level (Asia, North America, South America, Europe, etc.). The distance does not have to be a physical distance. It can also reflect routes which take into account network topology. For example, the cloud-utilizing terminal (131) and the storage cloud may be considered near each other if they are connected to the same backbone. The distance may be considered far if the cloud-utilizing terminal (131) cannot reach the storage cloud except via a plurality of gateways. When the location of the storage cloud is considered to be near the current location of the cloud-utilizing terminal (131), the process advances to Step 1708. When the location of the storage cloud is not considered to be near the current location of the cloud-utilizing terminal (131), the process advances to Step 1709.

In Step 1708, when the location of the storage cloud is considered to be near the current location of the cloud-utilizing terminal (131), the rank (selected priority) of the nearby storage cloud is increased by one increment. For example, the rank of storage cloud F is increased by one increment.

In Step 1709, the selecting means (145) determines whether or not the availability of the storage cloud is equal to or greater than 99%. When the availability of the storage cloud is equal to or greater than 99%, the process advances to Step 1710. When the availability of the storage cloud is less than 99%, the process advances to Step 1711.

In Step 1710, when the availability of the storage cloud is equal to or greater than 99%, the selecting means (145) increases the rank (selected priority) of the ≥99% available storage cloud by two increments. For example, storage clouds B and F are both increased by one increment each.

In Step 1711, the selecting means may present the storage cloud with the highest range as the candidate. For example, storage cloud F is presented. Also, the selecting means (145) may present a plurality of storage clouds as candidates, such as two storage clouds. When a plurality of storage clouds is selected, entity files may be stored in all of the selected storage clouds, the entity files may be distributed among a plurality of storage clouds, or a single entity file may be divided and stored in a plurality of storage clouds. The risk diversification may be achieved by storing the entity files in a plurality of storage clouds. Because the user does not have to be aware of which entity file is stored in which storage cloud, the user also does not have to be aware that a plurality of storage clouds has been selected.

In Step 1712, the selecting means (145) ends the process of selecting a storage cloud.

The storage cloud selection logic shown in FIG. 17 is only an example. The selection process can also be performed based on other characteristics such as the condition, monthly fee and performance of the storage cloud, or the update frequency of the entity file. For example, if an entity file is hardly every updated, it can be stored on a storage cloud with low availability. However, if the entity file is updated daily, it should be stored on a storage cloud with high availability.

Figure 18:
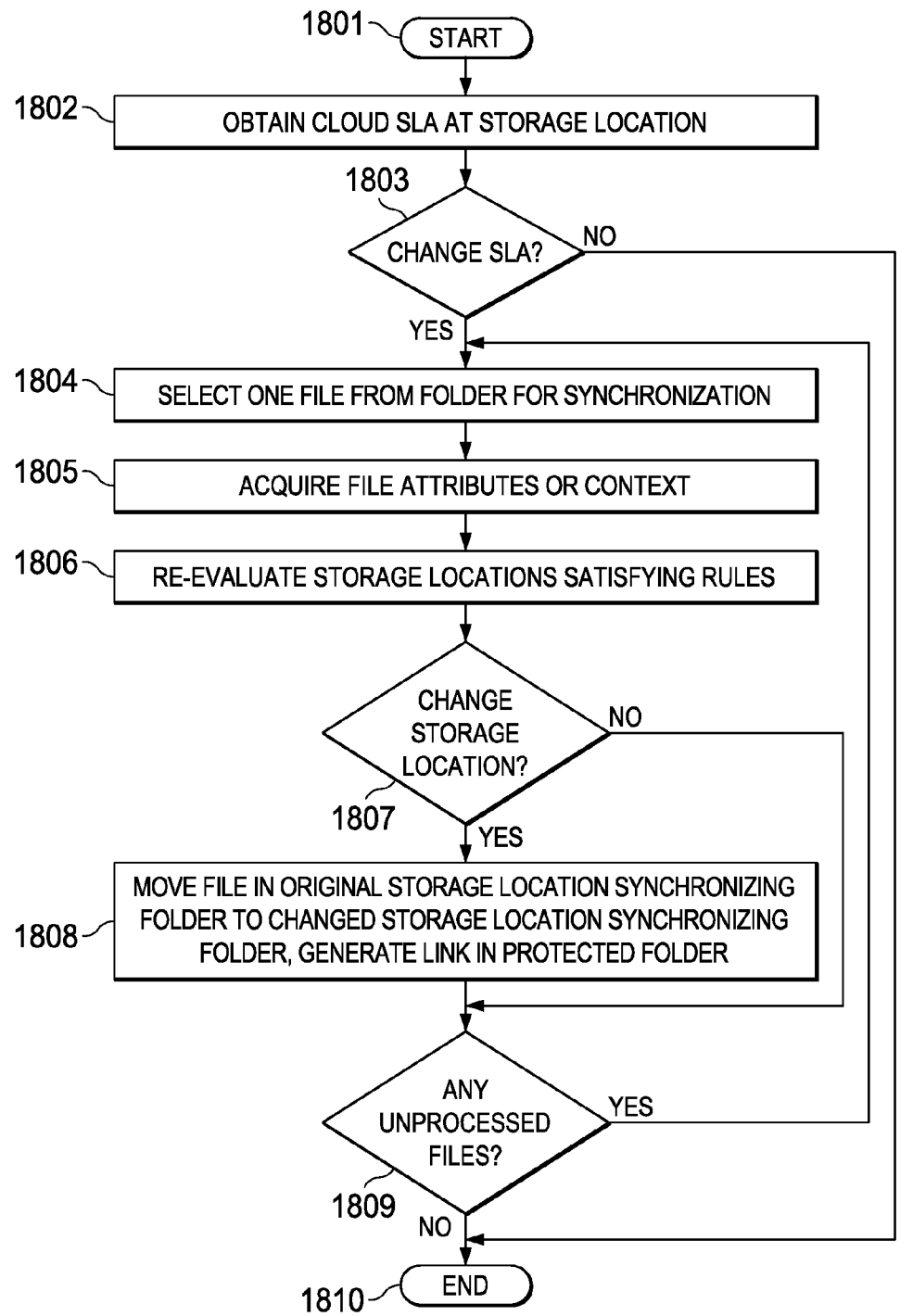
FIG. 18 shows a flowchart for automatically switching the storage cloud for storing an entity file in a cloud-utilizing terminal according to an embodiment of the present invention.

FIG. 18 shows a flowchart for automatically switching the storage cloud for storing an entity file in a cloud-utilizing terminal according to an embodiment of the present invention.

In Step 1801, the entity file manipulating/monitoring means (134) starts the process of automatically switching storage clouds. The process of automatically switching storage clouds is typically performed periodically. Also, the process of automatically switching storage clouds can be triggered when the cloud-utilizing terminal (131) logs in or when the cloud-utilizing terminal (131) is connected to the network.

In Step 1802, the entity file manipulating/monitoring means (134) acquires the SLA of the storage cloud used for storage. The SLA can be acquired using the storage cloud querying means (151) or the characteristic survey engine (138).

In Step 1803, the entity file manipulating/monitoring means (134) determines whether or not the SLA of the storage cloud used for storage has been updated. When the SLA has been updated, the process advances to Step 1804. When the SLA has not been updated, the process advances to Step 1810.

In Step 1804, the entity file manipulating/monitoring means (134) selects an entity file in the synchronizing folder.

In Step 1805, the entity file manipulating/monitoring means (134) acquires the file attributes of the selected entity file, the context of the entity file, or a combination of the two.

In Step 1806, the entity file manipulating/monitoring means (134) references the attributes or context of the acquired file, and re-evaluates the storage cloud used for storage to satisfy the predefined rules.

In Step 1807, the entity file manipulating/monitoring means (134) determines whether or not the storage cloud in which the entity file is to be stored has changed. When the storage cloud used for storage has been changed, the process advances to Step 1808. When the storage cloud used for storage has not changed, the process advances to Step 1809.

In Step 1808, when the storage cloud used for storage has been changed, the entity file manipulating/monitoring means (134) moves the entity file in the synchronizing folder associated with the original storage cloud to the synchronizing folder associated with the changed storage cloud. The entity file manipulating/monitoring means (134) uploads the entity file in the synchronizing folder associated with the changed storage cloud to the changed storage cloud. Also, the entity file manipulating/monitoring means (134) changes the link in the virtual folder from the synchronizing cloud associated with the original storage cloud to the synchronizing folder associated with the changed storage cloud.

In Step 1809, when the link in Step 1808 has been changed or the storage destination in Step 1807 has not been changed, the entity file manipulating/monitoring means (134) determines whether or not there are any entity files in the virtual folder which have not undergone the processing in Steps 1805-1808 (unprocessed entity files). When there is an unprocessed entity file, the process advances to Step 1804. When all of the files have been processed (that is, there are no unprocessed entity files), the process advances to Step 1810.

In Step 1810, the entity file manipulating/monitoring means (134) ends the process of automatically switching storage clouds.

The process of automatically switching storage clouds shown in FIG. 18 may be periodically evaluated for each individual storage cloud used for storage.

As shown in the flowchart of FIG. 18, compliance with internal policy can be ensured by automatically switching storage clouds as soon as the SLA of a storage cloud has changed. Also, the flowchart of FIG. 18 can be used to rearrange entity files in slower, less expensive storage clouds in order to reduce costs.

Figure 19:
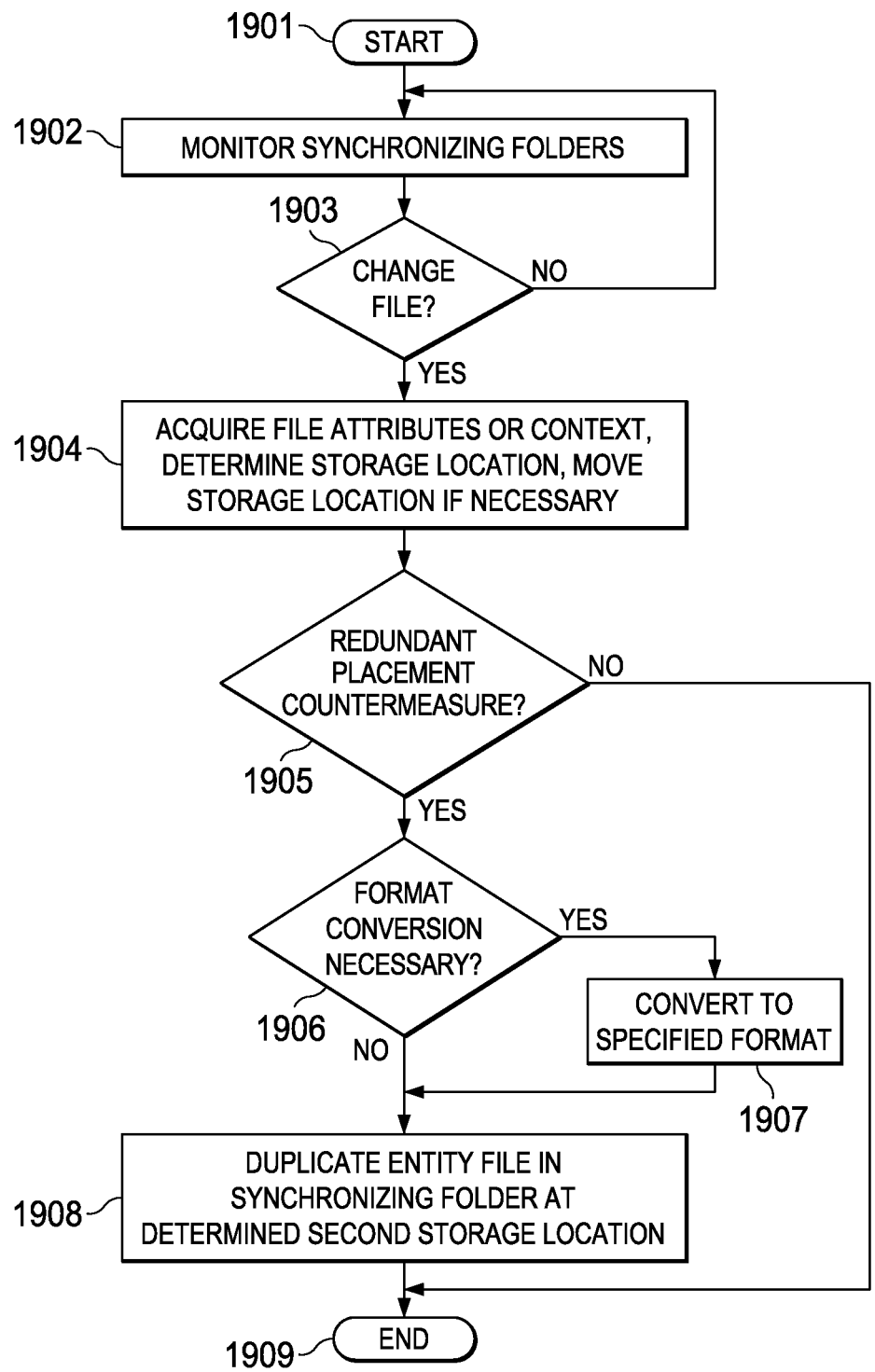
FIG. 19 shows a flowchart for redundant storage of an entity file in a cloud-utilizing terminal in a plurality of storage clouds according to an embodiment of the present invention.

FIG. 19 shows a flowchart for redundant storage of an entity file in a cloud-utilizing terminal in a plurality of storage clouds according to an embodiment of the present invention.

In Step 1901, the entity file manipulating/monitoring means (134) begins redundant placement of an entity file in a plurality of storage clouds. The process of redundant placement of an entity file in a plurality of storage clouds may begin as soon as the cloud-utilizing terminal (131) starts up. This is because constant monitoring of redundant placement is desirable during operation of the cloud-utilizing terminal (131). Also, the process of redundant placement of an entity file in a plurality of storage clouds may begin periodically, for example, at intervals of several minutes.

In Step 1902, the entity file manipulating/monitoring means (134) starts monitoring synchronizing folders as soon as the processing starts.

In Step 1903, the entity file manipulating/monitoring means (134) determines whether or not a file in a synchronizing folder has been changed (for example, edited). When a file has been changed, the processing of the synchronizing folder advances to Step 1904. When a file has not been changed, the processing of the synchronizing folder returns to Step 1902.

In Step 1904, the file classifying engine (133) acquires the attributes of the file, the context of the file, or a combination of the two. The entity file manipulating/monitoring means (134) references the acquired file attributes or context to determine a storage cloud for storage which satisfies the predefined rules. This may be the original storage cloud for redundant storage (the first storage site) or another storage cloud for redundant storage (the second storage site). When necessary, the entity file manipulating/monitoring means (134) changes the storage cloud used to store the file. For changing the storage cloud used to store files see the flowchart shown in FIG. 18.

In Step 1905, the entity file manipulating/monitoring means (134) determines whether or not redundancy measures are required for a storage cloud. Whether or not redundancy measures are required depends on, for example, the importance of the content, the document status or the document ownership of the entity file in the cloud-utilizing terminal. The attributes or context of the entity file in the cloud-utilizing terminal, the attributes of the virtual folder, and the attribute data of the clouds are identified in accordance with the predefined rules. Examples of document status include draft, awaiting approval, approved, and expired. Examples of document ownership include regular employee, manager, division head, and administrative department. Content importance, document status, and document ownership are included in the properties of a document file, or added by an outside document management system. When redundancy measures are required, the process advances to Step 1906. When redundancy measures are not required, the process advances to Step 1909 where it comes to an end.

In Step 1906, when redundancy measures are required, the entity file manipulating/monitoring means (134) determines whether the redundant file requires a format conversion. When a format conversion is required, the process advances to Step 1907. When a format conversion is not required, the process advances to Step 1908.

In Step 1907, when a format conversion is required, the entity file manipulating/monitoring means (134) converts the format of the redundant file to the format indicated in the predefined rules. The format may have to be changed in order to enable different types of devices (for example, different types of cloud-utilizing terminals) to access the same data. Sometimes storage clouds only accept data in a certain format. Also, sometimes completed documents will be made available to the public in read-only format.

In Step 1908, the entity file manipulating/monitoring means (134) duplicates an entity file to the synchronizing file associated with the storage cloud for storing redundant files (second storage site) from the synchronizing file associated with the storage cloud for storing original files (first storage site). The entity file manipulating/monitoring means (134) then uploads the entity file in the synchronizing folder associated with the storage cloud for storing redundant files (second storage site) to the storage cloud for storing redundant files (second storage site). When the upload has been completed, the process advances to Step 1909.

In Step 1909, the entity file manipulating/monitoring means (134) ends the process of placing entity files redundantly in a plurality of storage clouds.

As shown in the flowchart of FIG. 19, a file can be distributed or duplicated to a plurality of storage clouds depending, for example, on the importance of its content in order to ensure redundancy.

What is claimed is:

1. A cloud-utilizing terminal coupled to a plurality of storage clouds via a network, the cloud-utilizing terminal comprising a processor and memory having instructions executable by the processor to perform steps of:
generating at least one virtual folder displaying links associated with entity files stored in each storage cloud of the plurality of storage clouds;
referencing attributes of a first entity file of the entity files, attributes of a first virtual folder of the at least one virtual folder and attributes of the plurality of storage clouds, in response to the creation or update of the first entity file in the first virtual folder in the cloud-utilizing terminal, and using the attributes of the plurality of storage clouds to select a storage cloud from the plurality of storage clouds for storing the first entity file so as to satisfy predefined rules associated with the attributes of the plurality of storage clouds;
uploading the first entity file in the cloud-utilizing terminal to the selected storage cloud; and
displaying in the first virtual folder a link to the first entity file uploaded to the selected storage cloud, wherein a plurality of synchronizing folders associated respectively with the plurality of storage clouds is also provided in the cloud-utilizing terminal, and the first entity file generated or stored in the first virtual folder is moved from the first virtual folder to a synchronizing folder of the plurality of synchronizing folders associated with the selected storage cloud.

2. The cloud-utilizing terminal according to claim 1, further comprising referencing attributes of a second entity file of the entity files, the attributes of the first virtual folder and the attributes of the plurality of storage clouds, in response to the creation of the second entity file different from the first entity file in the first virtual folder of the cloud-utilizing terminal, and using the attributes of the plurality of storage clouds to select another storage cloud from the plurality of storage clouds for storing the second entity file so as to satisfy the predefined rules associated with the attributes of the plurality of storage clouds;
uploading the second entity file in the cloud-utilizing terminal to the another storage cloud selected by the cloud-utilizing terminal; and
displaying a link to the uploaded second entity file in the first virtual folder.

3. The cloud-utilizing terminal according to claim 1, comprising further instructions executable by the processor to perform steps of:
referencing the attributes of the first entity file, the attributes of the first virtual folder and the attributes of the plurality of storage clouds, in response to at least one of (i) the elapsing of a predetermined amount of time and (ii) a request from a user, and re-selecting at least one storage cloud from the plurality of storage clouds for storing the first entity file in the cloud-utilizing terminal so as to satisfy the predefined rules associated with the attributes of the plurality of storage clouds;
uploading the first entity file in the cloud-utilizing terminal to the re-selected storage cloud re-selected by the cloud-utilizing terminal in response to the re-selected storage cloud being different from the selected storage cloud; and
changing a destination of the link from the selected storage cloud to the re-selected storage cloud.

4. The cloud-utilizing terminal according to claim 1, comprising further instructions executable by the processor to perform steps of:
referencing the attributes of the first entity file, the attributes of the first virtual folder and the attributes of the plurality of storage clouds, in response to at least one of (i) the importance of the content of the first entity file in the cloud-utilizing terminal, (ii) the document status, and (ii) the document owner, and using the attributes of the plurality of storage clouds to select a second storage cloud different from the selected storage cloud from the plurality of storage clouds so as to satisfy the predefined rules associated with the attributes of the plurality of storage clouds; and uploading the first entity file in the cloud-utilizing terminal to the second storage cloud, or distributed from the selected storage cloud to the second storage cloud.

5. The cloud-utilizing terminal according to claim 1, comprising further instructions executable by the processor to perform steps of:

referencing the attributes of a second entity file, the attributes of the first virtual folder and the attributes of the plurality of storage clouds, in response to the creation of the second entity file different from the first entity file in the first virtual folder of the cloud-utilizing terminal, and using the attributes of the plurality of storage clouds to select another storage cloud from the plurality of storage clouds for storing the second entity file so as to satisfy the predefined rules associated with the attributes of the plurality of storage clouds;

uploading the second entity file in the cloud-utilizing terminal to the another storage cloud selected by the cloud-utilizing terminal; and displaying a link to the uploaded second entity file in the first virtual folder.

6. The cloud-utilizing terminal according to claim 5, wherein the another storage cloud is different from the selected storage cloud.

7. The cloud-utilizing terminal according to claim 1, further comprising:

determining whether a file has changed in any of the plurality of synchronizing folders;

referencing the attributes of the plurality of storage clouds, in response to a change in the file, and using the attributes of the plurality of storage clouds to select another storage cloud from the plurality of storage clouds for storing the file so as to satisfy predefined rules associated with the attributes of the plurality of storage clouds;

moving the file in the synchronization folder associated with the selected storage cloud to another synchronization folder associated with the another storage cloud;

responsive to moving the file to the another synchronization folder, uploading the file to the another storage cloud; and changing the link in the first virtual folder from the synchronization folder associated with the storage cloud to the another synchronization folder associated with the another storage cloud.

8. The cloud-utilizing terminal according to claim 1, wherein the entity file is deleted from the cloud-utilizing terminal in response to the uploading of the entity file to the selected storage cloud.

9. The cloud-utilizing terminal according to claim 1, wherein the entity file generated or stored in the first virtual folder is deleted in response to the link to the uploaded entity file being displayed in the first virtual folder.

10. The cloud-utilizing terminal according to claim 1, wherein the attributes of the entity file include at least one attribute among a file name, a file format, presence of compression and a compression format, presence of encryption and an encryption method, a file size, a label, the creation date, a most recent revision date, a data type including the text content, image content, and video content, an importance of the content, a creator or administrator, and a most recent reviser of the data.

11. The cloud-utilizing terminal according to claim 1, wherein the attributes of the first virtual folder include at least one attribute among the use of a file stored in the first virtual folder, a file format, an expiration date, a presence of a password for accessing the first virtual folder, a presence of sharing of the first virtual folder with other users, an ability to create subfolders, a presence of virtual folder encryption, the creator or administrator, users able to access the folder, security, and a password.

12. The cloud-utilizing terminal according to claim 1, wherein the attributes of the plurality of storage clouds include at least one attribute among the service period, availability, stability, performance, redundancy, location of the storage cloud, billing system, monthly fee or capacity fee, capacity limit, file storage expiration data, contract period, number of connectable clients, number of contracted users, evaluation ranking by a third-party organization, data format system for support, access control system, recovery time objectives, guaranteed response time, security or security level, inspection, and multi-tenancy.

13. The cloud-utilizing terminal according to claim 1, wherein the attributes of the entity file, and the attributes of each storage cloud are periodically revised.

14. The cloud-utilizing terminal according to claim 1, wherein the cloud-utilizing terminal further executes the step of referencing the attributes of the first virtual folder and the attributes of the first entity file to be created or stored in the first virtual folder, in response to the attributes of the first virtual folder, and determining whether or not the first entity file may be created or stored in the first virtual folder.

15. The cloud-utilizing terminal according to claim 1, comprising further instructions executable by the processor to perform steps of:

Periodically sending a test file to, and receiving the test file from, each of the plurality of storage clouds to determine at least some of the attributes of the plurality of storage clouds.

16. A computer program product comprising a non-transitory computer-readable recording medium having recorded thereon a computer program operable for selecting at least one storage cloud to store an entity file storable in a cloud-utilizing terminal from among a plurality of storage clouds connected via a network to the cloud-utilizing terminal, the cloud-utilizing terminal having at least one virtual folder displaying links associated with entity files stored in each storage cloud of the plurality of storage clouds, the computer program comprising instructions for causing the cloud-utilizing terminal to perform, when the computer program is executed by the cloud-utilizing terminal, to perform steps of:

referencing attributes of a first entity file of the entity files, attributes of a first virtual folder of the at least one virtual folder and attributes of the plurality of storage clouds, in response the creation or update of the first entity file in the first virtual folder in the cloud-utilizing terminal, and using the attributes of the plurality of storage clouds to select a storage cloud from the plurality of storage clouds for storing the first entity file so as to satisfy predefined rules associated with the attributes of the plurality of storage clouds; and uploading the first entity file in the cloud-utilizing terminal to the selected storage cloud selected by the cloud-utilizing terminal, and displaying a link to the uploaded first entity file in the first virtual folder, wherein a plurality of synchronizing folders associated respectively with the plurality of storage clouds is also provided in the cloud-utilizing terminal, and the first entity file generated or stored in the first virtual folder is moved from the first virtual folder to a synchronizing folder of the plurality of synchronizing folders associated with the selected storage cloud.

17. The computer program product according to claim 16, further comprising steps of:
referencing the attributes of the first entity file, the attributes of the first virtual folder and the attributes of the plurality of storage clouds, in response to at least one of (i) the elapsing of a predetermined amount of time and (ii) a request from a user, and re-selecting at least one storage cloud from the plurality of storage clouds for storing the first entity file in the cloud-utilizing terminal so as to satisfy the predefined rules associated with the attributes of the plurality of storage clouds;
uploading the first entity file in the cloud-utilizing terminal to the re-selected storage cloud re-selected by the cloud-utilizing terminal in response to the re-selected storage cloud being different from the selected storage cloud; and
changing a destination of the link from the selected storage cloud to the re-selected storage cloud.

18. The computer program product according to claim 16, further comprising steps of:
referencing the attributes of the first entity file, the attributes of the first virtual folder and the attributes of the plurality of storage clouds, in response to at least one of (i) the importance of the content of the first entity file in the cloud-utilizing terminal, (ii) the document status, and (ii) the document owner, and using the attributes of the plurality of storage clouds to select a second storage cloud different from the selected storage cloud from the plurality of storage clouds so as to satisfy the predefined rules associated with the attributes of the plurality of storage clouds; and
uploading the first entity file in the cloud-utilizing terminal to the second storage cloud, or distributed from the selected storage cloud to the second storage cloud.

19. The computer program product according to claim 16, further comprising steps of:
referencing the attributes of a second entity file, the attributes of the first virtual folder and the attributes of the plurality of storage clouds, in response to the creation of the second entity file different from the first entity file in the first virtual folder of the cloud-utilizing terminal, and using the attributes of the plurality of storage clouds to select another storage cloud from the plurality of storage clouds for storing the second entity file so as to satisfy the predefined rules associated with the attributes of the plurality of storage clouds;
uploading the second entity file in the cloud-utilizing terminal to the another storage cloud selected by the cloud-utilizing terminal; and
displaying a link to the uploaded second entity file in the first virtual folder.

20. A cloud-utilizing terminal according to claim 19, wherein the another storage cloud is different from the selected storage cloud.

21. The computer program product according to claim 16, further comprising:
determining whether a file has changed in any of the plurality of synchronizing folders;
referencing the attributes of the plurality of storage clouds, in response to a change in the file, and using the attributes of the plurality of storage clouds to select another storage cloud from the plurality of storage clouds for storing the file so as to satisfy predefined rules associated with the attributes of the plurality of storage clouds;
moving the file in the synchronization folder associated with the selected storage cloud to another synchronization folder associated with the another storage cloud;
responsive to moving the file to the another synchronization folder, uploading the file to the another storage cloud; and
changing the link in the first virtual folder from the synchronization folder associated with the storage cloud to the another synchronization folder associated with the another storage cloud.

22. The computer program product according to claim 16, wherein the entity file is deleted from the cloud-utilizing terminal in response to the uploading of the entity file to the selected storage cloud.

23. A computer program product comprising a non-transitory computer-readable recording medium having recorded thereon a computer program operable for managing using at least one virtual folder an entity file able to be stored in a storage cloud by a cloud-utilizing terminal connectable to a storage cloud via a network and is operable to display a link associated with an entity file stored in each storage cloud of a plurality of storage clouds, the computer program comprising instructions for causing the cloud-utilizing terminal to perform, when the computer program is executed by the cloud-utilizing terminal, steps of:
referencing attributes of a first entity file, attributes of a first virtual folder of the at least one virtual folder and attributes of the plurality of storage clouds, in response to the creation or update of the first entity file in the first virtual folder in the cloud-utilizing terminal, and using the attributes of the plurality of storage clouds to select a storage cloud from the plurality of storage clouds for storing the first entity file so as to satisfy predefined rules associated with the attributes of the plurality of storage clouds;
uploading the first entity file in the cloud-utilizing terminal to the selected storage cloud selected by the cloud-utilizing terminal; and
creating a first link to the uploaded first entity file, and displaying the created first link in the first virtual folder, the first entity file being deleted from the first virtual folder, wherein a plurality of synchronizing folders associated respectively with the plurality of storage clouds is also provided in the cloud-utilizing terminal, and the first entity file generated or stored in the first virtual folder is moved from the first virtual folder to a synchronizing folder of the plurality of synchronizing folders associated with the selected storage cloud.

24. A computer program product comprising a non-transitory computer-readable recording medium having recorded thereon a computer program operable for managing using at least one virtual folder an entity file able to be stored in a storage cloud by a cloud-utilizing terminal connectable to a storage cloud via a network and is operable to display a link associated with an entity file stored in each storage cloud of the plurality of storage clouds, the computer program comprising instructions for causing the cloud-utilizing terminal to perform, when the computer program is executed by the cloud-utilizing terminal, steps of:
referencing context of a first entity file, the attributes of a first virtual folder of the at least one virtual folder and attributes of the plurality of storage clouds, in response to the creation or update of the first entity file in the first virtual folder in the cloud-utilizing terminal, and using the attributes of the plurality of storage clouds to select a storage cloud from the plurality of storage clouds for storing the first entity file so as to satisfy predefined rules associated with the attributes of the plurality of storage clouds;

uploading the first entity file in the cloud-utilizing terminal to the selected storage cloud selected by the cloud-utilizing terminal; and creating a first link to the uploaded first entity file, and displaying the created first link in the first virtual folder, the first entity file being deleted from the first virtual folder, wherein a plurality of synchronizing folders associated respectively with the plurality of storage clouds is also provided in the cloud-utilizing terminal, and the first entity file generated or stored in the first virtual folder is moved from the first virtual folder to a synchronizing folder of the plurality of synchronizing folders associated with the selected storage cloud.

\* \* \* \* \*